United States Patent
Luo et al.

(10) Patent No.: US 12,369,057 B2
(45) Date of Patent: Jul. 22, 2025

(54) COMMUNICATION METHOD AND APPARATUS

(71) Applicant: HUAWEI TECHNOLOGIES CO., LTD., GuangDong (CN)

(72) Inventors: Zhihu Luo, Beijing (CN); Xiang Mi, Beijing (CN); Lei Chen, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 454 days.

(21) Appl. No.: 17/870,226

(22) Filed: Jul. 21, 2022

(65) Prior Publication Data

US 2022/0361023 A1 Nov. 10, 2022

Related U.S. Application Data

(63) Continuation of application No. PCT/CN2020/073947, filed on Jan. 23, 2020.

(51) Int. Cl.
*H04W 24/08* (2009.01)
*H04L 1/08* (2006.01)
(Continued)

(52) U.S. Cl.
CPC ............... *H04W 24/08* (2013.01); *H04L 1/08* (2013.01); *H04W 72/1268* (2013.01); *H04W 72/23* (2023.01); *H04W 74/0833* (2013.01)

(58) Field of Classification Search
CPC . H04W 24/08; H04W 72/23; H04W 72/1268; H04W 74/0833; H04L 1/08
(Continued)

(56) References Cited

U.S. PATENT DOCUMENTS

2019/0349970 A1 11/2019 Chen
2020/0236692 A1* 7/2020 Lin ............... H04W 72/535
(Continued)

FOREIGN PATENT DOCUMENTS

CN 108616999 A 10/2018
CN 108632960 A 10/2018
(Continued)

OTHER PUBLICATIONS

Ericsson, "Details of MAC DRX Control," 3GPP TSG-RAN WG2 Meeting #61, R2-080934, Feb. 11, 2008-Feb. 15, 2008; 5 total pages.
(Continued)

*Primary Examiner* — Xuan Lu
(74) *Attorney, Agent, or Firm* — Rimon PC

(57) ABSTRACT

This application relates to a communication method and apparatus. A terminal device sends first uplink data to a network device. After sending the first uplink data, the terminal device monitors a first downlink control channel in a first search space in a first duration; and after the first duration ends, the terminal device monitors a second downlink control channel in a second search space in a second duration. A length of a periodicity of the second search space is greater than a length of a periodicity of the first search space. In this case, the terminal device monitors the second downlink control channel based on the second search space at a low frequency. Therefore, the second search space with a long periodicity is set, so that power consumption of monitoring the downlink control channel by the terminal device can be reduced.

20 Claims, 14 Drawing Sheets

(51) Int. Cl.
*H04W 72/1268* (2023.01)
*H04W 72/23* (2023.01)
*H04W 74/0833* (2024.01)

(58) Field of Classification Search
USPC .......................................................... 370/329
See application file for complete search history.

(56) References Cited

U.S. PATENT DOCUMENTS

| | | | |
|---|---|---|---|
| 2020/0367160 | A1 | 11/2020 | Braun et al. |
| 2021/0084689 | A1* | 3/2021 | Ly .................... H04W 72/0446 |
| 2021/0235469 | A1* | 7/2021 | Mu ...................... H04L 5/0048 |
| 2021/0274563 | A1* | 9/2021 | Wong .................... H04W 68/02 |

FOREIGN PATENT DOCUMENTS

| | | |
|---|---|---|
| CN | 108696919 A | 10/2018 |
| CN | 109417762 A | 3/2019 |
| WO | 2019099880 A1 | 5/2019 |

OTHER PUBLICATIONS

Ericsson, "Remaining general aspects of early data transmission," 3GPP TSG-RAN WG2 #100 Tdoc R2-1713054, Nov. 27, 2017-Dec. 1, 2017; 7 total pages.

Motorola Mobility et al: "Remaining details for Msg2/3/4 transmission and reception", 3GPP Draft; R1-1807275, May 21-25, 2018, XP051442471; 4 total pages.

NTT Docomo et al: "Offline summary for AI 7.1.3.1.2 Search space", 3GPP Draft; R1-1805538, Apr. 16-20, 2018, XP051435649; 40 total pages.

Qualcomm Incorporated: "PDCCH-based power saving channel design", 3GPP Draft; R1-1911129, Oct. 14-20, 2019, XP051808852; 9 total pages.

Motorola Mobility et al: "Monitoring of PDCCH-based power saving signal/channel", 3GPP Draft; R1-1911039, Oct. 14-20, 2019, XP051808802; 3 total pages.

* cited by examiner

COMMUNICATION METHOD AND APPARATUS

CROSS-REFERENCE TO RELATED APPLICATIONS

This application is a continuation of International Application No. PCT/CN2020/073947, filed on Jan. 23, 2020, the disclosure of which is hereby incorporated by reference in its entirety.

TECHNICAL FIELD

This application relates to the field of mobile communication technologies, and in particular, to a communication method and apparatus.

BACKGROUND

To reduce power consumption of a terminal device in a radio resource control (RRC) inactive state, solutions of uplink small packet transmission are currently provided. To be specific, a terminal device in an RRC inactive state does not need to enter an RRC connected state to send uplink data, but may directly send uplink data to a network device while in the inactive state.

After receiving the uplink data from the terminal device, the network device may send application-layer feedback information to the terminal device, where the application-layer feedback information may be used to acknowledge that the uplink data is completely sent. A physical layer of the network device first receives the uplink data from the terminal device. If the physical layer of the network device successfully receives the data, the physical layer may decode and demodulate the received data, and then send the decoded and demodulated data to an application layer (for example, a transmission control protocol (TCP)/Internet protocol (IP) layer) of the network device. Further, the physical layer of the network device may send acknowledgment information to a physical layer of the terminal device, to indicate that the data is successfully received. If the physical layer of the network device fails to receive the data, the physical layer may alternatively schedule the physical layer of the terminal device to resend the data. After receiving the decoded and demodulated data from the physical layer of the network device, the TCP/IP layer of the network device generates TCP/IP-layer feedback information, namely, the application-layer feedback information, and sends the TCP/IP-layer feedback information to a TCP/IP layer of the terminal device.

A lower layer (for example, the physical layer) is usually faster in providing feedback, and the application layer is usually slow. When feedback from the application layer is involved, it takes a relatively long time period from the moment at which the terminal device completes sending of the uplink data to the moment at which the terminal device receives the application-layer feedback information. A terminal device in an RRC inactive state needs to always monitor keep monitoring a physical downlink control channel (PDCCH) during the time period. This causes large power consumption of the terminal device.

SUMMARY

Embodiments of this application provide a communication method and apparatus, to reduce power consumption of a terminal device.

According to a first aspect, a first communication method is provided. The method includes: sending first uplink data to a network device; monitoring a first downlink control channel in a first search space in a first duration, where a periodicity of the first search space is a first periodicity; and after the first duration ends, monitoring a second downlink control channel in a second search space in a second duration, where a periodicity of the second search space is a second periodicity, and a length of the second periodicity is greater than a length of the first periodicity.

The method may be performed by a first communication apparatus. The first communication apparatus may be a communication device, or may be a communication apparatus, for example, a chip, that can support the communication device to implement a function required in the method. For example, the first communication apparatus is a terminal device, a chip that is disposed in the terminal device and that is configured to implement a function of the terminal device, or another component configured to implement the function of the terminal device. The following description process uses an example in which the first communication apparatus is the terminal device.

In some embodiments of this application, after sending the first uplink data to the network device, the terminal device monitors a downlink control channel in the first search space in the first duration. For example, the downlink control channel monitored by the terminal device in the first search space is referred to as the first downlink control channel. After the first duration ends, the terminal device monitors a downlink control channel in the second search space in the second duration. For example, the downlink control channel monitored by the terminal device in the second search space is referred to as the second downlink control channel. The length of the periodicity of the first search space is less than the length of the periodicity of the first search space. Therefore, the terminal device monitors the second downlink control channel based on the second search space at a low frequency. Therefore, the second search space with a long periodicity is set, so that power consumption of monitoring the downlink control channel by the terminal device can be reduced.

In an optional implementation, the first downlink control channel is used to carry first downlink control information (DCI), the first DCI is used to schedule retransmission of the first uplink data, the second downlink control channel is used to carry second DCI, and the second DCI is used to schedule application-layer feedback information for the first uplink data.

A bottom layer is fast in feedback. Therefore, if the network device fails to receive the first uplink data, the network device schedules, through a physical layer, the terminal device to perform retransmission. Owing to a fast feedback speed, the physical layer may complete the feedback in the first duration. As a result, the first DCI sent by the network device in the first duration may be used to schedule the retransmission of the first uplink data. The length of the first periodicity is short, and the terminal device frequently monitors the downlink control channel in the first duration, so that the network device can schedule the terminal device in time as much as possible to perform retransmission, to reduce a transmission latency. In addition, an application layer is slow in feedback. Therefore, if the network device successfully receives the first uplink data, the physical layer of the network device sends the first uplink data to the application layer (for example, a TCP/IP layer) of the network device. The application layer generates the application-layer feedback information, and then the physical layer of the network device sends the application-layer feedback information to the terminal device. This process lasts for a long time period, and the first duration may have ended when the physical layer of the network device sends the application-layer feedback information. As a result, the second DCI sent by the network device in the second duration may be used to schedule the application-layer feedback information for the first uplink data. Certainly, a duration in which the network device sends DCI and a type of the DCI that is sent are not limited in this embodiment of this application. For example, alternatively, the network device may send, in the first duration, the DCI for scheduling the application-layer feedback information for the first uplink data, or may send, in the second duration, the DCI for scheduling the retransmission of the first uplink data.

In an optional implementation, the first uplink data is included in a third message or a random access request message in a random access procedure, or the first uplink data is sent on a preconfigured uplink resource.

The terminal device in an RRC inactive state may send uplink data to the network device in several manners. For example, the terminal device may include the uplink data in a Msg3 in a four-step random access procedure, may include the uplink data in a MsgA (which may also be referred to as the random access request message) in a two-step random access procedure, or may send the uplink data in an uplink grant-free transmission mode instead of a random access procedure, for example, send the uplink data on a preconfigured resource. There are a large quantity of manners of sending the uplink data, and the terminal device may select corresponding appropriate manners based on different scenarios.

In an optional implementation, the method further includes:
   receiving first configuration information and second configuration information from the network device, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

If the first search space and the second search space are the search spaces of different types, or the search space identifier corresponding to the first search space is different from the search space identifier corresponding to the second search space, the network device may configure the first search space by using the first configuration information, and configure the second search space by using the second configuration information. The first configuration information and the second configuration information may be sent by using a same message, or may be sent by using different messages. For example, the network device may first send the first configuration information and then send the second configuration information, may first send the second configuration information and then send the first configuration information, or may simultaneously send the first configuration information and the second configuration information. Even if the first configuration information and the second configuration information are sent by using the same message, the first configuration information and the second configuration information are independent of each other. This may be understood as follows: The first configuration information includes a set of configuration parameters for configuring the first search space, and the second configuration information includes another set of configuration parameters for configuring the second search space. Two types of search spaces are separately configured by using different configuration parameters, so that a configuration manner can be more definite, to prevent the terminal device from confusing the two types of search spaces.

In an optional implementation, the method further includes:
   receiving third configuration information from the network device, where the third configuration information is used to configure the first search space and the second search space, and the first search space and the second search space are search spaces of a same type, or a search space identifier corresponding to the first search space is the same as a search space identifier corresponding to the second search space.

If the first search space and the second search space are the search spaces of a same type, or the search space identifier corresponding to the first search space is the same as the search space identifier corresponding to the second search space, the network device may configure the first search space and the second search space by using the third configuration information. In this case, it may be considered that the third configuration information includes one set of configuration parameters for configuring the first search space and the second search space. Two types of search spaces may be configured by using one set of configuration parameters, so that a size of the configuration parameters can be reduced, to reduce transmission overheads.

In an optional implementation, the method further includes:
   receiving fourth configuration information and/or fifth configuration information from the network device, where the fourth configuration information is used to configure the first duration, the first duration is an integer multiple of a first time unit or an integer multiple of the length of the first periodicity, and the first time unit is one of a symbol, a slot, a subframe, a frame, or a superframe; and the fifth configuration information is used to configure the second duration, the second duration is an integer multiple of a second time unit or an integer multiple of the length of the second periodicity, and the second time unit is one of the symbol, the slot, the subframe, the frame, or the superframe.

If the network device sends both the fourth configuration information and the fifth configuration information, the fifth configuration information and the fourth configuration information may be included in a same message. This is equivalent to that the network device may configure both the first duration and the second duration by using only one message instead of separately configuring the first duration and the second duration by using a plurality of pieces of configuration information. This helps reduce the transmission overheads. Alternatively, the fifth configuration information and the fourth configuration information may be included in different messages. In other words, the network device may separately configure the first duration and the second duration by using different messages. In this way, a configuration process can be more definite. Alternatively, the network device may not send the fourth configuration information to the terminal device. For example, the first duration may be specified in a protocol or may be preconfigured on the terminal device. In this case, the network device does not need to interact with the terminal device, to reduce the transmission overheads. Alternatively, the network device may not send the fifth configuration information to the terminal device. For example, the second duration may be specified in a protocol or may be preconfigured on the terminal device. In this case, the network device does not need to interact with the terminal device, to reduce the transmission overheads.

According to a second aspect, a second communication method is provided. The method includes: receiving first uplink data from a terminal device; and determining a first duration and a second duration, where first DCI is sent based on a first search space in the first duration, and a periodicity of the first search space is a first periodicity; and after the first duration ends, second DCI is sent based on a second search space in the second duration, a periodicity of the second search space is a second periodicity, and a length of the second periodicity is greater than a length of the first periodicity.

In embodiments of this application, in other words, in various aspects, sending DCI based on a search space may be understood as sending the DCI in the search space. For example, sending the first DCI based on the first search space may be understood as sending the first DCI in the first search space. Similarly, sending the second DCI based on the second search space may be understood as sending the second DCI in the second search space.

The method may be performed by a second communication apparatus. The second communication apparatus may be a communication device, or may be a communication apparatus, for example, a chip, that can support the communication device to implement a function required in the method. For example, the second communication apparatus is a network device, a chip that is disposed in the network device and that is configured to implement a function of the network device, or another component configured to implement the function of the network device. The following description process uses an example in which the second communication apparatus is the network device.

In an optional implementation, the first DCI is used to schedule retransmission of the first uplink data, and the second DCI is used to schedule application-layer feedback information for the first uplink data.

In an optional implementation, the first uplink data is included in a third message or a random access request message in a random access procedure, or the first uplink data is sent by the terminal device on a preconfigured uplink resource.

In an optional implementation, the method further includes:
sending first configuration information and second configuration information to the terminal device, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

In an optional implementation, the method further includes:
sending third configuration information to the terminal device, where the third configuration information is used to configure the first search space and the second search space, and the first search space and the second search space are search spaces of a same type, or a search space identifier corresponding to the first search space is the same as a search space identifier corresponding to the second search space.

In an optional implementation, the method further includes:
sending fourth configuration information and/or fifth configuration information to the terminal device, where the fourth configuration information is used to configure the first duration, the first duration is an integer multiple of a first time unit or an integer multiple of the length of the first periodicity, and the first time unit is one of a symbol, a slot, a subframe, a frame, or a superframe; and the fifth configuration information is used to configure the second duration, the second duration is an integer multiple of a second time unit or an integer multiple of the length of the second periodicity, and the second time unit is one of the symbol, the slot, the subframe, the frame, or the superframe.

For technical effects brought by the second aspect or the optional implementations, refer to the descriptions of the technical effects brought by the first aspect or the corresponding implementations.

According to a third aspect, a third communication method is provided. The method includes: sending first uplink data to a network device; monitoring a downlink control channel in a first search space in a third duration, where a periodicity of the first search space is a first periodicity; receiving indication information from the network device in the third duration; and stopping, based on the indication information, monitoring the downlink control channel; or monitoring the downlink control channel in a second search space based on the indication information, where a periodicity of the second search space is a second periodicity, and a length of the second periodicity is greater than a length of the first periodicity.

The method may be performed by a third communication apparatus. The third communication apparatus may be a communication device, or may be a communication apparatus, for example, a chip, that can support the communication device to implement a function required in the method. For example, the third communication apparatus is a terminal device, a chip that is disposed in the terminal device and that is configured to implement a function of the terminal device, or another component configured to implement the function of the terminal device. The following description process uses an example in which the third communication apparatus is the terminal device.

In some embodiments of this application, after sending the first uplink data to the network device, the terminal device may monitor the downlink control channel in the first search space. After receiving the indication information, the terminal device monitors the downlink control channel in the second search space. The length of the periodicity of the first search space is less than the length of the periodicity of the first search space. Therefore, the terminal device monitors the downlink control channel based on the second search space at a low frequency. Therefore, the second search space with a long periodicity is set, so that power consumption of monitoring the downlink control channel by the terminal device can be reduced. Alternatively, when no application-layer feedback information exists, a base station may notify the terminal device by using the indication information, and the terminal device may stop monitoring the downlink control channel, to reduce unnecessary power consumption and prolong a service life of the terminal device.

In an optional implementation, the indication information includes at least one of the following:

a media access control control element (MAC CE), where the MAC CE is used to transmit a second contention resolution identity, and the second contention resolution identity matches a first contention resolution identity;

an RRC message, where the RRC message indicates to fall back to an RRC inactive state or an RRC idle state; or first information or third information, where the first information indicates to stop monitoring the downlink control channel or indicates that no application-layer feedback information exists, and the third information indicates to monitor the downlink control channel in the second search space or indicates that the application-layer feedback information exists.

The first uplink data and the first contention resolution identity are included in a third message or a random access request message in a random access procedure.

For example, if the indication information includes the MAC CE (where the MAC CE includes the second contention resolution identity), the terminal device monitors the PDCCH in the second search space. In this case, the indication information may indicate to monitor the PDCCH in the second search space, and actually the terminal device cannot determine whether the network device is to send the application-layer feedback information, and therefore needs to continue to monitor the PDCCH. In this case, it may also be understood that the indication information indicates to change the search space for monitoring the PDCCH, to change a configuration of the search space for monitoring the PDCCH, or to change the periodicity of the search space for monitoring the PDCCH, in other words, indicates to monitor the PDCCH in the second search space. If the indication information does not include the third information, that "the indication information may indicate to monitor the PDCCH in the second search space" may be considered as an implicit indication manner. For another example, the indication information includes the MAC CE and the third information, or includes the RRC message and the third information. In these two cases, owing to the third information, the terminal device can learn that the PDCCH needs to be monitored in the second search space. Therefore, the terminal device may monitor the PDCCH in the second search space based on the indication information. If the indication information includes the third information, it may be considered that an explicit indication manner is used.

Alternatively, for example, the indication information includes the MAC CE and the RRC message. If the terminal device receives the MAC CE and the RRC message from the network device, it may indicate that the network device is not to send the application-layer feedback information, and therefore the terminal device does not need to continue to monitor the PDCCH. As a result, this case is equivalent to that the indication information indicates to stop monitoring the PDCCH. If the indication information does not include the first information, it may be considered that an implicit indication manner is used. For another example, the indication information may include the MAC CE and the first information, or include the RRC message and the first information. In these two cases, owing to the first information, the terminal device can learn that the monitoring of the PDCCH may be stopped. Therefore, the terminal device may stop, based on the indication information, monitoring the PDCCH. If the indication information includes the first information, it may be considered that an explicit indication manner is used. For still another example, the indication information may include the MAC CE, the RRC message, and the first information. If the terminal device receives the MAC CE and the RRC message from the network device, it indicates that the network device is not to send the application-layer feedback information. The MAC CE or the RRC message may further include the first information for indicating that no application-layer feedback exists or indicating the terminal device to stop monitoring the PDCCH. This is equivalent to an explicit indication manner, and the terminal device may more definitely learn that a next operation is to stop monitoring the PDCCH.

In an optional implementation, the indication information includes at least one of the following:

ACK information;

NACK information;

fallback information, where the fallback information indicates to fall back to a random access procedure; or second information or fourth information, where the second information indicates to stop monitoring the downlink control channel or indicates that no application-layer feedback information exists, and the fourth information indicates to monitor the downlink control channel in the second search space or indicates that the application-layer feedback information exists.

The first uplink data is sent on a preconfigured uplink resource.

For example, the indication information includes the ACK information. In this case, it may be agreed: If the terminal device receives the indication information from the network device, it indicates that the network device is to send the application-layer feedback information, and therefore the terminal device needs to monitor the PDCCH in the second search space. As a result, this case is equivalent to that the indication information indicates to monitor the PDCCH in the second search space. If the indication information does not include the fourth information, that "the indication information indicates to monitor the PDCCH in the second search space" may be considered as an implicit indication manner. For another example, the indication information includes the ACK information and the fourth information. In this case, owing to the fourth information, the terminal device can learn that the PDCCH needs to be monitored in the second search space. Therefore, the terminal device may monitor the PDCCH in the second search space based on the indication information. If the indication information includes the fourth information, it may be considered that an explicit indication manner is used.

Alternatively, for example, the indication information includes the ACK information, includes the NACK information, includes the fallback information, includes the ACK information and the fallback information, or includes the NACK information and the fallback information. In this case, it may be agreed: If the terminal device receives the indication information from the network device, it indicates that the network device is not to send the application-layer feedback information, and therefore the terminal device does not need to monitor the PDCCH in the second search space. As a result, this case is equivalent to that the indication information indicates the terminal device to stop monitoring the PDCCH. If the indication information does not include the fourth information, that "the indication information indicates the terminal device to stop monitoring the PDCCH" may be considered as an implicit indication manner. For another example, the indication information includes the ACK information and the fourth information, includes the NACK information and the fourth information, includes the fallback information and the fourth information, includes the ACK information, the fallback information, and the fourth information, or includes the NACK information, the fallback information, and the fourth information. In these several cases, owing to the fourth information, the terminal device learns that the monitoring of the PDCCH may be stopped. Therefore, the terminal device may stop, based on the indication information, monitoring the PDCCH. If the indication information includes the fourth information, it may be considered that an explicit indication manner is used.

In an optional implementation, the indication information further includes a first parameter for configuring the second periodicity, or the indication information further includes configuration information of the second search space.

Regardless of content indicated by the indication information, if configuration information A in S91 is used to configure only the first search space instead of the second search space, and if a type of the first search space is the same as a type of the second search space, or a search space identifier corresponding to the first search space is the same as a search space identifier corresponding to the second search space, the indication information may further include the first parameter for configuring the second periodicity. For example, if the indication information includes the MAC CE, the first parameter may be included in the MAC CE; or if the indication information includes the RRC message, the first parameter may be included in the RRC message. In other words, because the type of the first search space is the same as the type of the second search space, or the search space identifier corresponding to the first search space is the same as the search space identifier corresponding to the second search space, most configuration parameters for the first search space are the same as those for the second search space, a same set of configuration parameters may be reused, and the indication information only needs to indicate the periodicity of the second search space. This helps reduce transmission overheads. Alternatively, if a type of the first search space is different from a type of the second search space, or a search space identifier corresponding to the first search space is different from a search space identifier corresponding to the second search space, the indication information may further include the configuration information of the second search space. For example, if the indication information includes the MAC CE, the configuration information of the second search space may be included in the MAC CE; or if the indication information includes the RRC message, the configuration information of the second search space may be included in the RRC message. In other words, because the type of the first search space is different from the type of the second search space, or the search space identifier corresponding to the first search space is different from the search space identifier corresponding to the second search space, the indication information further needs to include a complete set of configuration parameters for configuring the second search space.

In an optional implementation, the method further includes:
receiving first configuration information and second configuration information from the network device, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

In an optional implementation, the method further includes:
receiving third configuration information from the network device, where the third configuration information is used to configure the first search space and the second search space, and the first search space and the second search space are search spaces of a same type, or a search space identifier corresponding to the first search space is the same as a search space identifier corresponding to the second search space.

In an optional implementation, the method further includes:
receiving fourth configuration information from the network device, where the fourth configuration information is used to configure the third duration, the third duration is an integer multiple of a third time unit or an integer multiple of the length of the first periodicity, and the third time unit is one of a symbol, a slot, a subframe, a frame, or a superframe.

The third duration may also be configured by the network device, so that the terminal device may determine the third duration.

For technical effects brought by some optional implementations of the third aspect, refer to the descriptions of the technical effects brought by the first aspect or the corresponding implementations.

According to a fourth aspect, a fourth communication method is provided. The method includes: receiving first uplink data from a terminal device, where downlink control information is sent based on a first search space in a third duration after the first uplink data is received, and a periodicity of the first search space is a first periodicity; and sending indication information to the terminal device in the third duration, where the indication information indicates to stop monitoring a downlink control channel in a second search space, or indicates to monitor a downlink control channel in a second search space, where a periodicity of the second search space is a second periodicity, and a length of the second periodicity is greater than a length of the first periodicity.

The method may be performed by a fourth communication apparatus. The fourth communication apparatus may be a communication device, or may be a communication apparatus, for example, a chip, that can support the communication device to implement a function required in the method. For example, the fourth communication apparatus is a network device, a chip that is disposed in the network device and that is configured to implement a function of the network device, or another component configured to implement the function of the network device. The following description process uses an example in which the fourth communication apparatus is the network device.

In an optional implementation, the indication information includes at least one of the following:
a MAC CE, where the MAC CE is used to transmit a second contention resolution identity, and the second contention resolution identity matches a first contention resolution identity;
an RRC message, where the RRC message indicates to fall back to an RRC inactive state or an RRC idle state; or first information or third information, where the first information indicates to stop monitoring the downlink control channel or indicates that no application-layer feedback information exists, and the third information indicates to monitor the downlink control channel in the second search space or indicates that the application-layer feedback information exists.

The first uplink data and the first contention resolution identity are included in a third message or a random access request message in a random access procedure.

In an optional implementation, the indication information includes at least one of the following:
  ACK information;
  NACK information;
  fallback information, where the fallback information indicates to fall back to a random access procedure; or
  second information or fourth information, where the second information indicates to stop monitoring the downlink control channel or indicates that no application-layer feedback information exists, and the fourth information indicates to monitor the downlink control channel in the second search space or indicates that the application-layer feedback information exists.

The first uplink data is sent on a preconfigured uplink resource.

In an optional implementation, the indication information further includes a first parameter for configuring the second periodicity, or the indication information further includes configuration information of the second search space.

In an optional implementation, the method further includes:
  sending first configuration information and second configuration information to the terminal device, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

In an optional implementation, the method further includes:
  sending third configuration information to the terminal device, where the third configuration information is used to configure the first search space and the second search space, and the first search space and the second search space are search spaces of a same type, or a search space identifier corresponding to the first search space is the same as a search space identifier corresponding to the second search space.

In an optional implementation, the method further includes:
  sending fourth configuration information to the terminal device, where the fourth configuration information is used to configure the third duration, the third duration is an integer multiple of a third time unit or an integer multiple of the length of the first periodicity, and the third time unit is one of a symbol, a slot, a subframe, a frame, or a superframe.

For technical effects brought by the fourth aspect or the optional implementations, refer to the descriptions of the technical effects brought by the third aspect or the corresponding implementations.

According to a fifth aspect, a fifth communication method is provided. The method is applicable to a terminal device, and includes: receiving configuration information from a network device, where the configuration information is used to configure discontinuous reception (DRX); sending first uplink data to the network device; and monitoring a downlink control channel in a first duration based on a DRX cycle, where the monitoring of the downlink control channel is stopped in an off duration in the DRX cycle, and the terminal device is in an RRC inactive state.

The method may be performed by a fifth communication apparatus. The fifth communication apparatus may be a communication device, or may be a communication apparatus, for example, a chip, that can support the communication device to implement a function required in the method. For example, the fifth communication apparatus is the terminal device, a chip that is disposed in the terminal device and that is configured to implement a function of the terminal device, or another component configured to implement the function of the terminal device. The following description process uses an example in which the fifth communication apparatus is the terminal device.

In some embodiments of this application, after sending the first uplink data to the network device, the terminal device may monitor the downlink control channel based on the DRX cycle. The DRX cycle includes the off duration, and the terminal device does not need to monitor the downlink control channel in the off duration. Therefore, power consumption of monitoring the downlink control channel by the terminal device can be reduced.

According to a sixth aspect, a sixth communication method is provided. The method includes: sending configuration information to a terminal device, where the configuration information is used to configure DRX; receiving first uplink data from the terminal device; and sending downlink control information in a first duration based on a DRX cycle, where the downlink control information is not sent in an off duration in the DRX cycle, and the terminal device is in an RRC inactive state.

The method may be performed by a sixth communication apparatus. The sixth communication apparatus may be a communication device, or may be a communication apparatus, for example, a chip, that can support the communication device to implement a function required in the method. For example, the sixth communication apparatus is a network device, a chip that is disposed in the network device and that is configured to implement a function of the network device, or another component configured to implement the function of the network device. The following description process uses an example in which the sixth communication apparatus is the network device.

For technical effects brought by the sixth aspect, refer to the descriptions of the technical effects brought by the fifth aspect.

According to a seventh aspect, a communication apparatus is provided. For example, the communication apparatus is the foregoing first communication apparatus. The first communication apparatus is configured to perform the method according to any one of the first aspect or the possible implementations. Specifically, the first communication apparatus may include modules configured to perform the method according to any one of the first aspect or the possible implementations, for example, include a processing module and a transceiver module. For example, the transceiver module may include a sending module and a receiving module. The sending module and the receiving module may be different functional modules, or may be a same functional module but can implement different functions. For example, the first communication apparatus is a communication device, or is a chip or another component disposed in the communication device. For example, the communication device is a network device. An example in which the first communication apparatus is a terminal device is used below. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the first communication apparatus is the communication device, the transceiver is implemented, for example, by an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the seventh aspect, descriptions are provided by using an example in which the first communication apparatus is the terminal device and includes the processing module and the transceiver module.

The transceiver module is configured to send first uplink data to a network device.

The processing module is configured to monitor a first downlink control channel through the transceiver module in a first search space in a first duration, where a periodicity of the first search space is a first periodicity.

The processing module is configured to: after the first duration ends, monitor a second downlink control channel through the transceiver module in a second search space in a second duration, where a periodicity of the second search space is a second periodicity, and a length of the second periodicity is greater than a length of the first periodicity.

In an optional implementation, the first downlink control channel is used to carry first DCI, the first DCI is used to schedule retransmission of the first uplink data, the second downlink control channel is used to carry second DCI, and the second DCI is used to schedule application-layer feedback information for the first uplink data.

In an optional implementation, the first uplink data is included in a third message or a random access request message in a random access procedure, or the first uplink data is sent on a preconfigured uplink resource.

In an optional implementation, the transceiver module is further configured to receive first configuration information and second configuration information from the network device, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

In an optional implementation, the transceiver module is further configured to receive third configuration information from the network device, where the third configuration information is used to configure the first search space and the second search space, and the first search space and the second search space are search spaces of a same type, or a search space identifier corresponding to the first search space is the same as a search space identifier corresponding to the second search space.

In an optional implementation, the transceiver module is further configured to receive fourth configuration information and/or fifth configuration information from the network device, where the fourth configuration information is used to configure the first duration, the first duration is an integer multiple of a first time unit or an integer multiple of the length of the first periodicity, and the first time unit is one of a symbol, a slot, a subframe, a frame, or a superframe; and the fifth configuration information is used to configure the second duration, the second duration is an integer multiple of a second time unit or an integer multiple of the length of the second periodicity, and the second time unit is one of the symbol, the slot, the subframe, the frame, or the superframe.

For technical effects brought by the seventh aspect or the optional implementations, refer to the descriptions of the technical effects brought by the first aspect or the corresponding implementations.

According to an eighth aspect, a communication apparatus is provided. For example, the communication apparatus is the foregoing second communication apparatus. The second communication apparatus is configured to perform the method according to any one of the second aspect or the possible implementations. Specifically, the second communication apparatus may include modules configured to perform the method according to any one of the second aspect or the possible implementations, for example, include a processing module and a transceiver module. For example, the transceiver module may include a sending module and a receiving module. The sending module and the receiving module may be different functional modules, or may be a same functional module but can implement different functions. For example, the second communication apparatus is a communication device, or is a chip or another component disposed in the communication device. For example, the communication device is a network device. The following uses an example in which the second communication apparatus is the network device. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the second communication apparatus is the communication device, the transceiver is implemented, for example, by an antenna, a feeder, and a codec in the communication device. Alternatively, if the second communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the eighth aspect, descriptions are provided by using an example in which the second communication apparatus is a terminal device and includes the processing module and the transceiver module.

The transceiver module is configured to receive first uplink data from a terminal device.

The processing module is configured to determine a first duration and a second duration, where first DCI is sent based on a first search space in the first duration, and a periodicity of the first search space is a first periodicity; and after the first duration ends, second DCI is sent based on a second search space in the second duration, a periodicity of the second search space is a second periodicity, and a length of the second periodicity is greater than a length of the first periodicity.

In an optional implementation, the first DCI is used to schedule retransmission of the first uplink data, and the second DCI is used to schedule application-layer feedback information for the first uplink data.

In an optional implementation, the first uplink data is included in a third message or a random access request message in a random access procedure, or the first uplink data is sent by the terminal device on a preconfigured uplink resource.

In an optional implementation, the transceiver module is further configured to send first configuration information and second configuration information to the terminal device, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

In an optional implementation, the transceiver module is further configured to send third configuration information to the terminal device, where the third configuration information is used to configure the first search space and the second search space, and the first search space and the second search space are search spaces of a same type, or a search space identifier corresponding to the first search space is the same as a search space identifier corresponding to the second search space.

In an optional implementation, the transceiver module is further configured to send fourth configuration information and/or fifth configuration information to the terminal device, where the fourth configuration information is used to configure the first duration, the first duration is an integer multiple of a first time unit or an integer multiple of the length of the first periodicity, and the first time unit is one of a symbol, a slot, a subframe, a frame, or a superframe; and the fifth configuration information is used to configure the second duration, the second duration is an integer multiple of a second time unit or an integer multiple of the length of the second periodicity, and the second time unit is one of the symbol, the slot, the subframe, the frame, or the superframe.

For technical effects brought by the eighth aspect or the optional implementations, refer to the descriptions of the technical effects brought by the second aspect or the corresponding implementations.

According to a ninth aspect, a communication apparatus is provided. For example, the communication apparatus is the foregoing third communication apparatus. The third communication apparatus is configured to perform the method according to any one of the third aspect or the possible implementations. Specifically, the third communication apparatus may include modules configured to perform the method according to any one of the third aspect or the possible implementations, for example, include a processing module and a transceiver module. For example, the transceiver module may include a sending module and a receiving module. The sending module and the receiving module may be different functional modules, or may be a same functional module but can implement different functions. For example, the third communication apparatus is a communication device, or is a chip or another component disposed in the communication device. For example, the communication device is a terminal device. The following uses an example in which the third communication apparatus is the terminal device. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the third communication apparatus is the communication device, the transceiver is implemented, for example, by an antenna, a feeder, and a codec in the communication device. Alternatively, if the third communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the ninth aspect, descriptions are provided by using an example in which the third communication apparatus is the terminal device and includes the processing module and the transceiver module.

The transceiver module is configured to send first uplink data to a network device.

The processing module is configured to monitor a downlink control channel through the transceiver module in a first search space in a third duration, where a periodicity of the first search space is a first periodicity.

The transceiver module is further configured to receive indication information from the network device in the third duration.

The processing module is further configured to: stop, based on the indication information, monitoring the downlink control channel; or monitor the downlink control channel through the transceiver module in a second search space based on the indication information, where a periodicity of the second search space is a second periodicity, and a length of the second periodicity is greater than a length of the first periodicity.

In an optional implementation, the indication information includes at least one of the following:
    a MAC CE, where the MAC CE is used to transmit a second contention resolution identity, and the second contention resolution identity matches a first contention resolution identity;
    an RRC message, where the RRC message indicates to fall back to an RRC inactive state or an RRC idle state; or
    first information or third information, where the first information indicates to stop monitoring the downlink control channel or indicates that no application-layer feedback information exists, and the third information indicates to monitor the downlink control channel in the second search space or indicates that the application-layer feedback information exists.

The first uplink data and the first contention resolution identity are included in a third message or a random access request message in a random access procedure.

In an optional implementation, the indication information includes at least one of the following:
    ACK information;
    NACK information;
    fallback information, where the fallback information indicates to fall back to a random access procedure; or
    second information or fourth information, where the second information indicates to stop monitoring the downlink control channel or indicates that no application-layer feedback information exists, and the fourth information indicates to monitor the downlink control channel in the second search space or indicates that the application-layer feedback information exists.

The first uplink data is sent on a preconfigured uplink resource.

In an optional implementation, the indication information further includes a first parameter for configuring the second periodicity, or the indication information further includes configuration information of the second search space.

In an optional implementation, the transceiver module is further configured to receive first configuration information and second configuration information from the network device, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

In an optional implementation, the transceiver module is further configured to receive third configuration information from the network device, where the third configuration information is used to configure the first search space and the second search space, and the first search space and the second search space are search spaces of a same type, or a search space identifier corresponding to the first search space is the same as a search space identifier corresponding to the second search space.

In an optional implementation, the transceiver module is further configured to receive fourth configuration information from the network device, where the fourth configuration information is used to configure the third duration, the third duration is an integer multiple of a third time unit or an integer multiple of the length of the first periodicity, and the third time unit is one of a symbol, a slot, a subframe, a frame, or a superframe.

For technical effects brought by the ninth aspect or the optional implementations, refer to the descriptions of the technical effects brought by the third aspect or the corresponding implementations.

According to a tenth aspect, a communication apparatus is provided. For example, the communication apparatus is the foregoing fourth communication apparatus. The fourth communication apparatus is configured to perform the method according to any one of the fourth aspect or the possible implementations. Specifically, the fourth communication apparatus may include modules configured to perform the method according to any one of the fourth aspect or the possible implementations, for example, include a processing module and a transceiver module. For example, the transceiver module may include a sending module and a receiving module. The sending module and the receiving module may be different functional modules, or may be a same functional module but can implement different functions. For example, the fourth communication apparatus is a communication device, or is a chip or another component disposed in the communication device. For example, the communication device is a network device. The following uses an example in which the fourth communication apparatus is the network device. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the fourth communication apparatus is the communication device, the transceiver is implemented, for example, by an antenna, a feeder, and a codec in the communication device. Alternatively, if the fourth communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the tenth aspect, descriptions are provided by using an example in which the fourth communication apparatus is a terminal device and includes the processing module and the transceiver module.

The transceiver module is configured to receive first uplink data from a terminal device, where downlink control information is sent based on a first search space in a third duration after the first uplink data is received, and a periodicity of the first search space is a first periodicity.

The transceiver module is further configured to send indication information to the terminal device in the third duration, where the indication information indicates to stop monitoring a downlink control channel in a second search space, or indicates to monitor a downlink control channel in a second search space, where a periodicity of the second search space is a second periodicity, and a length of the second periodicity is greater than a length of the first periodicity.

Alternatively, the processing module is configured to receive first uplink data from a terminal device through the transceiver module, where downlink control information is sent based on a first search space in a third duration after the first uplink data is received, and a periodicity of the first search space is a first periodicity.

The processing module is further configured to send indication information to the terminal device through the transceiver module in the third duration, where the indication information indicates to stop monitoring a downlink control channel in a second search space, or indicates to monitor a downlink control channel in a second search space, where a periodicity of the second search space is a second periodicity, and a length of the second periodicity is greater than a length of the first periodicity.

In an optional implementation, the indication information includes at least one of the following:
  a MAC CE, where the MAC CE is used to transmit a second contention resolution identity, and the second contention resolution identity matches a first contention resolution identity;
  an RRC message, where the RRC message indicates to fall back to an RRC inactive state or an RRC idle state; or
  first information or third information, where the first information indicates to stop monitoring the downlink control channel or indicates that no application-layer feedback information exists, and the third information indicates to monitor the downlink control channel in the second search space or indicates that the application-layer feedback information exists.

The first uplink data and the first contention resolution identity are included in a third message or a random access request message in a random access procedure.

In an optional implementation, the indication information includes at least one of the following:
  ACK information;
  NACK information;
  fallback information, where the fallback information indicates to fall back to a random access procedure; or second information or fourth information, where the second information indicates to stop monitoring the downlink control channel or indicates that no application-layer feedback information exists, and the fourth information indicates to monitor the downlink control channel in the second search space or indicates that the application-layer feedback information exists.

The first uplink data is sent on a preconfigured uplink resource.

In an optional implementation, the indication information further includes a first parameter for configuring the second periodicity, or the indication information further includes configuration information of the second search space.

In an optional implementation, the transceiver module is further configured to send first configuration information and second configuration information to the terminal device, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

Alternatively, the processing module is further configured to send first configuration information and second configuration information to the terminal device through the transceiver module, where the first configuration information is used to configure the first search space, the second configuration information is used to configure the second search space, and the first search space and the second search space are search spaces of two different types, or a search space identifier corresponding to the first search space is different from a search space identifier corresponding to the second search space.

In an optional implementation, the transceiver module is further configured to send third configuration information to the terminal device, where the third configuration information is used to configure the first search space and the second search space, and the first search space and the second search space are search spaces of a same type, or a search space identifier corresponding to the first search space is the same as a search space identifier corresponding to the second search space.

Alternatively, the processing module is further configured to send third configuration information to the terminal device through the transceiver module, where the third configuration information is used to configure the first search space and the second search space, and the first search space and the second search space are search spaces of a same type, or a search space identifier corresponding to the first search space is the same as a search space identifier corresponding to the second search space.

In an optional implementation, the transceiver module is further configured to send fourth configuration information to the terminal device, where the fourth configuration information is used to configure the third duration, the third duration is an integer multiple of a third time unit or an integer multiple of the length of the first periodicity, and the third time unit is one of a symbol, a slot, a subframe, a frame, or a superframe.

Alternatively, the processing module is further configured to send fourth configuration information to the terminal device through the transceiver module, where the fourth configuration information is used to configure the third duration, the third duration is an integer multiple of a third time unit or an integer multiple of the length of the first periodicity, and the third time unit is one of a symbol, a slot, a subframe, a frame, or a superframe.

For technical effects brought by the tenth aspect or the optional implementations, refer to the descriptions of the technical effects brought by the fourth aspect or the corresponding implementations.

According to an eleventh aspect, a communication apparatus is provided. For example, the communication apparatus is the foregoing fifth communication apparatus. The fifth communication apparatus is configured to perform the method according to any one of the fifth aspect or the possible implementations. Specifically, the fifth communication apparatus may include modules configured to perform the method according to any one of the fifth aspect or the possible implementations, for example, include a processing module and a transceiver module. For example, the transceiver module may include a sending module and a receiving module. The sending module and the receiving module may be different functional modules, or may be a same functional module but can implement different functions. For example, the fifth communication apparatus is a communication device, or is a chip or another component disposed in the communication device. For example, the communication device is a terminal device. The following uses an example in which the fifth communication apparatus is the terminal device. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the fifth communication apparatus is the communication device, the transceiver is implemented, for example, by an antenna, a feeder, and a codec in the communication device. Alternatively, if the fifth communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the eleventh aspect, descriptions are provided by using an example in which the fifth communication apparatus is the terminal device and includes the processing module and the transceiver module.

The transceiver module is configured to receive configuration information from a network device, where the configuration information is used to configure DRX.

The transceiver module is further configured to send first uplink data to the network device.

The processing module is configured to monitor a downlink control channel through the transceiver module in a first duration based on a DRX cycle, where the monitoring of the downlink control channel is stopped in an off duration in the DRX cycle, and the terminal device is in an RRC inactive state.

For technical effects brought by the eleventh aspect or the optional implementations, refer to the descriptions of the technical effects brought by the fifth aspect or the corresponding implementations.

According to a twelfth aspect, a communication apparatus is provided. For example, the communication apparatus is the foregoing sixth communication apparatus. The sixth communication apparatus is configured to perform the method according to any one of the sixth aspect or the possible implementations. Specifically, the sixth communication apparatus may include modules configured to perform the method according to any one of the sixth aspect or the possible implementations, for example, include a processing module and a transceiver module. For example, the transceiver module may include a sending module and a receiving module. The sending module and the receiving module may be different functional modules, or may be a same functional module but can implement different functions. For example, the sixth communication apparatus is a communication device, or is a chip or another component disposed in the communication device. For example, the communication device is a network device. The following uses an example in which the sixth communication apparatus is the network device. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the sixth communication apparatus is the communication device, the transceiver is implemented, for example, by an antenna, a feeder, and a codec in the communication device. Alternatively, if the sixth communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the twelfth aspect, descriptions are provided by using an example in which the sixth communication apparatus is the network device and includes the processing module and the transceiver module.

The transceiver module is configured to send configuration information to a terminal device, where the configuration information is used to configure DRX.

The transceiver module is further configured to receive first uplink data from the terminal device.

The processing module is configured to send downlink control information through the transceiver module in a first duration based on a DRX cycle, where the downlink control information is not sent in an off duration in the DRX cycle, and the terminal device is in an RRC inactive state.

Alternatively, the processing module is configured to send configuration information to a terminal device through the transceiver module, where the configuration information is used to configure DRX.

The processing module is further configured to receive first uplink data from the terminal device through the transceiver module.

The processing module is further configured to send downlink control information through the transceiver module in a first duration based on a DRX cycle, where the downlink control information is not sent in an off duration in the DRX cycle, and the terminal device is in an RRC inactive state.

For technical effects brought by the twelfth aspect or the optional implementations, refer to the descriptions of the technical effects brought by the sixth aspect or the corresponding implementations.

According to a thirteenth aspect, a communication apparatus is provided. For example, the communication apparatus is the foregoing first communication apparatus. The communication apparatus includes a processor. Optionally, the communication apparatus may further include a memory, configured to store computer instructions. The processor and the memory are coupled to each other, to implement the method according to any one of the first aspect or the possible implementations. Alternatively, the first communication apparatus may not include a memory, and the memory may be located outside the first communication apparatus. Optionally, the first communication apparatus may further include a communication interface, configured to communicate with another apparatus or device. The processor, the memory, and the communication interface are coupled to each other, to implement the method according to any one of the first aspect or the possible implementations. For example, when the processor executes the computer instructions stored in the memory, the first communication apparatus is enabled to perform the method according to any one of the first aspect or the possible implementations. For example, the first communication apparatus is a communication device, or is a chip or another component disposed in the communication device. For example, the communication device is a terminal device.

If the first communication apparatus is the communication device, the communication interface is implemented, for example, by a transceiver (or a transmitter and a receiver) in the communication device, and the transceiver is implemented, for example, by an antenna, a feeder, and a codec in the communication device. Alternatively, if the first communication apparatus is the chip disposed in the communication device, the communication interface is, for example, an input/output interface such as an input/output pin of the chip. The communication interface is connected to a radio frequency transceiver component in the communication device, to send and receive information through the radio frequency transceiver component.

According to a fourteenth aspect, a communication apparatus is provided. For example, the communication apparatus is the foregoing second communication apparatus. The communication apparatus includes a processor. Optionally, the communication apparatus may further include a memory, configured to store computer instructions. The processor and the memory are coupled to each other, to implement the method according to any one of the second aspect or the possible implementations. Alternatively, the second communication apparatus may not include a memory, and the memory may be located outside the second communication apparatus. Optionally, the second communication apparatus may further include a communication interface, configured to communicate with another apparatus or device. The processor, the memory, and the communication interface are coupled to each other, to implement the method according to any one of the second aspect or the possible implementations. For example, when the processor executes the computer instructions stored in the memory, the second communication apparatus is enabled to perform the method according to any one of the second aspect or the possible implementations. For example, the second communication apparatus is a communication device, or is a chip or another component disposed in the communication device. For example, the communication device is a network device.

If the second communication apparatus is the communication device, the communication interface is implemented, for example, by a transceiver (or a transmitter and a receiver) in the communication device, and the transceiver is implemented, for example, by an antenna, a feeder, and a codec in the communication device. Alternatively, if the second communication apparatus is the chip disposed in the communication device, the communication interface is, for example, an input/output interface such as an input/output pin of the chip. The communication interface is connected to a radio frequency transceiver component in the communication device, to send and receive information through the radio frequency transceiver component.

According to a fifteenth aspect, a communication apparatus is provided. For example, the communication apparatus is the foregoing third communication apparatus. The communication apparatus includes a processor. Optionally, the communication apparatus may further include a memory, configured to store computer instructions. The processor and the memory are coupled to each other, to implement the method according to any one of the third aspect or the possible implementations. Alternatively, the third communication apparatus may not include a memory, and the memory may be located outside the third communication apparatus. Optionally, the third communication apparatus may further include a communication interface, configured to communicate with another apparatus or device. The processor, the memory, and the communication interface are coupled to each other, to implement the method according to any one of the third aspect or the possible implementations. For example, when the processor executes the computer instructions stored in the memory, the third communication apparatus is enabled to perform the method according to any one of the third aspect or the possible implementations. For example, the third communication apparatus is a communication device, or is a chip or another component disposed in the communication device. For example, the communication device is a terminal device.

If the third communication apparatus is the communication device, the communication interface is implemented, for example, by a transceiver (or a transmitter and a receiver) in the communication device, and the transceiver is implemented, for example, by an antenna, a feeder, and a codec in the communication device. Alternatively, if the third communication apparatus is the chip disposed in the communication device, the communication interface is, for example, an input/output interface such as an input/output pin of the chip. The communication interface is connected to a radio frequency transceiver component in the communication device, to send and receive information through the radio frequency transceiver component.

According to a sixteenth aspect, a communication apparatus is provided. For example, the communication apparatus is the foregoing fourth communication apparatus. The communication apparatus includes a processor. Optionally, the communication apparatus may further include a memory, configured to store computer instructions. The processor and the memory are coupled to each other, to implement the method according to any one of the fourth aspect or the possible implementations. Alternatively, the fourth communication apparatus may not include a memory, and the memory may be located outside the fourth communication apparatus. Optionally, the fourth communication apparatus may further include a communication interface, configured to communicate with another apparatus or device. The processor, the memory, and the communication interface are coupled to each other, to implement the method according to any one of the fourth aspect or the possible implementations. For example, when the processor executes the computer instructions stored in the memory, the fourth communication apparatus is enabled to perform the method according to any one of the fourth aspect or the possible implementations. For example, the fourth communication apparatus is a communication device, or is a chip or another component disposed in the communication device. For example, the communication device is a network device.

If the fourth communication apparatus is the communication device, the communication interface is implemented, for example, by a transceiver (or a transmitter and a receiver) in the communication device, and the transceiver is implemented, for example, by an antenna, a feeder, and a codec in the communication device. Alternatively, if the fourth communication apparatus is the chip disposed in the communication device, the communication interface is, for example, an input/output interface such as an input/output pin of the chip. The communication interface is connected to a radio frequency transceiver component in the communication device, to send and receive information through the radio frequency transceiver component.

According to a seventeenth aspect, a communication apparatus is provided. For example, the communication apparatus is the foregoing fifth communication apparatus. The communication apparatus includes a processor. Optionally, the communication apparatus may further include a memory, configured to store computer instructions. The processor and the memory are coupled to each other, to implement the method according to any one of the fifth aspect or the possible implementations. Alternatively, the fifth communication apparatus may not include a memory, and the memory may be located outside the fifth communication apparatus. Optionally, the fifth communication apparatus may further include a communication interface, configured to communicate with another apparatus or device. The processor, the memory, and the communication interface are coupled to each other, to implement the method according to any one of the fifth aspect or the possible implementations. For example, when the processor executes the computer instructions stored in the memory, the fifth communication apparatus is enabled to perform the method according to any one of the fifth aspect or the possible implementations. For example, the fifth communication apparatus is a communication device, or is a chip or another component disposed in the communication device. For example, the communication device is a terminal device.

If the fifth communication apparatus is the communication device, the communication interface is implemented, for example, by a transceiver (or a transmitter and a receiver) in the communication device, and the transceiver is implemented, for example, by an antenna, a feeder, and a codec in the communication device. Alternatively, if the fifth communication apparatus is the chip disposed in the communication device, the communication interface is, for example, an input/output interface such as an input/output pin of the chip. The communication interface is connected to a radio frequency transceiver component in the communication device, to send and receive information through the radio frequency transceiver component.

According to an eighteenth aspect, a communication apparatus is provided. For example, the communication apparatus is the foregoing sixth communication apparatus. The communication apparatus includes a processor. Optionally, the communication apparatus may further include a memory, configured to store computer instructions. The processor and the memory are coupled to each other, to implement the method according to any one of the sixth aspect or the possible implementations. Alternatively, the sixth communication apparatus may not include a memory, and the memory may be located outside the sixth communication apparatus. Optionally, the sixth communication apparatus may further include a communication interface, configured to communicate with another apparatus or device. The processor, the memory, and the communication interface are coupled to each other, to implement the method according to any one of the sixth aspect or the possible implementations. For example, when the processor executes the computer instructions stored in the memory, the sixth communication apparatus is enabled to perform the method according to any one of the sixth aspect or the possible implementations. For example, the sixth communication apparatus is a communication device, or is a chip or another component disposed in the communication device. For example, the communication device is a network device.

If the sixth communication apparatus is the communication device, the communication interface is implemented, for example, by a transceiver (or a transmitter and a receiver) in the communication device, and the transceiver is implemented, for example, by an antenna, a feeder, and a codec in the communication device. Alternatively, if the sixth communication apparatus is the chip disposed in the communication device, the communication interface is, for example, an input/output interface such as an input/output pin of the chip. The communication interface is connected to a radio frequency transceiver component in the communication device, to send and receive information through the radio frequency transceiver component.

According to a nineteenth aspect, a chip is provided. The chip includes a processor and a communication interface, and the processor is coupled to the communication interface, to implement the method according to any one of the first aspect or the optional implementations.

Optionally, the chip may further include a memory. For example, the processor may read and execute a software program stored in the memory, to implement the method according to any one of the first aspect or the optional implementations. Alternatively, the memory may not be included in the chip, but is located outside the chip. This is equivalent to that the processor may read and execute a software program stored in an external memory, to implement the method according to any one of the first aspect or the optional implementations.

According to a twentieth aspect, a chip is provided. The chip includes a processor and a communication interface, and the processor is coupled to the communication interface, to implement the method according to any one of the second aspect or the optional implementations.

Optionally, the chip may further include a memory. For example, the processor may read and execute a software program stored in the memory, to implement the method according to any one of the second aspect or the optional implementations. Alternatively, the memory may not be included in the chip, but is located outside the chip. This is equivalent to that the processor may read and execute a software program stored in an external memory, to implement the method according to any one of the second aspect or the optional implementations.

According to a twenty-first aspect, a chip is provided. The chip includes a processor and a communication interface, and the processor is coupled to the communication interface, to implement the method according to any one of the third aspect or the optional implementations.

Optionally, the chip may further include a memory. For example, the processor may read and execute a software program stored in the memory, to implement the method according to any one of the third aspect or the optional implementations. Alternatively, the memory may not be included in the chip, but is located outside the chip. This is equivalent to that the processor may read and execute a software program stored in an external memory, to implement the method according to any one of the third aspect or the optional implementations.

According to a twenty-second aspect, a chip is provided. The chip includes a processor and a communication interface, and the processor is coupled to the communication interface, to implement the method according to any one of the fourth aspect or the optional implementations.

Optionally, the chip may further include a memory. For example, the processor may read and execute a software program stored in the memory, to implement the method according to any one of the fourth aspect or the optional implementations. Alternatively, the memory may not be included in the chip, but is located outside the chip. This is equivalent to that the processor may read and execute a software program stored in an external memory, to implement the method according to any one of the fourth aspect or the optional implementations.

According to a twenty-third aspect, a chip is provided. The chip includes a processor and a communication interface, and the processor is coupled to the communication interface, to implement the method according to any one of the fifth aspect or the optional implementations.

Optionally, the chip may further include a memory. For example, the processor may read and execute a software program stored in the memory, to implement the method according to any one of the fifth aspect or the optional implementations. Alternatively, the memory may not be included in the chip, but is located outside the chip. This is equivalent to that the processor may read and execute a software program stored in an external memory, to implement the method according to any one of the fifth aspect or the optional implementations.

According to a twenty-fourth aspect, a chip is provided. The chip includes a processor and a communication interface, and the processor is coupled to the communication interface, to implement the method according to any one of the sixth aspect or the optional implementations.

Optionally, the chip may further include a memory. For example, the processor may read and execute a software program stored in the memory, to implement the method according to any one of the sixth aspect or the optional implementations. Alternatively, the memory may not be included in the chip, but is located outside the chip. This is equivalent to that the processor may read and execute a software program stored in an external memory, to implement the method according to any one of the sixth aspect or the optional implementations.

According to a twenty-sixth aspect, a first communication system is provided. The communication system includes the communication apparatus in the seventh aspect, the communication apparatus in the thirteenth aspect, or the communication apparatus in the nineteenth aspect, and includes the communication apparatus in the eighth aspect, the communication apparatus in the fourteenth aspect, or the communication apparatus in the twentieth aspect.

According to a twenty-seventh aspect, a second communication system is provided. The communication system includes the communication apparatus in the ninth aspect, the communication apparatus in the fifteenth aspect, or the communication apparatus in the twenty-first aspect, and includes the communication apparatus in the tenth aspect, the communication apparatus in the sixteenth aspect, or the communication apparatus in the twenty-second aspect.

According to a twenty-eighth aspect, a third communication system is provided. The communication system includes the communication apparatus in the eleventh aspect, the communication apparatus in the seventeenth aspect, or the communication apparatus in the twenty-third aspect, and includes the communication apparatus in the twelfth aspect, the communication apparatus in the eighteenth aspect, or the communication apparatus in the twenty-fourth aspect.

According to a twenty-ninth aspect, a computer-readable storage medium is provided. The computer-readable storage medium is configured to store computer instructions. When the computer instructions are run on a computer, the computer is enabled to perform the method according to any one of the first aspect or the possible implementations.

According to a thirtieth aspect, a computer-readable storage medium is provided. The computer-readable storage medium is configured to store computer instructions. When the computer instructions are run on a computer, the computer is enabled to perform the method according to any one of the second aspect or the possible implementations.

According to a thirty-first aspect, a computer-readable storage medium is provided. The computer-readable storage medium is configured to store computer instructions. When the computer instructions are run on a computer, the computer is enabled to perform the method according to any one of the third aspect or the possible implementations.

According to a thirty-second aspect, a computer-readable storage medium is provided. The computer-readable storage medium is configured to store computer instructions. When the computer instructions are run on a computer, the computer is enabled to perform the method according to any one of the fourth aspect or the possible implementations.

According to a thirty-third aspect, a computer-readable storage medium is provided. The computer-readable storage medium is configured to store computer instructions. When the computer instructions are run on a computer, the computer is enabled to perform the method according to any one of the fifth aspect or the possible implementations.

According to a thirty-fourth aspect, a computer-readable storage medium is provided. The computer-readable storage medium is configured to store computer instructions. When the computer instructions are run on a computer, the computer is enabled to perform the method according to any one of the sixth aspect or the possible implementations.

According to a thirty-fifth aspect, a computer program product including instructions is provided. The computer program product is configured to store computer instructions. When the computer instructions are run on a computer, the computer is enabled to perform the method according to any one of the first aspect or the possible implementations.

According to a thirty-sixth aspect, a computer program product including instructions is provided. The computer program product is configured to store computer instructions. When the computer instructions are run on a computer, the computer is enabled to perform the method according to any one of the second aspect or the possible implementations.

According to a thirty-seventh aspect, a computer program product including instructions is provided. The computer program product is configured to store computer instructions. When the computer instructions are run on a computer, the computer is enabled to perform the method according to any one of the third aspect or the possible implementations.

According to a thirty-eighth aspect, a computer program product including instructions is provided. The computer program product is configured to store computer instructions. When the computer instructions are run on a computer, the computer is enabled to perform the method according to any one of the fourth aspect or the possible implementations.

According to a thirty-ninth aspect, a computer program product including instructions is provided. The computer program product is configured to store computer instructions. When the computer instructions are run on a computer, the computer is enabled to perform the method according to any one of the fifth aspect or the possible implementations.

According to a fortieth aspect, a computer program product including instructions is provided. The computer program product is configured to store computer instructions. When the computer instructions are run on a computer, the computer is enabled to perform the method according to any one of the sixth aspect or the possible implementations.

In embodiments of this application, the second search space with a long periodicity is set, so that the power consumption of monitoring the downlink control channel by the terminal device can be reduced.

DESCRIPTION OF EMBODIMENTS

Figure 1:
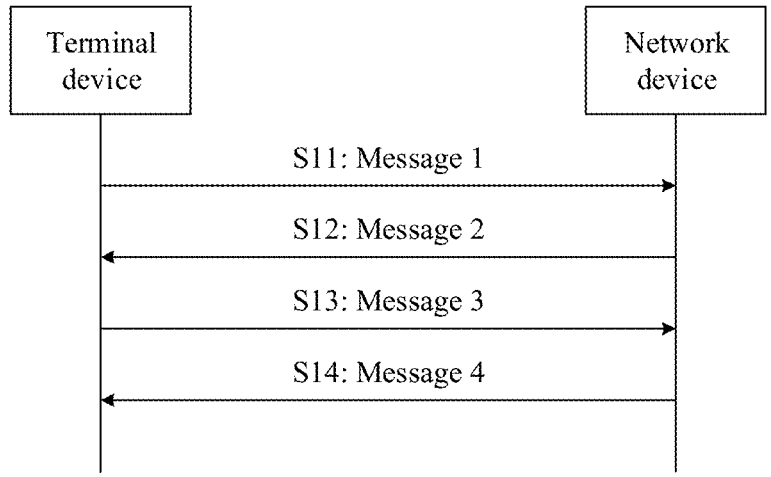
FIG. 1 is a flowchart of a four-step random access procedure.

To make objectives, technical solutions, and advantages of embodiments of this application clearer, the following further describes embodiments of this application in detail with reference to accompanying drawings.

In the following descriptions, some terms in embodiments of this application are described, to help a person skilled in the art have a better understanding.

(1) Terminal device: The terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (radio access network, RAN), and exchange a voice or data with the RAN, or exchange a voice and data with the RAN. The terminal device may include user equipment (user equipment, UE), a wireless terminal device, a mobile terminal device, a device-to-device (device-to-device, D2D) terminal device, a vehicle-to-everything (vehicle-to-everything, V2X) terminal device, a machine-to-machine/machine type communication (machine-to-machine/machine type communication, M2M/MTC) terminal device, an Internet of things (Internet of things, IoT) terminal device, light UE (light UE), a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device is a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device having low power consumption, a device having a limited storage capability, or a device having a limited computing capability. For example, the terminal device includes an information sensing device such as a barcode, radio frequency identification (radio frequency identification, RFID), a sensor, a global positioning system (global positioning system, GPS), or a laser scanner.

By way of example but not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn on the body or integrated into clothes or an accessory of a user. The wearable device not only is a hardware device, but also implements a powerful function through software support, data exchange, and cloud interaction. In a broad sense, wearable intelligent devices include full-featured and large-sized devices that can implement all or some functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be all considered as vehicle-mounted terminal devices. For example, the vehicle-mounted terminal devices are also referred to as on-board units (on-board units, OBUs).

In embodiments of this application, the terminal device may further include a relay (relay). Alternatively, it may be understood that any device that can perform data communication with a base station may be considered as a terminal device.

In embodiments of this application, an apparatus configured to implement functions of the terminal device may be a terminal device, or may be an apparatus, for example, a chip system, that can support the terminal device to implement the functions. The apparatus may be mounted in the terminal device. In embodiments of this application, a chip system may include a chip, or may include a chip and another discrete component. In the technical solutions provided in embodiments of this application, the technical solutions provided in embodiments of this application are described by using an example in which an apparatus configured to implement functions of a terminal is a terminal device.

(2) Network device: The network device includes, for example, an access network (access network, AN) device such as a base station (for example, an access point), and may be a device that is in an access network and that communicates with a wireless terminal device over an air interface through one or more cells. Alternatively, the network device is, for example, a road side unit (road side unit, RSU) in a vehicle-to-everything (vehicle-to-everything, V2X) technology. The base station may be configured to perform mutual conversion between a received over-the-air frame and an IP packet, to serve as a router between the terminal device and a remaining part of the access network, where the remaining part of the access network may include an IP network. The RSU may be a fixed infrastructure entity supporting a V2X application, and may exchange messages with another entity supporting the V2X application. The network device may further coordinate attribute management of the air interface. For example, the network device may include an evolved NodeB (NodeB, eNB, or e-NodeB, evolved NodeB) in a long term evolution (long term evolution, LTE) system or a long term evolution-advanced (long term evolution-advanced, LTE-A) system, may include a next generation NodeB (next generation nodeB, gNB) in a 5th generation mobile communication technology (5th generation, 5G) new radio (new radio, NR) system (also referred to as an NR system for short), or may include a centralized unit (centralized unit, CU) and a distributed unit (distributed unit, DU) in a cloud radio access network (cloud radio access network, Cloud RAN) system. This is not limited in embodiments of this application.

The network device may further include a core network device. The core network device includes, for example, an access and mobility management function (access and mobility management function, AMF) or a user plane function (user plane function, UPF).

Because embodiments of this application mainly relate to an access network device, the network device in the following is an access network device unless otherwise specified.

In embodiments of this application, an apparatus configured to implement functions of the network device may be a network device, or may be an apparatus, for example, a chip system, that can support the network device to implement the functions. The apparatus may be mounted in the network device. In the technical solutions provided in embodiments of this application, the technical solutions provided in embodiments of this application are described by using an example in which an apparatus configured to implement functions of the network device is a network device.

(3) RRC state: The terminal device has three RRC states: an RRC connected state, an RRC idle (idle) state, and an RRC inactive state.

RRC connected state (which may also be referred to as a connected state for short, where in this specification, the "connected state" and the "RRC connected state" are a same concept and may be interchanged): The terminal device has established an RRC connection to a network, and may perform data transmission.

RRC idle state (which may also be referred to as an idle state for short, where in this specification, the "idle state" and the "RRC idle state" are a same concept, and may be interchanged): The terminal device has not established the RRC connection to the network, and a base station does not store a context of the terminal device. If the terminal device needs to enter the RRC connected state from the RRC idle state, the terminal device needs to initiate an RRC connection establishment process.

RRC inactive state (which may also be referred to as an inactive state for short, where in this specification, a "deactivated state", the "deactivated state", the "inactive state", the "RRC inactive state", an "RRC deactivated state", and the like are a same concept and may be interchanged): The terminal device previously enters the RRC connected state on an anchor base station, and then the anchor base station releases an RRC connection. However, the anchor base station stores the context of the terminal device. If the terminal device needs to re-enter the RRC connected state from the RRC inactive state, the terminal device needs to initiate an RRC connection resume process (or referred to as an RRC connection reestablishment process) on a base station on which the terminal device currently camps. Because the terminal device may be in a moving state, the base station on which the terminal device currently camps and the anchor base station of the terminal device may be a same base station or different base stations. Compared with the RRC connection establishment process, the RRC connection resume process has a shorter latency and smaller signaling overheads. However, the base station needs to store the context of the terminal device, causing storage overheads of the base station.

(4) Search space (search space, SS): The search space may also be referred to as a search space set (search space set, SS set) or a downlink control channel search space set (PDCCH search space set, PDCCH SS set). In this specification, for ease of description, the search space, the search space set, or the downlink control channel search space set is simplified as the search space. The search space includes a monitoring periodicity and a specific time domain symbol occasion in a specific slot in the periodicity, and indicates a channel location in time domain. The search space includes one or more PDCCH candidates. The PDCCH candidate is used to carry downlink control information. Time domain scheduling in an NR system is more flexible than that in an LTE system. The NR system supports flexible scheduling of a plurality of symbol lengths in one slot. For example, a transmission time interval (transmission time interval, TTI) may be two time domain symbols or 14 time domain symbols. The SS is used to configure a monitoring periodicity of a channel, and the channel may be received in combination with the SS and a CORESET. For example, if the SS is configured as five slots, the terminal device searches for the channel in a corresponding CORESET every five slots. In embodiments of this application, "sending or receiving a channel based on a search space" may be understood as sending or receiving the channel in the search space.

(5) Search space type: Six search space types (types) are defined in the NR system:

Type0-PDCCH common search space (common search space, CSS): The terminal device may monitor one or more PDCCH candidates in a search space of this type, the one or more PDCCH candidates may carry DCI for scheduling a system information block 1 (system information block 1, SIB1), and a cyclic redundancy check (cyclic redundancy check, CRC) of the DCI is scrambled by using a system information radio network temporary identifier (system information radio network temporary identifier, SI-RNTI).

Type0A-PDCCH CSS: The terminal device may monitor one or more PDCCH candidates in a search space of this type, the one or more PDCCH candidates may carry DCI for scheduling system information (system information, SI) other than the SIB1, and a CRC of the DCI is scrambled by using the SI-RNTI.

Type1-PDCCH CSS: The terminal device may monitor one or more PDCCH candidates in a search space of this type, the one or more PDCCH candidates may carry DCI for scheduling random access-related uplink or downlink transmission, and a CRC of the DCI is scrambled by using a random access RNTI (random access RNTI, RA-RNTI) or a temporary cell radio network temporary identifier (temporary cell radio network temporary identifier, TC-RNTI).

Type2-PDCCH CSS: The terminal device may monitor one or more PDCCH candidates in a search space of this type, the one or more PDCCH candidates may carry DCI for scheduling paging-related transmission, and a CRC of the DCI is scrambled by using a paging RNTI (paging RNTI, P-RNTI).

Type3-PDCCH CSS: The terminal device may monitor one or more PDCCH candidates in a search space of this type, the one or more PDCCH candidates may carry DCI for scheduling group control command-related transmission, and a CRC of the DCI is scrambled by using an interruption RNTI (interruption RNTI, INT-RNTI), a slot format indicator-RNTI (slot format indicator-RNTI, SFI-RNTI), a transmit power control (transmit power control, TPC) physical uplink shared channel (physical uplink shared channel, PUSCH) RNTI (transmit power control PUSCH RNTI, TPC-PUSCH-RNTI), a transmit power control physical uplink control channel (physical uplink control channel, PUCCH)-RNTI (transmit power control PUCCH RNTI, TPC-PUCCH-RNTI), a transmit power control sounding reference signal (sounding reference signal, SRS) RNTI (transmit power control RNTI, TPC-SRS-RNTI), a cell RNTI (cell RNTI, C-RNTI), a modulation and coding scheme cell RNTI (modulation and coding scheme cell RNTI, MCS-C-RNTI), or a configured scheduling radio network temporary identifier (configured scheduling RNTI, CS-RNTI).

UE-specific search space (UE-specific search space, USS): The terminal device may monitor one or more PDCCH candidates in a search space of this type, the one or more PDCCH candidates may carry DCI for scheduling unicast-related transmission, and a CRC of the DCI is scrambled by using a C-RNTI, an MCS-C-RNTI, a semi-persistent channel state information RNTI (semi-persistent channel state information RNTI, SP-CSI-RNTI), or a CS-RNTI.

(6) "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise stated, in embodiments of this application, ordinal numbers such as "first" and "second" are intended to distinguish between a plurality of objects, and not intended to limit an order, a time sequence, a priority, or importance of the plurality of objects. For example, first information and second information are merely intended to distinguish between different signaling, but do not indicate that the two types of information are different in content, priorities, a sending sequence, importance, or the like.

The foregoing describes some concepts in embodiments of this application. The following describes technical features in embodiments of this application.

The NR system supports a terminal device in an RRC inactive state. For a terminal device that infrequently performs data transmission, a network device usually enables the terminal device to be in the RRC inactive state. Before release (Rel)-16, the terminal device in the RRC inactive state is not allowed to perform data transmission. Therefore, for any downlink (MT) data and uplink (MO) data, the terminal device needs to resume an RRC connection to the network device, that is, the terminal device needs to be switched to an RRC connected state, to perform data transmission. As a result, an RRC connection is established for each data transmission and then released, and the terminal device enters the RRC inactive state. For a small data packet that is infrequently transmitted, unnecessary power consumption and signaling overheads are caused. Therefore, for this scenario, the mobile communication standards organization 3rd generation partnership project (3rd generation partnership project, 3GPP) further proposes that an NR system of Rel-17 can allow the terminal device in the RRC inactive state to transmit a small data packet.

For example, scenarios in which a small amount of data is infrequently transmitted include the following:

smartphone applications:

data from instant messaging services (for example, WhatsApp, QQ, or WeChat);

heart-beat/keep-alive data from instant messaging (instant messaging, IM)/email clients or other applications; and push notifications from various applications; and non-smartphone applications:

data (for example, periodic positioning information) from wearable devices;

sensors (for example, industrial wireless sensor networks transmitting temperature or pressure readings periodically or in an event triggered manner); and smart meters and smart meter networks sending periodic meter readings.

For UE in the inactive state, when an uplink service arrives, the UE needs to first perform a random access procedure to enter the connected state, and then perform data transmission. If the uplink service of the UE is a small packet, a complete access procedure needs to be performed to transmit a small amount of data. This causes large signaling overheads and power consumption of the UE. Therefore, some optimization solutions for uplink small packet transmission performed in the inactive state may be considered.

Currently, there are the following three optimization solutions:

Solution 1: A message 3 (Msg3) in a four-step random access procedure includes uplink data.

Solution 2: A message A (MsgA) in a two-step random access procedure includes uplink data.

Solution 3: Uplink data is not sent in a random access procedure, but is sent in an uplink grant-free transmission mode.

As the random access procedure is mentioned above, the following briefly describes the random access procedure.

Random access procedures in the NR system are mainly classified into two types: the four-step random access procedure (which may also be referred to as a four-step (step) random access channel (random access channel, RACH) for short) and the two-step random access procedure (which may also be referred to as a two-step RACH for short).

FIG. 1 is a flowchart of a four-step random access procedure.

S11: A terminal device sends a message 1 (Msg1) to a network device, and the network device receives the Msg1 from the terminal device, where the Msg1 is a random access preamble sequence (random access preamble).

The random access preamble sent by the terminal device may be randomly selected from an available preamble set.

S12: The network device sends a message 2 (Msg2) to the terminal device, and the terminal device receives the Msg2 from the network device, where the Msg2 is a random access response (random access response) message.

Before sending the Msg2 to the terminal device, the network device first sends a PDCCH to the terminal device. For example, the PDCCH is referred to as a PDCCH 1, and the PDCCH 1 is used to schedule the Msg2. After receiving the PDCCH 1 from the network device, the terminal device receives the Msg2 from the network device based on the scheduling by the PDCCH 1.

S13: The terminal device sends a message 3 (Msg3) to the network device, and the network device receives the Msg3 from the terminal device, where information included in the Msg3 varies based on different cases.

Before the terminal device sends the Msg3 to the network device, the network device first sends a PDCCH to the terminal device. For example, the PDCCH is referred to as a PDCCH 2, and the PDCCH 2 is used to schedule the Msg3. After receiving the PDCCH 2 from the network device, the terminal device sends the Msg3 to the network device based on the scheduling by the PDCCH 2.

S14: The network device sends a message 4 (Msg4) to the terminal device, and the terminal device receives the Msg4 from the network device, where information included in the Msg4 varies based on different cases.

Figure 2:
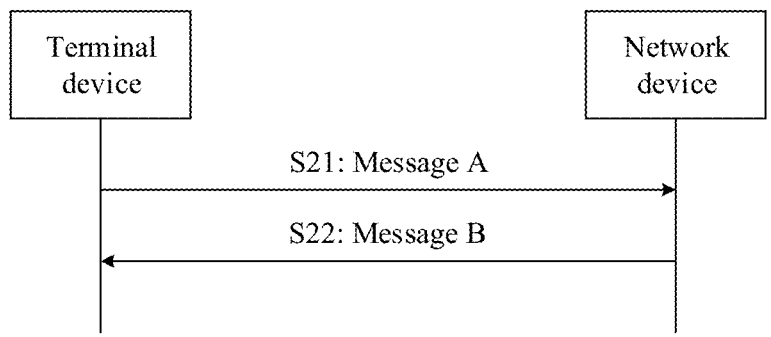
FIG. 2 is a flowchart of a two-step random access procedure.

FIG. 2 is a flowchart of a two-step random access procedure.

S21: A terminal device sends a message A (MsgA) to a network device, and the network device receives the MsgA from the terminal device.

The MsgA is equivalent to the Msg1 and the Msg3 in the four-step random access procedure. This is equivalent to that the terminal device sends the Msg1 and the Msg3 to the network device together. The MsgA may also be referred to as a random access request message.

S22: The network device sends a MsgB to the terminal device, and the terminal device receives the MsgB from the network device.

As uplink grant-free transmission is further described above, the following describes an uplink grant-free transmission technology.

The NR system allows the terminal device to perform uplink grant-free transmission. The uplink grant-free transmission may also be referred to as transmission without dynamic grant (transmission without dynamic grant), uplink transmission with configured grant (uplink transmission with configured grant), transmission in preconfigured physical uplink shared channel (physical uplink shared channel, PUSCH) resources (transmission in preconfigured PUSCH resources), grant-free transmission (grant-free transmission), or the like. In the uplink grant-free transmission technology, the network device preconfigures an uplink grant-free resource for the terminal device. When the terminal device needs to transmit uplink data, the terminal device directly transmits the uplink data on the preconfigured resource in a pre-specified sending manner. After receiving the uplink data from the terminal device, the network device may send feedback information to the terminal device based on a demodulation status of the uplink data.

Figure 3:
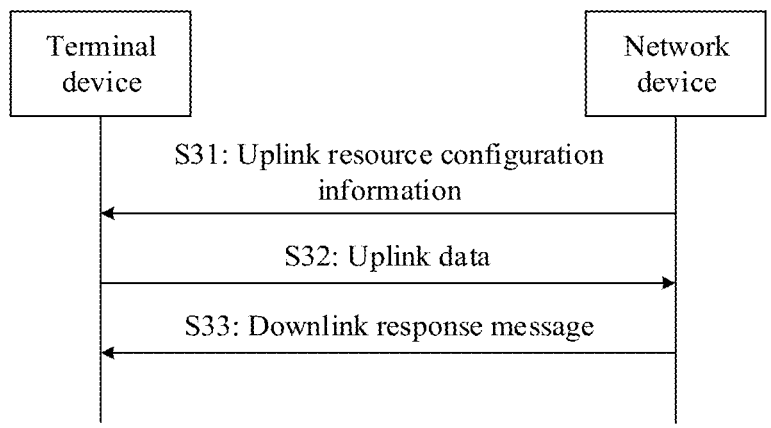
FIG. 3 is a flowchart of an uplink grant-free transmission process.

FIG. 3 is a flowchart of sending uplink data in an uplink grant-free transmission mode.

S31: A network device sends uplink resource configuration information to a terminal device, and the terminal device receives the uplink resource configuration information from the network device.

S32: The terminal device sends uplink data to the network device, and the network device receives the uplink data from the terminal device.

The terminal device may send the uplink data to the network device on an uplink resource configured by using the uplink resource configuration information, and the network device may receive the uplink data from the terminal device on the uplink resource.

The network device preconfigures the uplink resource for the terminal device by using the uplink resource configuration information. When the terminal device needs to transmit the uplink data, the terminal device may transmit the uplink data on the configured uplink resource. This uplink transmission herein may be referred to as a configured grant (configured grant, CG).

S33: The network device sends a downlink response message to the terminal device, and the terminal device receives the downlink response message from the network device.

After receiving the uplink data from the terminal device, the network device may send the downlink response message to the terminal device. For convenience, the uplink transmission herein is denoted as CG transmission, and the downlink response message sent after the uplink transmission is denoted as a CG response (response) message.

It can be learned that for the uplink grant-free transmission, the terminal device does not need to apply to the network device for an uplink transmission resource or wait for the network device to deliver scheduling information for the uplink transmission. This reduces an interaction procedure, and has advantages such as reducing power consumption, a latency, and signaling overheads.

Regardless of which of the foregoing three solutions is used, the terminal device may send the uplink data to the network device. After receiving the uplink data from the terminal device, the network device may send application-layer feedback information to the terminal device, where the application-layer feedback information may be used to acknowledge that the uplink data is completely sent. For example, among the foregoing three solutions, in the solution 1, after receiving the Msg3 from the terminal device, the network device may send the application-layer feedback information to the terminal device by using the Msg4; in the solution 2, after receiving the MsgA from the terminal device, the network device may send the application-layer feedback information to the terminal device by using the MsgB; in the solution 3, after receiving the uplink data from the terminal device, the network device may send the downlink response message to the terminal device, to send the application-layer feedback information to the terminal device by using the downlink response message.

Figure 4:
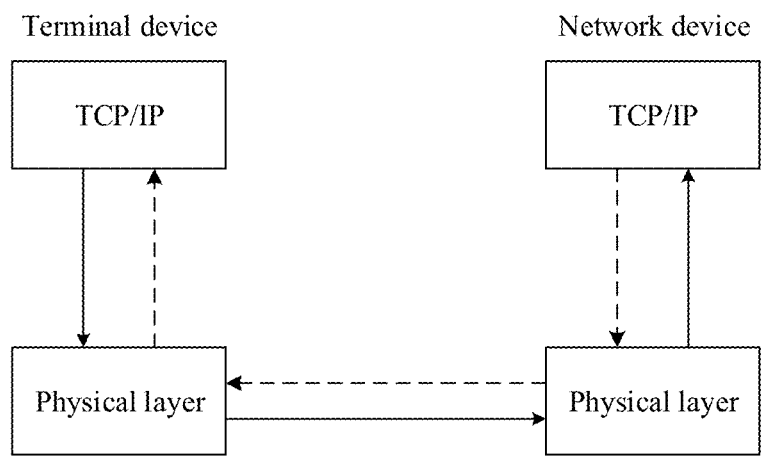
FIG. 4 is a schematic diagram of interaction between protocol layers of a terminal device and a network device.

The application-layer feedback information is described herein. A communication protocol is layered, and a terminal device and a network device interact with each other correspondingly at each layer. Refer to FIG. 4. The network device may include a TCP/IP layer and a physical layer, and the terminal device may also include a TCP/IP layer and a physical layer. Certainly, the network device or the terminal device may further include other layers, and the layers are not enumerated herein one by one. For example, data at the TCP/IP layer on a terminal device side is packaged and sent to the physical layer of the terminal device. After encoding and modulating the received data, the physical layer of the terminal device sends the encoded and modulated data to the physical layer of the network device through an air interface. If the physical layer of the network device successfully receives the data, the physical layer of the network device decodes and demodulates the received data, and sends the decoded and demodulated data to the TCP/IP layer of the network device. For this process, refer to solid arrows in FIG. 4. In this process, if the physical layer of the network device successfully receives the data, the physical layer may send acknowledgment information to the physical layer of the terminal device, to indicate that the data is successfully received. If the physical layer of the network device fails to receive the data, the physical layer may alternatively schedule the physical layer of the terminal device to resend the data. This is a feedback mechanism at the physical layer. There is also a feedback mechanism at the TCP/IP layer. After receiving the data from the physical layer of the network device, the TCP/IP layer of the network device generates TCP/IP-layer feedback information, namely, the application-layer feedback information, and sends the application-layer feedback information to the physical layer of the network device. The physical layer of the network device sends the application-layer feedback information to the physical layer of the terminal device, and then the physical layer of the terminal device sends the application-layer feedback information to the TCP/IP layer of the terminal device. For this process, refer to dashed arrows in FIG. 4. However, if the physical layer of the network device fails to receive the data from the terminal device, the data cannot arrive at the TCP/IP layer of the network device. Therefore, the TCP/IP layer of the network device does not generate the application-layer feedback information.

Figure 5:
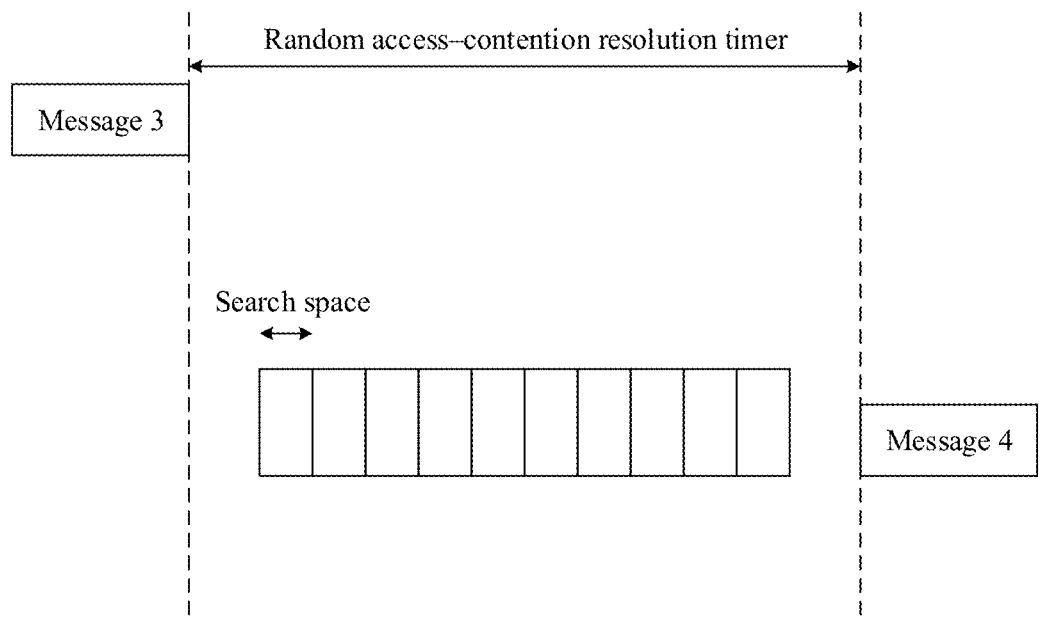
FIG. 5 is a schematic diagram of a duration in which a terminal device monitors a PDCCH in a four-step random access procedure.

A bottom layer (for example, a physical layer, a media access control (media access control, MAC) layer, or an RRC layer) is usually fast (for example, within 5 ms) in feedback, and an application layer is usually slow (where the application layer may require more than 200 ms). Because feedback from the application layer is involved, it takes a long time period from a moment at which the terminal device completes sending of the uplink data (for example, by using the Msg3, the MsgA, or a CG) to a moment at which the terminal device receives the application-layer feedback information from the network device. The terminal device in the RRC inactive state needs to always monitor the PDCCH in the time period. This causes large power consumption of the terminal device. Refer to FIG. 5. A duration in which a terminal device monitors a PDCCH is provided by using a four-step random access procedure as an example. For example, after sending a Msg3, the terminal device starts a timer. The timer is, for example, a random access (ra)-contention resolution timer (ContentionResolutionTimer). Before the ra-ContentionResolutionTimer expires, the terminal device keeps monitoring the PDCCH in a search space, and expects to detect scheduling of retransmission of the Msg3 or scheduling of initial transmission of a Msg4. However, a duration of the ra-ContentionResolutionTimer is usually long, resulting in large power consumption of the terminal device. Ten blocks in FIG. 5 represent 10 periodicities of the search space.

In view of this, the technical solutions in embodiments of this application are provided. In embodiments of this application, after sending first uplink data to a network device, a terminal device monitors a first downlink control channel in a first search space in a first duration, and monitors a second downlink control channel in a second search space in a second duration after the first duration ends. A length of a periodicity of the first search space is less than a length of a periodicity of the first search space. Therefore, the terminal device monitors the second downlink control channel based on the second search space at a low frequency. Therefore, the second search space with a long periodicity is set, so that power consumption of monitoring the downlink control channel by the terminal device can be reduced.

The technical solutions provided in embodiments of this application may be applied to a 4th generation mobile communication technology (4th generation, 4G) system, for example, an LTE system; may be applied to a 5G system, for example, an NR system; or may be applied to a next generation mobile communication system or another similar communication system, provided that an entity can send data to another entity. This is not specifically limited. In addition, an air-interface communication process between a network device and a terminal device is used as an example in a description process of embodiments of this application. Actually, the technical solutions provided in embodiments of this application may also be applied to a sidelink (sidelink, SL), provided that a terminal device can send data to another terminal device. For example, the technical solutions provided in embodiments of this application may be applied to device-to-device (device-to-device, D2D) scenarios such as an NR D2D scenario or an LTE D2D scenario, or may be applied to vehicle-to-everything (vehicle-to-everything, V2X) scenarios such as an NR V2X scenario or an LTE V2X scenario. For example, the technical solutions may be applied to the Internet of vehicles such as V2X, LTE-V, or vehicle-to-vehicle (vehicle-to-vehicle, V2V), or may be applied to fields such as intelligent driving or intelligent connected vehicles.

Figure 6:
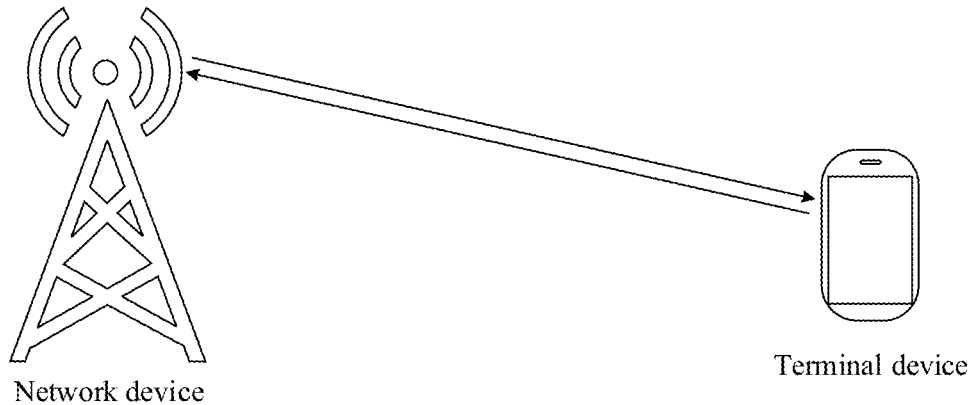
FIG. 6 is a schematic diagram of an application scenario according to an embodiment of this application.

FIG. 6 shows an application scenario according to an embodiment of this application. In FIG. 6, a network device serves a terminal device in a wireless transmission manner. The terminal device may send uplink data to the network device.

The network device in FIG. 6 is, for example, a base station. The base station corresponds to different devices in different systems. For example, in a 4G system, the base station may correspond to a 4G base station, for example, an eNB. In a 5G system, the base station corresponds to a 5G base station, for example, a gNB. Certainly, the technical solutions provided in embodiments of this application may also be applied to a future mobile communication system. Therefore, the network device in FIG. 6 may also correspond to an access network device in the future mobile communication system. FIG. 6 uses an example in which the network device is the base station. Actually, with reference to the foregoing descriptions, the network device may alternatively be an RSU or the like. In addition, FIG. 6 uses an example in which the terminal device is a mobile phone. However, based on the foregoing descriptions of the terminal device, the terminal device in this embodiment of this application is not limited to the mobile phone.

With reference to the accompanying drawings, the following describes methods provided in embodiments of this application. A "downlink control channel" described in embodiments of this application is, for example, a PDCCH, or may be an enhanced physical downlink control channel (enhanced physical downlink control channel, ePDCCH) or another data channel.

Figure 7:
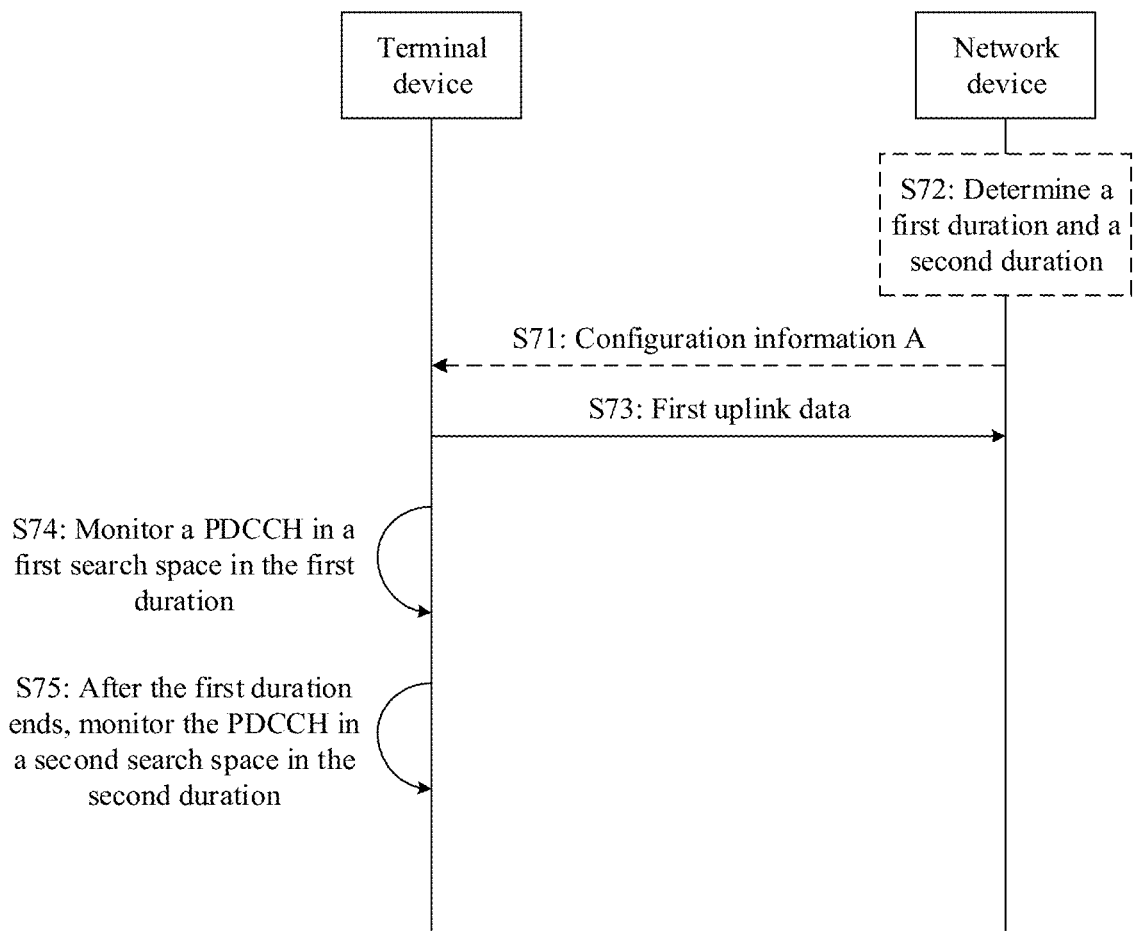
FIG. 7 is a flowchart of a first communication method according to an embodiment of this application.

An embodiment of this application provides a first communication method. FIG. 7 is a flowchart of the method. In the following description process, an example in which the method is applied to the network architecture shown in FIG. 6 is used.

For ease of description, the following uses an example in which the method is performed by a network device and a terminal device. Because the example in which the method is applied to the network architecture shown in FIG. 6 is used in this embodiment, the following network device may be the network device in the network architecture shown in FIG. 6, and the following terminal device may be the terminal device in the network architecture shown in FIG. 6. In addition, in the following descriptions, an example in which a downlink control channel is a PDCCH is used. In other words, the two concepts "PDCCH" and "downlink control channel" may be interchanged below.

S71: The network device sends configuration information A to the terminal device, and the terminal device receives the configuration information A from the network device.

The configuration information A may be used to configure a first search space, or used to configure a first search space and a second search space. Both the first search space and the second search space are used by the terminal device to monitor a PDCCH (monitor PDCCH). It should be noted that, in embodiments of this application, monitoring a PDCCH may also be understood as monitoring a PDCCH candidate (monitor PDCCH candidate). In addition, in embodiments of this application, "monitoring a PDCCH" may also be referred to as "detecting a PDCCH" or the like.

A periodicity of the first search space is referred to as a first periodicity, and a periodicity of the second search space is referred to as a second periodicity. For example, a length of the second periodicity is greater than a length of the first periodicity. For example, the length of the second periodicity may be N times the length of the first periodicity, where N may be an integer greater than or equal to 2. For example, the length of the first periodicity may be equal to a length of a periodicity of a search space for monitoring a PDCCH by a terminal device after the terminal device transmits an uplink small packet in a conventional technology.

The first search space and the second search space may be search spaces of a same type, or may be a same search space. For example, if a search space identifier corresponding to the first search space is the same as a search space identifier corresponding to the second search space, it may indicate that the first search space and the second search space are the same search space. The search space identifier is, for example, a search space identity (search space ID), or may be other information indicating the search space.

If the first search space and the second search space are the search spaces of a same type, or the search space identifier corresponding to the first search space is the same as the search space identifier corresponding to the second search space, the configuration information A may also be referred to as third configuration information. In this case, it may be considered that the third configuration information includes one set of configuration parameters for configuring the first search space and the second search space. A configuration parameter for a search space includes, for example, one or more of a periodicity of the search space, an offset of a start slot for monitoring a PDCCH in the search space, or a duration of the search space. For example, the third configuration information includes one set of configuration parameters. The configuration parameters may include the length of the first periodicity, the length of the second periodicity, an offset of a start slot for monitoring the PDCCH (where the offset is used for both the first search space and the second search space), and a duration (where the duration is used for both the first search space and the second search space). Two types of search spaces may be configured by using one set of configuration parameters, so that a size of the configuration parameters can be reduced, to reduce transmission overheads.

Alternatively, the first search space and the second search space may be search spaces of different types, or may be different search spaces. For example, if a search space identifier corresponding to the first search space is different from a search space identifier corresponding to the second search space, it may indicate that the first search space and the second search space are the different search spaces.

If the first search space and the second search space are the search spaces of different types, or the search space identifier corresponding to the first search space is different from the search space identifier corresponding to the second search space, the configuration information A may include first configuration information, or may include first configuration information and second configuration information, where the first configuration information is used to configure the first search space, and the second configuration information is used to configure the second search space. If the configuration information A includes the first configuration information but does not include the second configuration information, the network device may further send the second configuration information to the terminal device, and the terminal device receives the second configuration information from the network device. This is equivalent to that the first configuration information and the second configuration information are sent by using different messages. For example, the network device may first send the first configuration information and then send the second configuration information, may first send the second configuration information and then send the first configuration information, or may simultaneously send the first configuration information and the second configuration information. If the configuration information A includes the first configuration information and the second configuration information, it is equivalent to that the first configuration information and the second configuration information may be sent by using a same message. Even if the configuration information A includes the first configuration information and the second configuration information, the first configuration information and the second configuration information are independent of each other. This may be understood as follows: The first configuration information includes a set of configuration parameters for configuring the first search space, and the second configuration information includes another set of configuration parameters for configuring the second search space. For example, the configuration parameters included in the first configuration information may include the length of the first periodicity and an offset of a start slot for monitoring the PDCCH in the first search space. For example, the configuration parameters included in the second configuration information may include the length of the second periodicity, an offset of a start slot for monitoring the PDCCH in the second search space, and a duration of the second search space. Two types of search spaces are separately configured by using different configuration parameters, so that a configuration manner can be more definite, to prevent the terminal device from confusing the two types of search spaces.

In an optional implementation, the network device may further send fourth configuration information to the terminal device, where the fourth configuration information may be used to configure a first duration. The terminal device may monitor the PDCCH in the first search space in the first duration. The first duration may be an integer multiple of a first time unit, or may be an integer multiple of the length of the first periodicity. The first time unit is, for example, one of a symbol (symbol), a slot (slot), a subframe (subframe), a frame (frame), or a superframe (superframe).

The fourth configuration information and the configuration information A may be included in a same message. This is equivalent to that the network device may configure the search space and the first duration by using only one message instead of separately configuring the search space and the first duration by using a plurality of pieces of configuration information. This helps reduce the transmission overheads. Alternatively, the fourth configuration information and the configuration information A may be included in different messages. In other words, the network device may separately configure the search space and the first duration by using different messages. In this way, a configuration process can be more definite. If the fourth configuration information and the configuration information A are included in the different messages, the network device may first send the fourth configuration information and then send the configuration information A, may first send the configuration information A and then send the fourth configuration information, or may simultaneously send the fourth configuration information and the configuration information A. Alternatively, the network device may not send the fourth configuration information to the terminal device. For example, the first duration may be specified in a protocol or may be preconfigured on the terminal device. In this case, the network device does not need to interact with the terminal device, to reduce the transmission overheads.

In another optional implementation, the network device may further send fifth configuration information to the terminal device, where the fifth configuration information may be used to configure a second duration. It may be understood that the network device may send the fourth configuration information to the terminal device, and the terminal device receives the fourth configuration information from the network device; the network device may send the fifth configuration information to the terminal device, and the terminal device receives the fifth configuration information from the network device; or the network device may send the fourth configuration information and the fifth configuration information to the terminal device, and the terminal device receives the fourth configuration information and the fifth configuration information from the network device. The terminal device may monitor the PDCCH in the second search space in the second duration. The second duration may be an integer multiple of a second time unit, or may be an integer multiple of the length of the second periodicity. The second time unit is, for example, one of the symbol, the slot, the subframe, the frame, or the superframe. The first time unit and the second time unit may be time units of a same type, for example, are both the symbols or slots. Alternatively, the first time unit and the second time unit may be time units of different types. For example, the first time unit is the symbol, and the second time unit is the subframe. The first duration is a duration provided in this embodiment of this application, the second duration is, for example, the duration of the ra-ContentionResolutionTimer described above, and a start time location of the second duration is the same as a start time location of the ra-ContentionResolutionTimer described above. In this case, the first duration may be less than or equal to the second duration.

The fifth configuration information and the configuration information A may be included in a same message. This is equivalent to that the network device may configure the search space and the second duration by using only one message instead of separately configuring the search space and the second duration by using a plurality of pieces of configuration information. This helps reduce the transmission overheads. Alternatively, the fifth configuration information and the configuration information A may be included in different messages. In other words, the network device may separately configure the search space and the second duration by using different messages. In this way, a configuration process can be more definite. If the fifth configuration information and the configuration information A are included in the different messages, the network device may first send the fifth configuration information and then send the configuration information A, may first send the configuration information A and then send the fifth configuration information, or may simultaneously send the fifth configuration information and the configuration information A. In addition, if the network device sends both the fourth configuration information and the fifth configuration information, the fifth configuration information and the fourth configuration information may be included in a same message. This is equivalent to that the network device may configure both the first duration and the second duration by using only one message instead of separately configuring the first duration and the second duration by using a plurality of pieces of configuration information. This helps reduce the transmission overheads. Alternatively, the fifth configuration information and the fourth configuration information may be included in different messages. In other words, the network device may separately configure the first duration and the second duration by using different messages. In this way, a configuration process can be more definite. For example, the fourth configuration information, the fifth configuration information, and the configuration information A may be included in a same message. This is equivalent to that the network device may configure the durations and the search space by using one message. This avoids excessive transmission overheads. Alternatively, the fourth configuration information and the fifth configuration information may be included in one message, and the configuration information A may be included in another message. In other words, the network device separately configures the durations and the search space, to prevent the terminal device from confusing different configuration parameters. Alternatively, the network device may not send the fifth configuration information to the terminal device. For example, the second duration may be specified in a protocol or may be preconfigured on the terminal device. In this case, the network device does not need to interact with the terminal device, to reduce the transmission overheads.

If the network device needs to send the fourth configuration information to the terminal device, the network device first needs to determine the first duration. If the network device needs to send the fifth configuration information to the terminal device, the network device first needs to determine the second duration. Therefore, before the network device sends the fourth configuration information and the fifth configuration information to the terminal device, the method may further include S72: The network device determines the first duration and the second duration. S72 may be performed before or after S71, or may be simultaneously performed with S71. FIG. 7 uses an example in which S72 is performed before S71. The network device may not only determine a length of the first duration and a length of the second duration, but also determine: The first search space is used to send downlink control information in the first duration, the periodicity of the first search space is the first periodicity, the second search space is used to send downlink control information in the second duration after the first duration ends, the periodicity of the second search space is the second periodicity, and the length of the second periodicity is greater than the length of the first periodicity. The downlink control information sent by the network device is carried on the PDCCH. Therefore, the network device sends the downlink control information, and the terminal device monitors the PDCCH. The downlink control information is, for example, the downlink control information (downlink control information, DCI). Certainly, because the first search space and the second search space are configured by the network device, the network device may determine the parameters for the first search space and the second search space.

In a configuration manner in which the network device configures the first duration, configures the second duration, or configures the first duration and the second duration, the network device configures a timer; in another configuration manner, the network device configures a time window. Alternatively, there may be another configuration manner. For example, the network device configures two durations, but does not configure a timer or a time window.

If the network device configures the timer, the first duration is, for example, a duration of the timer (where the timer is not the ra-ContentionResolutionTimer described above), the second duration is the duration of the ra-ContentionResolutionTimer, and the start time location of the second duration is the same as the start time location of the ra-ContentionResolutionTimer described above. In this case, if a current moment is in the first duration, the timer has not expired, in other words, the timer is still running; if a current moment is not in the first duration but in the second duration, the timer has expired, but the ra-ContentionResolutionTimer has not expired, in other words, is still running. Alternatively, if the network device configures the time window, the first duration is, for example, a duration of the time window, a start time location of the first duration is the same as a start time location of the time window, the second duration is the duration of the ra-ContentionResolutionTimer, and the start time location of the second duration is the same as the start time location of the ra-ContentionResolutionTimer described above. In this case, if a current moment is in the first duration, the current moment is still in the time window, that is, the time window has not expired, in other words, is still running; if a current moment is not in the first duration but in the second duration, the current moment is beyond the time window, that is, the time window has expired, but the ra-ContentionResolutionTimer has not expired, in other words, is still running.

Both S71 and S72 are optional steps, and are not necessarily performed. Therefore, S71 and S72 are represented by dashed lines in FIG. 7.

S73: The terminal device sends first uplink data to the network device, and the network device receives the first uplink data from the terminal device.

For example, the terminal device may be in an RRC inactive state, that is, the terminal device in the RRC inactive state may send some small packets to the network device.

The terminal device may send the first uplink data to the network device in any one of the three sending manners described above. For example, the terminal device may initiate a four-step random access procedure to the network device, to include the first uplink data in a Msg3 in the four-step random access procedure. Alternatively, the terminal device may initiate a two-step random access procedure to the network device, to include the first uplink data in a MsgA in the two-step random access procedure. Alternatively, the terminal device may send the first uplink data in an uplink grant-free transmission mode without initiating a random access procedure to the network device, that is, send the first uplink data on a preconfigured uplink resource.

Timing for the first duration may start after the terminal device sends the first uplink data to the network device, when the first uplink data is completely sent, or after T1 time units starting from a transmission end moment of the first uplink data. For example, if the network device configures the first duration by configuring the timer, the terminal device may start the timer after the terminal device sends the first uplink data to the network device, when the first uplink data is completely sent, or after the T1 time units starting from the transmission end moment of the first uplink data. Alternatively, if the network device configures the first duration by configuring the time window, the terminal device may start the time window after the terminal device sends the first uplink data to the network device, when the first uplink data is completely sent, or after the T1 time units starting from the transmission end moment of the first uplink data. T1 is an agreed value or is configured by the network device, is greater than or equal to 0, and may be an integer or a decimal. The time unit herein is, for example, one of the symbol, the slot, the subframe, the frame, or the superframe.

S74: The terminal device monitors the PDCCH in the first search space in the first duration.

For example, the PDCCH monitored by the terminal device in the first search space may also be referred to as a first PDCCH, in other words, the PDCCH sent by the network device in the first search space is referred to as a first PDCCH. Sending the PDCCH by the network device may also be considered as sending the downlink control information (downlink control information, DCI). Therefore, the DCI sent by the network device in the first search space may be referred to as first DCI.

The periodicity of the first search space is the first periodicity. In the first periodicity, not all slots may be used to monitor the PDCCH. Therefore, to monitor the first PDCCH in a first periodicity, the terminal device needs to determine a start time domain position for monitoring the first PDCCH. For example, the start time domain position, determined by the terminal device, for monitoring the first PDCCH may satisfy the following relationship:

$$(n_f \times N_{slot}^{frame,\mu} + n_{s,f,1}^{\mu} - o_s) \bmod k_s = 0 \qquad \text{Formula (1)}$$

$n_f$ represents a frame number, $N_{slot}^{frame,\mu}$ represents a quantity of slots included in one frame when a subcarrier configuration is $\mu$, $o_s$ represents an offset of a start slot for monitoring the first PDCCH in a periodicity, $k_s$ represents the length of the first periodicity, and $n_{s,f,1}^{\mu}$ represents a slot number of the start slot for monitoring the first PDCCH in the first periodicity.

In an NR system, for a mapping relationship between a subcarrier configuration $\mu$ and a subcarrier spacing, refer to Table 1. $\Delta f$ in Table 1 represents the subcarrier spacing.

TABLE 1

| $\mu$ | $\Delta f = 2^{\mu} \cdot 15$ [kHz] | Cyclic prefix (cyclic prefix, CP) |
|---|---|---|
| 0 | 15 | Normal (normal) |
| 1 | 30 | Normal |
| 2 | 60 | Normal, extended (extended) |
| 3 | 120 | Normal |
| 4 | 240 | Normal |

In the NR system, with regard to a quantity of orthogonal frequency division multiplexing (orthogonal frequency division multiplexing, OFDM) symbols in one slot, a quantity of slots in one frame, and a quantity of slots in one subframe, for a normal cyclic prefix, refer to Table 2; for an extended cyclic prefix, refer to Table 3. $N_{symb}^{slot}$ represents the quantity of OFDM symbols in one slot, $N_{slot}^{frame,\mu}$ represents the quantity of slots in one frame, and $N_{slot}^{subframe,\mu}$ represents the quantity of slots in one subframe.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

That the length of the first periodicity is less than the length of the second periodicity indicates: The length of the periodicity of the first search space is short, there is a high probability that the terminal device receives the PDCCH from the network device after sending the first uplink data, and the terminal device monitors the PDCCH in the first search space at a high frequency, to avoid PDCCH miss detection as much as possible, and improve a PDCCH monitoring success rate.

If the terminal device detects, in the first duration, the first PDCCH for scheduling the terminal device (where specifically, the terminal device detects, in the first duration, the first DCI carried on the first PDCCH), and for example, the first PDCCH (or the first DCI carried on the first PDCCH) is used to schedule retransmission of the first uplink data, the terminal device may retransmit the first uplink data based on the scheduling by the first PDCCH (or based on the scheduling by the first DCI carried on the first PDCCH). For example, after retransmitting the first uplink data, the terminal device may further start the timer or the time window again, to continue to perform S74. It can be learned that if the terminal device detects, in the first duration, the first DCI for scheduling the terminal device, S75 does not need to be performed. If the terminal device sends the first uplink data by using the Msg3 in the four-step random access procedure, the first DCI may be used to schedule retransmission of the Msg3, and the terminal device retransmits the Msg3 based on the scheduling by the first DCI, to still include the first uplink data in the retransmitted Msg3. Alternatively, if the terminal device sends the first uplink data by using the MsgA in the two-step random access procedure, the first DCI may be used to schedule retransmission of the MsgA, and the terminal device retransmits the MsgA based on the scheduling by the first DCI, to still include the first uplink data in the retransmitted MsgA. Alternatively, if the terminal device sends the first uplink data in the uplink grant-free transmission mode, the first DCI may be used to schedule the retransmission of the first uplink data, and the terminal device retransmits the first uplink data based on the scheduling by the first DCI.

Alternatively, if the terminal device detects, in the first duration, the first PDCCH for scheduling the terminal device (where specifically, the terminal device detects, in the first duration, the first DCI carried on the first PDCCH), and for example, the first DCI is used to schedule application-layer feedback information for the first uplink data, the terminal device may receive the application-layer feedback information from the network device based on the scheduling by the first DCI, and does not need to perform S75. If the terminal device sends the first uplink data by using the Msg3 in the four-step random access procedure, the first DCI may be used to schedule a Msg4, and the terminal device receives the Msg4 based on the scheduling by the first DCI, where the Msg4 may include the application-layer feedback information. Alternatively, if the terminal device sends the first uplink data by using the MsgA in the two-step random access procedure, the first DCI may be used to schedule a MsgB, and the terminal device receives the MsgB based on the scheduling by the first DCI, where the Msg4 may include the application-layer feedback information. Alternatively, if the terminal device sends the first uplink data in the uplink grant-free transmission mode, the first DCI may be used to schedule a downlink response message, and the terminal device receives the downlink response message from the network device based on the scheduling by the first DCI, where the downlink response message may include the application-layer feedback information.

Alternatively, if the terminal device does not detect, in the first duration, the first DCI for scheduling retransmission of the first uplink data or for scheduling application-layer feedback information for the first uplink data, it means that the network device does not send, to the terminal device in a third duration, the first DCI for scheduling the terminal device to retransmit the first uplink data or receive the application-layer feedback information corresponding to the first uplink data, and the terminal device may continue to perform S75.

S75: After the first duration ends, the terminal device monitors the downlink control channel in the second search space in the second duration.

For example, the PDCCH monitored by the terminal device in the second search space may also be referred to as a second PDCCH, in other words, the PDCCH sent by the network device in the second search space is referred to as a second PDCCH. Sending the PDCCH by the network device may also be considered as sending the DCI. Therefore, the DCI sent by the network device in the second search space may be referred to as second DCI.

The periodicity of the second search space is the second periodicity. In the second periodicity, not all slots may be used to monitor the second PDCCH. Therefore, to monitor the second PDCCH in a second periodicity, the terminal device needs to determine a start time domain position for monitoring the second PDCCH. For example, the start time domain position, determined by the terminal device, for monitoring the second PDCCH may satisfy the following relationship:

$$(n_f \times N_{slot}^{frame,\mu} + n_{s,f,2}^{\mu} - o_s) \mod(k_s \times N) = 0 \qquad \text{Formula (2)}$$

$n_f$ represents a frame number, $N_{slot}^{frame,\mu}$ represents a quantity of slots included in one frame when a subcarrier spacing is $\mu$, $o_s$ represents an offset of a start slot for monitoring the second PDCCH in a periodicity, $k_s$ represents the length of the first periodicity, $k_s \times N$ represents the length of the second periodicity (where an example in which the length of the second periodicity is N times the length of the first periodicity is used herein), and $n_{s,f,2}^{\mu}$ represents a slot number of the start slot for monitoring the second PDCCH in the second periodicity.

That the length of the first periodicity is less than the length of the second periodicity indicates: The length of the second periodicity is long. If the terminal device does not detect the first PDCCH from the network device in the first duration, a frequency of monitoring the second PDCCH in the second duration may be correspondingly reduced, so that the second PDCCH can be monitored, and power consumption of the terminal device can be reduced.

Figure 8:
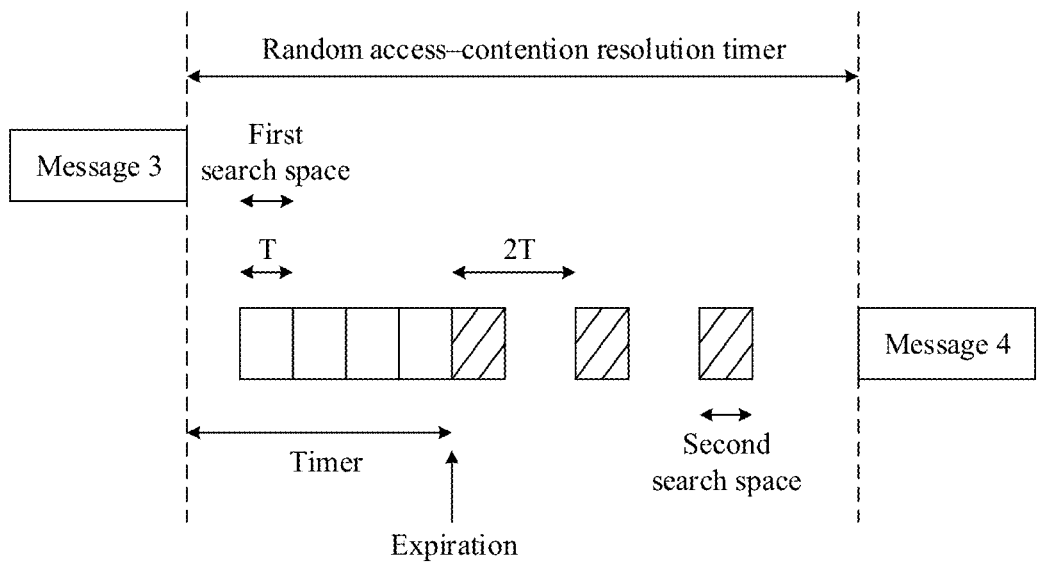
FIG. 8 is a schematic diagram of the embodiment shown in FIG. 7 according to embodiments of this application.

For example, FIG. 8 is a schematic diagram of this embodiment of this application. FIG. 8 uses an example in which a terminal device sends first uplink data by using a Msg3 in a four-step random access procedure, and receives application-layer feedback information by using a Msg4 in the four-step random access procedure, and a network device configures a timer. In FIG. 8, T is a first periodicity, 2T is a second periodicity, slashed boxes represent a second search space, blank boxes represent a first search space, and one box represents one periodicity of a search space. A duration of the timer is a first duration, and a start time location of the timer is a start time location of the first duration. Before the timer expires, the terminal device monitors a first PDCCH in the first search space; after the timer expires, the terminal device monitors a second PDCCH in the second search space.

The network device may send the first PDCCH in the first duration, and may send the second PDCCH in the second duration. Certainly, if the network device sends the first PDCCH in the first duration, the network device does not need to send the second PDCCH in the second duration. Alternatively, if the network device does not send the first PDCCH in the first duration, the network device may send the second PDCCH in the second duration. Certainly, the network device may not send the PDCCH in the first duration or the second duration. If the network device is to send the first PDCCH in the first duration, the network device may also determine, according to the formula 1, a start slot for sending the first PDCCH in the first periodicity, to start sending the first PDCCH in the start slot. Alternatively, if the network device is to send the second PDCCH in the second duration, the network device may also determine, according to the formula 2, a start slot for sending the second PDCCH in the second periodicity, to start sending the second PDCCH in the start slot. The network device keeps consistent with the terminal device, to improve a success rate of monitoring the second PDCCH by the terminal device.

In an implementation, if the network device sends the first PDCCH in the first duration, the first DCI carried on the sent first PDCCH may be used to schedule the retransmission of the first uplink data. If the terminal device detects the first PDCCH in the first duration, in other words, detects the first DCI in the first duration, the terminal device may retransmit the first uplink data based on the first DCI. A reason is as follows: A bottom layer is fast in feedback. If the network device fails to receive the first uplink data, the network device schedules, through a physical layer, the terminal device to perform retransmission. Owing to a fast feedback speed, the physical layer may complete the feedback in the first duration. As a result, the first DCI sent by the network device in the first duration may be used to schedule the retransmission of the first uplink data. The length of the first periodicity is short, and the terminal device frequently monitors the first PDCCH in the first duration, so that the network device can schedule the terminal device in time as much as possible to perform retransmission, to reduce a transmission latency. If the network device sends the second PDCCH in the second duration, the second DCI carried on the sent second PDCCH may be used to schedule the application-layer feedback information for the first uplink data. If the terminal device detects the second PDCCH in the second duration, in other words, detects the second DCI in the second duration, the terminal device may receive the application-layer feedback information for the first uplink data based on the second DCI. A reason is as follows: An application layer is slow in feedback. If the network device successfully receives the first uplink data, the physical layer of the network device sends the first uplink data to the application layer (for example, a TCP/IP layer) of the network device. The application layer generates the application-layer feedback information, and then the physical layer of the network device sends the application-layer feedback information to the terminal device. This process lasts for a long time period, and the first duration may have ended when the physical layer of the network device sends the application-layer feedback information. As a result, the second DCI sent by the network device in the second duration may be used to schedule the application-layer feedback information for the first uplink data.

Certainly, a duration in which the network device sends DCI and a type of the DCI that is sent are not limited in this embodiment of this application. For example, alternatively, the network device may send, in the first duration, the DCI for scheduling the application-layer feedback information for the first uplink data, or may send, in the second duration, the DCI for scheduling the retransmission of the first uplink data.

In some embodiments of this application, after sending the first uplink data to the network device, the terminal device monitors the first downlink control channel in the first search space in the first duration, and monitors the second downlink control channel in the second search space in the second duration after the first duration ends. The length of the periodicity of the first search space is less than the length of the periodicity of the first search space. Therefore, the terminal device monitors the second downlink control channel based on the second search space at a low frequency. Therefore, the second search space with a long periodicity is set, so that the power consumption of monitoring the downlink control channel by the terminal device can be reduced.

Figure 9:
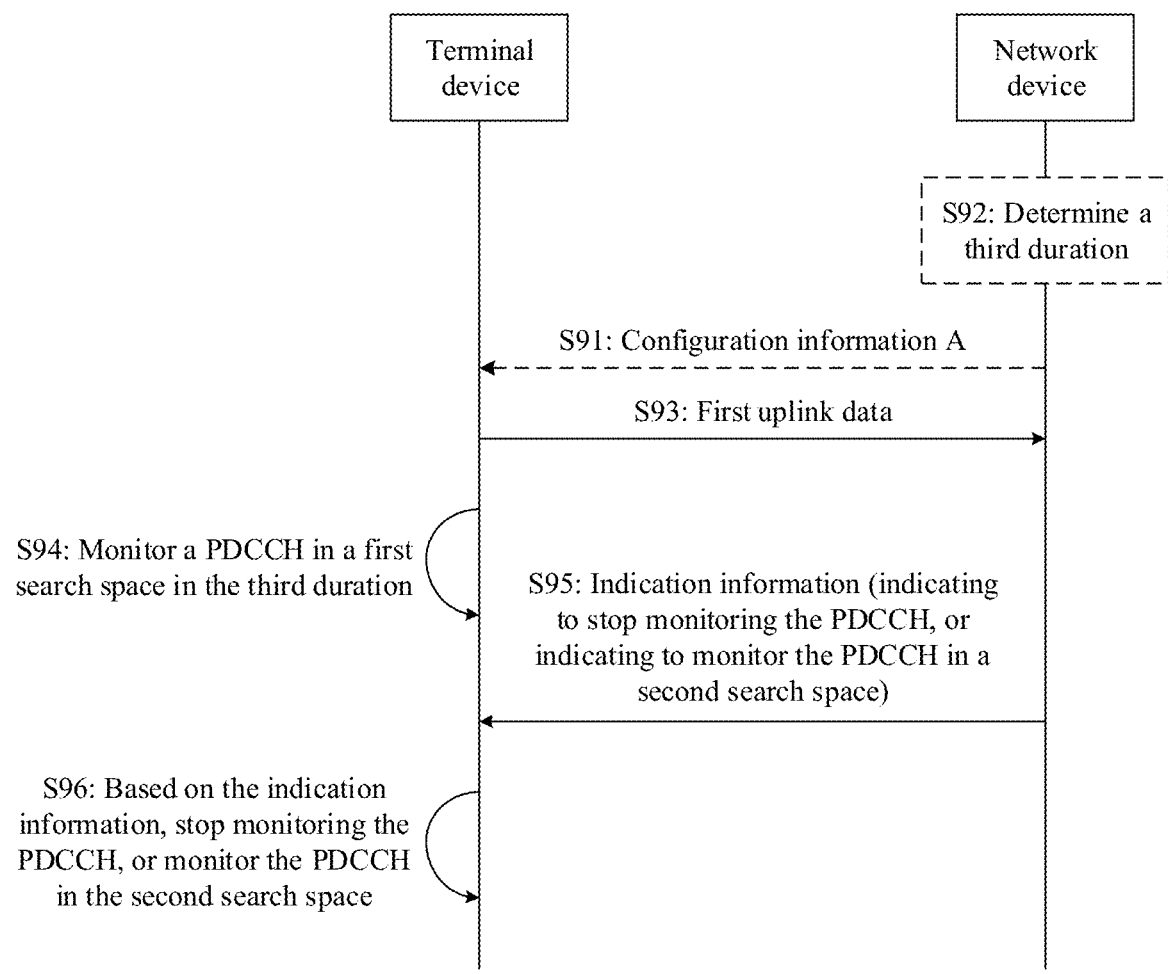
FIG. 9 is a flowchart of a second communication method according to an embodiment of this application.

To resolve the same technical problem, an embodiment of this application provides a second communication method. FIG. 9 is a flowchart of the method. In the following description process, an example in which the method is applied to the network architecture shown in FIG. 6 is used.

For ease of description, the following uses an example in which the method is performed by a network device and a terminal device. Because the example in which the method is applied to the network architecture shown in FIG. 6 is used in this embodiment, the following network device may be the network device in the network architecture shown in FIG. 6, and the following terminal device may be the terminal device in the network architecture shown in FIG. 6. In addition, in the following descriptions, an example in which a downlink control channel is a PDCCH is used. In other words, the two concepts "PDCCH" and "downlink control channel" may be interchanged below.

S91: The network device sends configuration information A to the terminal device, and the terminal device receives the configuration information A from the network device.

The configuration information A may be used to configure a first search space, or used to configure a first search space and a second search space. Both the first search space and the second search space are used by the terminal device to monitor a PDCCH. A periodicity of the first search space is referred to as a first periodicity, and a periodicity of the second search space is referred to as a second periodicity. For example, a length of the second periodicity is greater than a length of the first periodicity. For example, the length of the second periodicity may be N times the length of the first periodicity, where N may be an integer greater than or equal to 2.

For descriptions of the first search space and the second search space and content such as a manner of configuring the first search space or configuring the first search space and the second search space by using the configuration information A, refer to the descriptions of S71 in the embodiment in FIG. 7.

In an optional implementation, the network device may further send fourth configuration information to the terminal device, where the fourth configuration information may be used to configure a third duration. The terminal device may monitor the PDCCH in the first search space in the third duration. The third duration may be an integer multiple of a third time unit, or may be an integer multiple of the length of the first periodicity. The third time unit is, for example, one of a symbol, a slot, a subframe, a frame, or a superframe. For example, the third duration may be a duration of the ra-ContentionResolutionTimer described above, and a start time location of the third duration is the same as a start time location of the ra-ContentionResolutionTimer described above.

The fourth configuration information and the configuration information A may be included in a same message. This is equivalent to that the network device may configure the search space and the third duration by using only one message instead of separately configuring the search space and the third duration by using a plurality of pieces of configuration information. This helps reduce transmission overheads. Alternatively, the fourth configuration information and the configuration information A may be included in different messages. In other words, the network device may separately configure the search space and the third duration by using different messages. In this way, a configuration process can be more definite. If the fourth configuration information and the configuration information A are included in the different messages, the network device may first send the fourth configuration information and then send the configuration information A, may first send the configuration information A and then send the fourth configuration information, or may simultaneously send the fourth configuration information and the configuration information A. Alternatively, the network device may not send the fourth configuration information to the terminal device. For example, the third duration may be specified in a protocol or may be preconfigured on the terminal device. In this case, the network device does not need to interact with the terminal device, to reduce transmission overheads.

If the network device needs to send the fourth configuration information to the terminal device, the network device first needs to determine the third duration. Therefore, before the network device sends the fourth configuration information to the terminal device, the method may further include S92: The network device determines the third duration. S92 may be performed before or after S91, or may be simultaneously performed with S91. FIG. 9 uses an example in which S92 is performed before S91. The network device may not only determine a length of the third duration, but also determine: The first search space is used to send DCI in the third duration, and the periodicity of the first search space is the first periodicity. The DCI sent by the network device is carried on the PDCCH. Therefore, the network device sends the DCI, and the terminal device monitors the PDCCH. Certainly, because the first search space is configured by the network device, the network device may determine a parameter for the first search space.

In a configuration manner in which the network device configures the third duration, the network device configures a timer; in another configuration manner, the network device configures a time window. Alternatively, there may be another configuration manner. For example, the network device configures the third duration, but does not configure a timer or a time window.

If the network device configures the timer, the third duration is, for example, a duration of the timer, the start time location of the third duration is the same as a start time location of the timer, and the timer is, for example, the ra-ContentionResolutionTimer. In this case, if a current moment is in the third duration, the ra-ContentionResolutionTimer has not expired, in other words, the timer is still running. Alternatively, if the network device configures the time window, the third duration is, for example, a duration of the time window, and the start time location of the third duration is the same as a start time location of the time window. In this case, if a current moment is in the third duration, the current moment is still in the time window, the time window has not expired, or the time window is still running.

Both S91 and S92 are optional steps, and are not necessarily performed. Therefore, S91 and S92 are represented by dashed lines in FIG. 9.

S93: The terminal device sends first uplink data to the network device, and the network device receives the first uplink data from the terminal device.

For example, the terminal device may be in an RRC inactive state, that is, the terminal device in the RRC inactive state may send some small packets to the network device.

The terminal device may send the first uplink data to the network device in any one of the three sending manners described above. For example, the terminal device may initiate a four-step random access procedure to the network device, to include the first uplink data in a Msg3 in the four-step random access procedure. Alternatively, the terminal device may initiate a two-step random access procedure to the network device, to include the first uplink data in a MsgA in the two-step random access procedure. Alternatively, the terminal device may send the first uplink data in an uplink grant-free transmission mode without initiating a random access procedure to the network device, that is, send the first uplink data on a preconfigured uplink resource.

Timing for the third duration may start after the terminal device sends the first uplink data to the network device, when the first uplink data is completely sent, or after T2 time units starting from a transmission end moment of the first uplink data. For example, if the network device configures the third duration by configuring the ra-ContentionResolutionTimer, the terminal device may start the ra-ContentionResolutionTimer after the terminal device sends the first uplink data to the network device, when the first uplink data is completely sent, or after the T2 time units starting from the transmission end moment of the first uplink data. Alternatively, if the network device configures the third duration by configuring the time window, the terminal device may start the time window after the terminal device sends the first uplink data to the network device, when the first uplink data is completely sent, or after the T2 time units starting from the transmission end moment of the first uplink data. T2 is an agreed value or is configured by the network device, is greater than or equal to 0, and may be an integer or a decimal. The time unit herein is, for example, one of the symbol, the slot, the subframe, the frame, or the superframe.

S94: The terminal device monitors the PDCCH in the first search space in the third duration.

The periodicity of the first search space is the first periodicity. In the first periodicity, not all slots may be used to monitor the PDCCH. Therefore, to monitor the PDCCH in a first periodicity, the terminal device needs to determine a start time domain position for monitoring the PDCCH. For a relationship satisfied by the start time domain position, determined by the terminal device, for monitoring the PDCCH, refer to the related descriptions of S74 in the embodiment shown in FIG. 7.

If the terminal device detects, in the third duration, the PDCCH for scheduling the terminal device (where specifically, the terminal device detects, in the first duration, the DCI carried on the PDCCH), and for example, the DCI is used to schedule retransmission of the first uplink data, the terminal device may retransmit the first uplink data based on the scheduling by the DCI. For example, after retransmitting the first uplink data, the terminal device may further start the timer or the time window again, to continue to perform S94. It can be learned that if the terminal device detects, in the third duration, the DCI for scheduling the terminal device, S95 does not need to be performed. Similarly, if the network device sends, to the terminal device in the third duration, the DCI for scheduling the retransmission of the first uplink data, the network device receives the first uplink data from the terminal device based on the DCI, and does not perform S95. If the terminal device sends the first uplink data by using the Msg3 in the four-step random access procedure, the DCI may be used to schedule retransmission of the Msg3, and the terminal device retransmits the Msg3 based on the scheduling by the DCI, to include the first uplink data in the retransmitted Msg3. Alternatively, if the terminal device sends the first uplink data by using the MsgA in the two-step random access procedure, the DCI may be used to schedule retransmission of the MsgA, and the terminal device retransmits the MsgA based on the scheduling by the DCI, to include the first uplink data in the retransmitted MsgA. Alternatively, if the terminal device sends the first uplink data in the uplink grant-free transmission mode, the DCI may be used to schedule the retransmission of the first uplink data, and the terminal device retransmits the first uplink data based on the scheduling by the DCI.

Alternatively, if the terminal device detects, in the third duration, the PDCCH for scheduling the terminal device (where specifically, the terminal device detects, in the first duration, the DCI carried on the PDCCH), and for example, the DCI is used to schedule application-layer feedback information for the first uplink data, the terminal device may receive the application-layer feedback information from the network device based on the scheduling by the DCI, and does not need to perform S95. Similarly, if the network device sends, to the terminal device in the third duration, the DCI for scheduling the application-layer feedback information for the first uplink data, the network device sends the application-layer feedback information to the terminal device based on the DCI, and does not perform S95. If the terminal device sends the first uplink data by using the Msg3 in the four-step random access procedure, the DCI may be used to schedule a Msg4, and the terminal device receives the Msg4 based on the scheduling by the DCI, where the Msg4 may include the application-layer feedback information. Alternatively, if the terminal device sends the first uplink data by using the MsgA in the two-step random access procedure, the DCI may be used to schedule a MsgB, and the terminal device receives the MsgB based on the scheduling by the DCI, where the Msg4 may include the application-layer feedback information. Alternatively, if the terminal device sends the first uplink data in the uplink grant-free transmission mode, the DCI may be used to schedule a downlink response message, and the terminal device receives the downlink response message from the network device based on the scheduling by the DCI, where the downlink response message may include the application-layer feedback information.

Alternatively, if the terminal device does not detect, in the third duration, the DCI for scheduling retransmission of the first uplink data or for scheduling application-layer feedback information for the first uplink data, it means that the network device does not send, to the terminal device in the third duration, the DCI for scheduling the retransmission of the first uplink data or for scheduling the application-layer feedback information for the first uplink data, and the terminal device and the network device may continue to perform S95.

S95: The network device sends indication information to the terminal device in the third duration, and the terminal device receives the indication information from the network device in the third duration. The indication information may indicate to stop monitoring the PDCCH, or indicate the terminal device to monitor the PDCCH in the second search space. It should be noted that stopping monitoring the PDCCH herein may be subsequently stopping monitoring the PDCCH in the first search space and the second search space after the indication information is received, or may be subsequently stopping monitoring the PDCCH in the second search space after the indication information is received. A specific case depends on a position in which the network device sends the indication information or a position in which the terminal device receives the information.

An implementation of the indication information is related to a manner in which the terminal device sends the first uplink data, and the following provides descriptions by using examples.

1. The terminal device sends the first uplink data by using the Msg3 in the four-step random access procedure, or sends the first uplink data by using the MsgA in the two-step random access procedure.

In a first case, if the indication information needs to indicate to monitor the PDCCH in the second search space, an implementation of the indication information is: The indication information may include one or more of a media access control control element (MAC CE), an RRC message, or third information. For example, the indication information includes the MAC CE, includes the MAC CE and the third information (where for example, the third information is included in the MAC CE), or includes the RRC message and the third information (where for example, the third information is included in the RRC message). The MAC CE includes a second contention resolution identity, and the second contention resolution identity needs to match a first contention resolution identity. The RRC message may indicate to fall back to the RRC inactive state or an RRC idle state, and the third information may indicate to monitor the PDCCH in the second search space, or indicate that the application-layer feedback information exists. In a possible implementation in which the first contention resolution identity matches the second contention resolution identity, a matching manner is that the first contention resolution identity is the same as the second contention resolution identity. For example, the first contention resolution identity is sent by the terminal device together with the first uplink data. If the terminal device sends the first uplink data by using the Msg3, the Msg3 may include the first contention resolution identity; or if the terminal device sends the first uplink data by using the MsgA, the MsgA may include the first contention resolution identity. That the second contention resolution identity needs to match the first contention resolution identity indicates that the second contention resolution identity included in the MAC CE is used to demonstrate a contention resolution status of the terminal device.

A contention resolution identity may be an identifier uniquely representing the terminal device. For example, the contention resolution identity of the terminal device may be a C-RNTI, or may be an identifier, for example, a serving-temporary mobile subscriber identity (S-TMSI) or a random number, allocated by a core network device to the terminal device. In this case, for example, if the second contention resolution identity included in the MAC CE is the C-RNTI corresponding to the terminal device, and the first contention resolution identity sent by the terminal device together with the first uplink data is also the C-RNTI corresponding to the terminal device, the second contention resolution identity matches the first contention resolution identity. Alternatively, if the second contention resolution identity included in the MAC CE is the S-TMSI corresponding to the terminal device, and the first contention resolution identity sent by the terminal device together with the first uplink data is also the S-TMSI corresponding to the terminal device, the second contention resolution identity matches the first contention resolution identity. Alternatively, if the second contention resolution identity included in the MAC CE is a random number R allocated by the core network device to the terminal device, and the first contention resolution identity sent by the terminal device together with the first uplink data is also the random number R allocated by the core network device to the terminal device, the second contention resolution identity matches the first contention resolution identity.

For example, if the indication information includes the MAC CE (where the MAC CE includes the second contention resolution identity), the terminal device monitors the PDCCH in the second search space. In this case, the indication information may indicate to monitor the PDCCH in the second search space, and actually the terminal device cannot determine whether the network device is to send the application-layer feedback information, and therefore needs to continue to monitor the PDCCH. In this case, it may also be understood that the indication information indicates to change the search space for monitoring the PDCCH, to change a configuration of the search space for monitoring the PDCCH, or to change the periodicity of the search space for monitoring the PDCCH, in other words, indicates to monitor the PDCCH in the second search space. If the indication information does not include the third information, that "the indication information may indicate to monitor the PDCCH in the second search space" may be considered as an implicit indication manner.

For another example, the indication information includes the MAC CE and the third information, or includes the RRC message and the third information. In these two cases, owing to the third information, the terminal device can learn that the PDCCH needs to be monitored in the second search space. Therefore, the terminal device may monitor the PDCCH in the second search space based on the indication information. If the indication information includes the third information, it may be considered that an explicit indication manner is used.

In the foregoing case, the indication information indicates the terminal device to monitor the PDCCH in the second search space. The indication information may alternatively indicate to stop monitoring the PDCCH. In a first case, if the indication information needs to indicate to stop monitoring the PDCCH, an implementation of the indication information is: The indication information may include one or more of a MAC CE, an RRC message, or first information. For example, the indication information includes the MAC CE and the first information (where for example, the indication information is included in the MAC CE), includes the MAC CE, the RRC message, and the first information (where for example, the indication information is included in the MAC CE or the RRC message), or includes the RRC message and the first information (where for example, the indication information is included in the RRC message). The MAC CE includes the second contention resolution identity, and the second contention resolution identity needs to match the first contention resolution identity. The RRC message may indicate the terminal device to fall back to the RRC inactive state or the RRC idle state, and the first information may indicate to stop monitoring the PDCCH, or indicate that no application-layer feedback information exists.

For example, the indication information includes the MAC CE and the RRC message. If the terminal device receives the MAC CE and the RRC message from the network device, it may indicate that the network device is not to send the application-layer feedback information, and therefore the terminal device does not need to continue to monitor the PDCCH. As a result, this case is equivalent to that the indication information indicates to stop monitoring the PDCCH. If the indication information does not include the first information, it may be considered that an implicit indication manner is used.

For another example, the indication information may include the MAC CE and the first information, or include the RRC message and the first information. In these two cases, owing to the first information, the terminal device can learn that monitoring of the PDCCH may be stopped. Therefore, the terminal device may stop, based on the indication information, monitoring the PDCCH. If the indication information includes the first information, it may be considered that an explicit indication manner is used.

For still another example, the indication information may include the MAC CE, the RRC message, and the first information. If the terminal device receives the MAC CE and the RRC message from the network device, it indicates that the network device is not to send the application-layer feedback information. The MAC CE or the RRC message may further include the first information for indicating that no application-layer feedback exists or indicating the terminal device to stop monitoring the PDCCH. This is equivalent to an explicit indication manner, and the terminal device may more definitely learn that a next operation is to stop monitoring the PDCCH.

Optionally, regardless of content indicated by the indication information, if the configuration information A in S91 is used to configure only the first search space instead of the second search space, and if a type of the first search space is the same as a type of the second search space, or a search space identifier corresponding to the first search space is the same as a search space identifier corresponding to the second search space, the indication information may further include a first parameter for configuring the second periodicity, where the second periodicity is the periodicity of the second search space. For example, if the indication information includes the MAC CE, the first parameter may be included in the MAC CE; or if the indication information includes the RRC message, the first parameter may be included in the RRC message. In other words, because the type of the first search space is the same as the type of the second search space, or the search space identifier corresponding to the first search space is the same as the search space identifier corresponding to the second search space, the configuration information A in S91 may be used to configure the first search space and most parameters for the second search space. The periodicities of the first search space and the second search space are parameters causing a difference between the first search space and the second search space. Therefore, the indication information only needs to include the first parameter for configuring the second periodicity.

Alternatively, if the configuration information A in S91 is used to configure only the first search space instead of the second search space, and if a type of the first search space is different from a type of the second search space, or a search space identifier corresponding to the first search space is different from a search space identifier corresponding to the second search space, the indication information may further include configuration information of the second search space. For example, if the indication information includes the MAC CE, the configuration information of the second search space may be included in the MAC CE; or if the indication information includes the RRC message, the configuration information of the second search space may be included in the RRC message. In other words, because the type of the first search space is different from the type of the second search space, or the search space identifier corresponding to the first search space is different from the search space identifier corresponding to the second search space, the configuration information A in S91 can be used to configure only the first search space, and the indication information further needs to include a complete set of configuration parameters for configuring the second search space.

2. The terminal device sends the first uplink data in the uplink grant-free transmission mode.

In a second case, if the indication information needs to indicate to monitor the PDCCH in the second search space, an implementation of the indication information is: The indication information includes one or more of acknowledgment (ACK) information, negative acknowledgment (NACK) information, fallback (fallback) information, or fourth information. For example, the indication information includes the ACK information, includes the NACK information, includes the fallback information, includes the fourth information, includes the ACK information and the fallback information, or includes the NACK information, the fallback information, and the fourth information. For example, the ACK information may be included in the DCI, the MAC CE, or another message. The NACK information may be included in the DCI, the MAC CE, or another message. The fallback information may be included in the DCI, the MAC CE, or another message. The fourth information may be included in the DCI, the MAC CE, or another message. The ACK/NACK information may be physical-layer feedback information for the first uplink data, the fallback information may indicate to fall back to the random access procedure, and the fourth information may indicate to monitor the PDCCH in the second search space, or indicate that the application-layer feedback information exists. If the indication information includes the fourth information, it may be considered that an explicit indication manner is used, so that an indication is more definite. If the indication information does not include the fourth information, it may be considered that an implicit indication manner is used, to help reduce the transmission overheads.

For example, the indication information includes the ACK information. In this case, it may be agreed: If the terminal device receives the indication information from the network device, it indicates that the network device is to send the application-layer feedback information, and therefore the terminal device needs to monitor the PDCCH in the second search space. As a result, this case is equivalent to that the indication information indicates to monitor the PDCCH in the second search space. If the indication information does not include the fourth information, that "the indication information indicates to monitor the PDCCH in the second search space" may be considered as an implicit indication manner.

For another example, the indication information includes the ACK and the fourth information. In this case, owing to the fourth information, the terminal device can learn that the PDCCH needs to be monitored in the second search space. Therefore, the terminal device may monitor the PDCCH in the second search space based on the indication information. If the indication information includes the fourth information, it may be considered that an explicit indication manner is used.

In a second case, if the indication information needs to indicate to stop monitoring the PDCCH, an implementation of the indication information is: The indication information includes one or more of ACK information, NACK information, fallback information, or second information. For example, the indication information includes the ACK information, includes the NACK information, includes the fallback information, includes the second information, includes the ACK information and the fallback information, or includes the NACK information, the fallback information, and the second information. For example, the ACK information may be included in the DCI, the MAC CE, or another message. The NACK information may be included in the DCI, the MAC CE, or another message. The fallback information may be included in the DCI, the MAC CE, or another message. The second information may be included in the DCI, the MAC CE, or another message. The ACK/NACK information may be physical-layer feedback information for the first uplink data, the fallback information may indicate to fall back to the random access procedure, and the second information may indicate the terminal device to stop monitoring the PDCCH, or indicate that no application-layer feedback information exists. If the indication information includes the second information, it may be considered that an explicit indication manner is used, so that an indication is more definite. If the indication information does not include the second information, it may be considered that an implicit indication manner is used, to help reduce the transmission overheads.

For example, the indication information includes the ACK information, includes the NACK information, includes the fallback information, includes the ACK information and the fallback information, or includes the NACK information and the fallback information. In this case, it may be agreed: If the terminal device receives the indication information from the network device, it indicates that the network device is not to send the application-layer feedback information, and therefore the terminal device does not need to monitor the PDCCH in the second search space. As a result, this case is equivalent to that the indication information indicates the terminal device to stop monitoring the PDCCH. If the indication information does not include the fourth information, that "the indication information indicates the terminal device to stop monitoring the PDCCH" may be considered as an implicit indication manner.

For another example, the indication information includes the ACK information and the fourth information, includes the NACK information and the fourth information, includes the fallback information and the fourth information, includes the ACK information, the fallback information, and the fourth information, or includes the NACK information, the fallback information, and the fourth information. In these several cases, owing to the fourth information, the terminal device learns that monitoring of the PDCCH may be stopped. Therefore, the terminal device may stop, based on the indication information, monitoring the PDCCH. If the indication information includes the fourth information, it may be considered that an explicit indication manner is used.

Optionally, regardless of content indicated by the indication information, if the configuration information A in S91 is used to configure only the first search space instead of the second search space, the indication information may be further used to configure the second search space. For a manner of configuring the second search space by using the indication information, refer to the foregoing descriptions.

Figure 10:
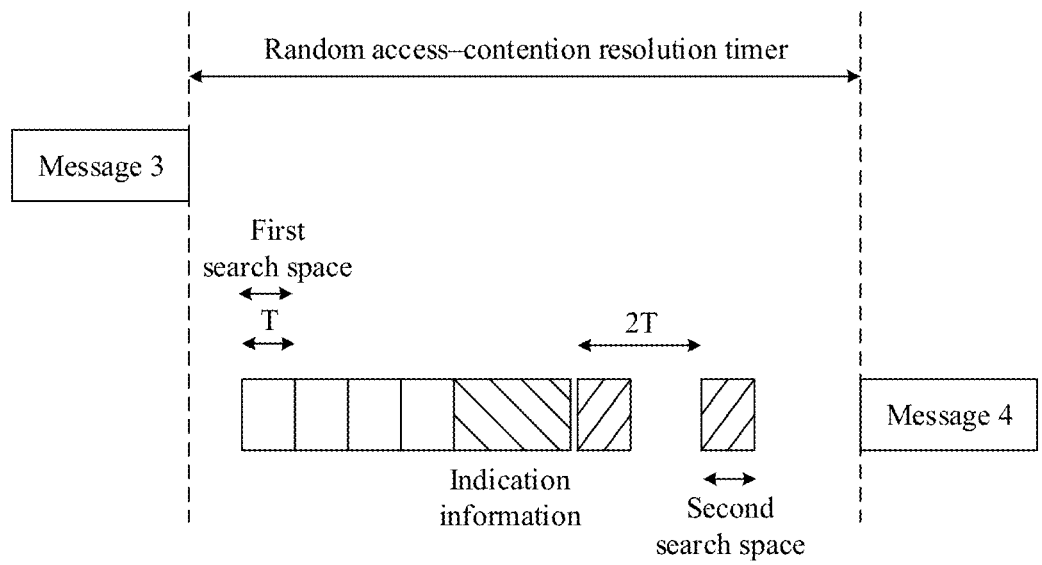
FIG. 10 is a schematic diagram of the embodiment shown in FIG. 9 according to embodiments of this application.

For example, FIG. 10 is a schematic diagram of this embodiment of this application. FIG. 10 uses an example in which a terminal device sends first uplink data by using a Msg3 in a four-step random access procedure, and receives application-layer feedback information by using a Msg4 in the four-step random access procedure, and a network device configures the ra-ContentionResolutionTimer. In FIG. 10, T is a first periodicity, 2T is a second periodicity, a box filled with "/" represents a second search space, a blank box represents a first search space, and a box filled with "\" represents transmission of indication information. Each of the boxes representing the first search space and the second search space represents one periodicity. A duration of the ra-ContentionResolutionTimer is a third duration, and a start time location of the third duration is the same as a start time location of the ra-ContentionResolutionTimer described above. The terminal device monitors a PDCCH in the first search space in the duration of the ra-ContentionResolutionTimer; and after receiving the indication information from the network device, the terminal device stops monitoring the PDCCH.

S96: If the indication information indicates to monitor the PDCCH in the second search space, the terminal device monitors the PDCCH in the second search space; or if the indication information indicates to stop monitoring the PDCCH, the terminal device stops monitoring the PDCCH.

It should be noted that, if the terminal device needs to monitor the PDCCH in the second search space, a current moment is still in the third duration. This is equivalent to that the terminal device monitors the downlink control channel in both the first search space and the second search space in the third duration. This can also be learned from FIG. 10. If the terminal device stops monitoring the PDCCH, the terminal device needs to end the third duration. For example, the third duration may be the duration of the ra-ContentionResolutionTimer configured by the network device, and the start time location of the third duration is the same as the start time location of the ra-ContentionResolutionTimer. That the terminal device ends the third duration should be understood as that the terminal device disables the ra-ContentionResolutionTimer.

If the terminal device monitors the downlink control channel in the second search space, in the second periodicity, not all slots may be used to monitor the PDCCH. Therefore, to monitor the PDCCH in a second periodicity, the terminal device needs to determine a start time domain position for monitoring the PDCCH. For a relationship satisfied by the start time domain position, determined by the terminal device, for monitoring the PDCCH, refer to the related descriptions of S75 in the embodiment shown in FIG. 7.

The network device may send the PDCCH before sending the indication information (where it may also be considered that the indication information is not sent), may send the PDCCH after sending the indication information, or may send the PDCCH but not send the indication information. If the network device is to send the PDCCH before sending the indication information, the network device may determine, according to the formula 1, a start slot for sending the PDCCH in the first periodicity, to start sending the PDCCH in the start slot. Alternatively, if the network device is to send the PDCCH after sending the indication information (where the indication information indicates to monitor the PDCCH in the second search space), the network device may determine, according to the formula 2, a start slot for sending the PDCCH in the second periodicity, to start sending the PDCCH in the start slot. The network device keeps consistent with the terminal device, to improve a success rate of monitoring the PDCCH by the terminal device.

In embodiments of this application, after sending the first uplink data to the network device, the terminal device may monitor the downlink control channel in the first search space. After receiving the indication information, the terminal device monitors the downlink control channel in the second search space. The length of the periodicity of the first search space is less than the length of the periodicity of the first search space. Therefore, the terminal device monitors the downlink control channel based on the second search space at a low frequency. Therefore, the second search space with a long periodicity is set, so that power consumption of monitoring the downlink control channel by the terminal device can be reduced. Alternatively, when no application-layer feedback information exists, a base station may notify the terminal device by using the indication information, and the terminal device may stop monitoring the downlink control channel, to reduce unnecessary power consumption and prolong a service life of the terminal device.

Figure 11:
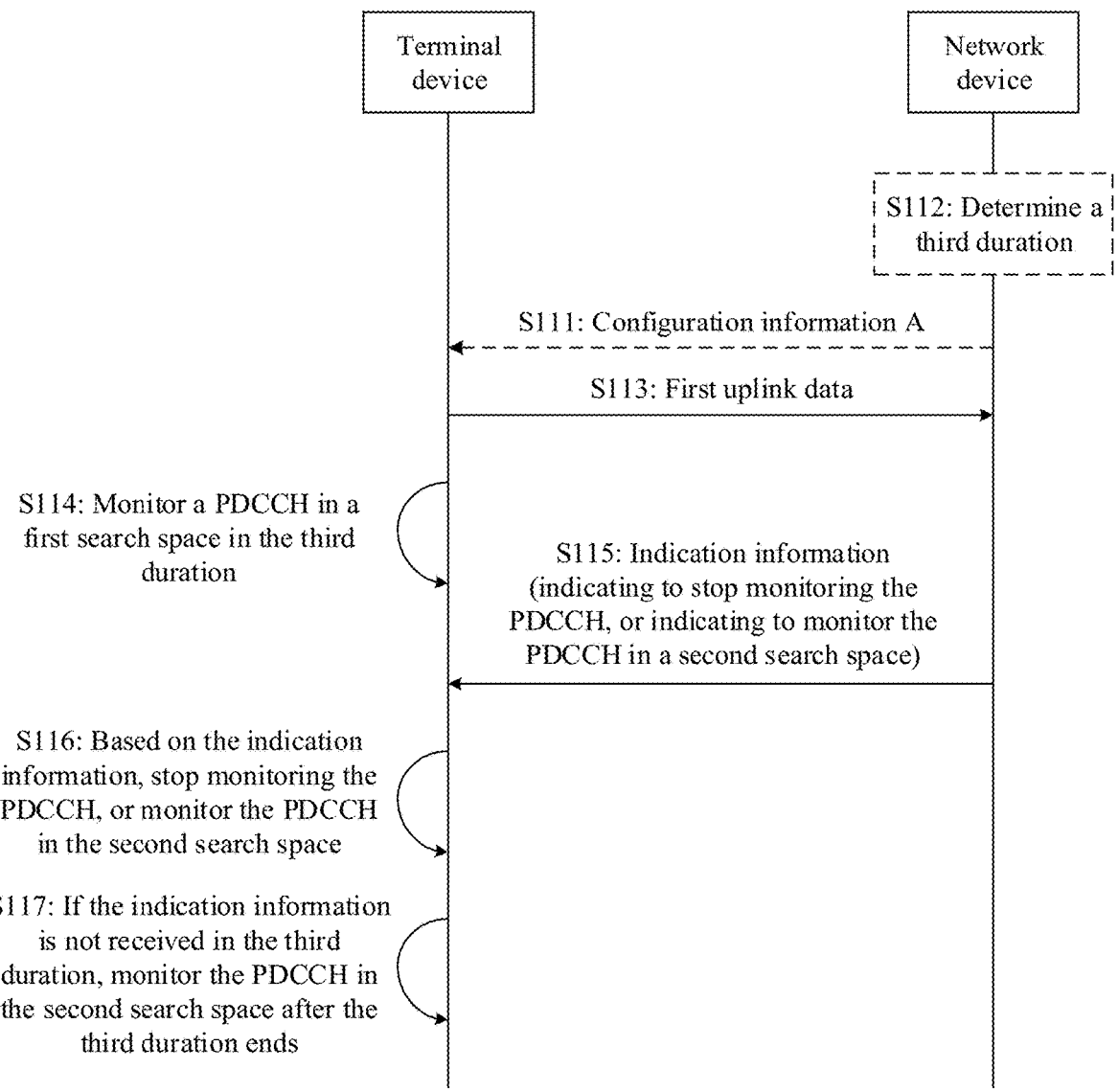
FIG. 11 is a flowchart of a third communication method according to an embodiment of this application.

To resolve the same technical problem, an embodiment of this application provides a third communication method. FIG. 11 is a flowchart of the method. In the following description process, an example in which the method is applied to the network architecture shown in FIG. 6 is used.

For ease of description, the following uses an example in which the method is performed by a network device and a terminal device. Because the example in which the method is applied to the network architecture shown in FIG. 6 is used in this embodiment, the following network device may be the network device in the network architecture shown in FIG. 6, and the following terminal device may be the terminal device in the network architecture shown in FIG. 6. In addition, in the following descriptions, an example in which a downlink control channel is a PDCCH is used. In other words, the two concepts "PDCCH" and "downlink control channel" may be interchanged below.

S111: The network device sends configuration information A to the terminal device, and the terminal device receives the configuration information A from the network device.

The configuration information A may be used to configure a first search space, or used to configure a first search space and a second search space. Both the first search space and the second search space are used by the terminal device to monitor a PDCCH. A periodicity of the first search space is referred to as a first periodicity, and a periodicity of the second search space is referred to as a second periodicity.

For example, a length of the second periodicity is greater than a length of the first periodicity. For example, the length of the second periodicity may be N times the length of the first periodicity, where N may be an integer greater than or equal to 2 or a decimal greater than 1.

For descriptions of the first search space and the second search space and content such as a manner of configuring the first search space or configuring the first search space and the second search space by using the configuration information A, refer to the descriptions of S71 in the embodiment in FIG. 7.

In an optional implementation, the network device may further send fourth configuration information to the terminal device, where the fourth configuration information may be used to configure a third duration. The terminal device may monitor the PDCCH in the first search space in the third duration. The third duration may be an integer multiple of a third time unit, or may be an integer multiple of the length of the first periodicity. The third time unit is, for example, one of a symbol, a slot, a subframe, a frame, or a superframe. For a manner of sending the fourth configuration information by the network device to the terminal device, refer to the related descriptions of S91 in the embodiment shown in FIG. 9.

If the network device needs to send the fourth configuration information to the terminal device, the network device first needs to determine the third duration. Therefore, before the network device sends the fourth configuration information to the terminal device, the method may further include S112: The network device determines the third duration. S112 may be performed before or after S111, or may be simultaneously performed with S111. FIG. 11 uses an example in which S112 is performed before S111. The network device may not only determine a length of the third duration, but also determine: The first search space is used to send DCI in the third duration, and the periodicity of the first search space is the first periodicity. The DCI sent by the network device is carried on the PDCCH. Therefore, the network device sends the DCI, and the terminal device monitors the PDCCH. Certainly, because the first search space is configured by the network device, the network device may determine a parameter for the first search space.

In a configuration manner in which the network device configures the third duration, the network device configures a timer; in another configuration manner, the network device configures a time window. Alternatively, there may be another configuration manner. For example, the network device configures the third duration, but does not configure a timer or a time window.

If the network device configures the timer, the third duration is, for example, a duration of the timer, and a start time location of the third duration is the same as a start time location of the timer. The timer is not the ra-ContentionResolutionTimer described above, and the third duration may be less than or equal to a duration of the ra-ContentionResolutionTimer. In this case, if a current moment is in the third duration, the timer has not expired, in other words, the timer is still running. Alternatively, if the network device configures the time window, the third duration is, for example, a duration of the time window, and the start time location of the third duration is the same as a start time location of the time window. In this case, if a current moment is in the third duration, the current moment is still in the time window, the time window has not expired, or the time window is still running.

Both S111 and S112 are merely optional steps, and are not necessarily performed. Therefore, S111 and S112 are represented by dashed lines in FIG. 11.

S113: The terminal device sends first uplink data to the network device, and the network device receives the first uplink data from the terminal device.

For example, the terminal device may be in an RRC inactive state, that is, the terminal device in the RRC inactive state may send some small packets to the network device.

The terminal device may send the first uplink data to the network device in any one of the three sending manners described above. For example, the terminal device may initiate a four-step random access procedure to the network device, to include the first uplink data in a Msg3 in the four-step random access procedure. Alternatively, the terminal device may initiate a two-step random access procedure to the network device, to include the first uplink data in a MsgA in the two-step random access procedure. Alternatively, the terminal device may send the first uplink data in an uplink grant-free transmission mode without initiating a random access procedure to the network device, that is, send the first uplink data on a preconfigured uplink resource.

Timing for the third duration may start after the terminal device sends the first uplink data to the network device, when the first uplink data is completely sent, or after T3 time units starting from a transmission end moment of the first uplink data. For example, if the network device configures the third duration by configuring the timer, the terminal device may start the timer after the terminal device sends the first uplink data to the network device, when the first uplink data is completely sent, or after the T3 time units starting from the transmission end moment of the first uplink data. Alternatively, if the network device configures the third duration by configuring the time window, the terminal device may start the time window after the terminal device sends the first uplink data to the network device, when the first uplink data is completely sent, or after the T3 time units starting from the transmission end moment of the first uplink data. T3 is an agreed value or is configured by the network device, is greater than or equal to 0, and may be an integer or a decimal. The time unit herein is, for example, one of the symbol, the slot, the subframe, the frame, or the superframe.

S114: The terminal device monitors the PDCCH in the first search space in the third duration.

The periodicity of the first search space is the first periodicity. In the first periodicity, not all slots may be used to monitor the PDCCH. Therefore, to monitor the PDCCH in a first periodicity, the terminal device needs to determine a start time domain position for monitoring the PDCCH. For a relationship satisfied by the start time domain position, determined by the terminal device, for monitoring the PDCCH, refer to the related descriptions of S74 in the embodiment shown in FIG. 7.

If the terminal device detects, in the third duration, the PDCCH for scheduling the terminal device (where specifically, the terminal device detects, in the first duration, the DCI carried on the PDCCH), and for example, the DCI is used to schedule retransmission of the first uplink data, the terminal device may retransmit the first uplink data based on the scheduling by the DCI. For example, after retransmitting the first uplink data, the terminal device may further start the timer or the time window again, to continue to perform S114. It can be learned that if the terminal device detects, in the third duration, the DCI for scheduling the terminal device, S115 does not need to be performed. Similarly, if the network device sends, to the terminal device in the third duration, the DCI for scheduling the retransmission of the first uplink data, the network device receives the first uplink data from the terminal device based on the DCI, and does not perform S115. For detailed descriptions of this part, refer to S94 in the embodiment shown in FIG. 9.

Alternatively, if the terminal device detects, in the third duration, the PDCCH for scheduling the terminal device (where specifically, the terminal device detects, in the first duration, the DCI carried on the PDCCH), and for example, the DCI is used to schedule application-layer feedback information for the first uplink data, the terminal device may receive the application-layer feedback information from the network device based on the scheduling by the DCI, and does not need to perform S115. Similarly, if the network device sends, to the terminal device in the third duration, the DCI for scheduling the application-layer feedback information for the first uplink data, the network device sends the application-layer feedback information to the terminal device based on the DCI, and does not perform S115. For detailed descriptions of this part, refer to S94 in the embodiment shown in FIG. 9.

S115: The network device sends indication information to the terminal device in the third duration, and the terminal device receives the indication information from the network device in the third duration. The indication information may indicate to stop monitoring the PDCCH, or indicate to monitor the PDCCH in the second search space.

If the terminal device does not detect, in the third duration, the DCI for scheduling the retransmission of the first uplink data or for scheduling the application-layer feedback information for the first uplink data, the terminal device may receive the indication information from the network device in the third duration. If the network device does not send, to the terminal device in the third duration, the DCI for scheduling the retransmission of the first uplink data or for scheduling the application-layer feedback information for the first uplink data, the network device may send the indication information to the terminal device in the third duration.

For several implementations of the indication information, refer to the descriptions of S95 in the embodiment shown in FIG. 9.

Optionally, regardless of content indicated by the indication information, if the configuration information A in S111 is used to configure only the first search space instead of the second search space, the indication information may be further used to configure the second search space. For a manner of configuring the second search space by using the indication information, refer to the descriptions of S95 in the embodiment shown in FIG. 9.

Figure 12:
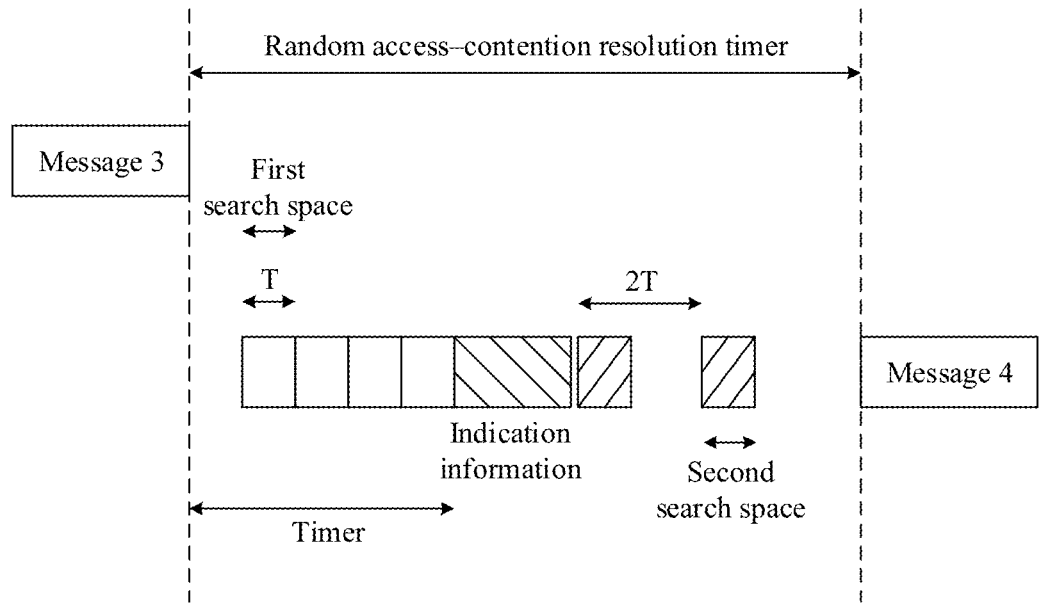
FIG. 12 is a schematic diagram of the embodiment shown in FIG. 11 according to embodiments of this application.

For example, FIG. 12 is a schematic diagram of this embodiment of this application. FIG. 12 uses an example in which a terminal device sends first uplink data by using a Msg3 in a four-step random access procedure, and receives application-layer feedback information by using a Msg4 in the four-step random access procedure, and a network device configures a timer. In FIG. 12, T is a first periodicity, 2T is a second periodicity, a box filled with "/" represents a second search space, a blank box represents a first search space, and a box filled with "\" represents transmission of indication information. Each of the boxes representing the first search space and the second search space represents one periodicity. A duration of the timer is a third duration, and a start time location of the third duration is the same as a start time location of the timer. The terminal device monitors a PDCCH in the first search space in the duration of the timer; and after receiving the indication information from the network device, the terminal device monitors the PDCCH in the second search space.

S116: If the indication information indicates to monitor the PDCCH in the second search space, the terminal device monitors the PDCCH in the second search space; or if the indication information indicates to stop monitoring the PDCCH, the terminal device stops monitoring the PDCCH.

It is assumed that the terminal device receives the indication information before the third duration ends. For example, if the network device configures the third duration by configuring the timer, the terminal device receives the indication information before the timer expires. In this case, the terminal device may disable the timer when or after receiving the indication information. Alternatively, if the network device configures the third duration by configuring the time window, the terminal device receives the indication information before the time window ends. In this case, the terminal device may end the time window when or after receiving the indication information.

If the terminal device receives the indication information from the network device, based on the indication information, the terminal device may monitor the PDCCH in the second search space or stop monitoring the PDCCH. If the terminal device monitors the downlink control channel in the second search space, in the second periodicity, not all slots may be used to monitor the PDCCH. Therefore, to monitor the PDCCH in a second periodicity, the terminal device needs to determine a start time domain position for monitoring the PDCCH. For a relationship satisfied by the start time domain position, determined by the terminal device, for monitoring the PDCCH, refer to the related descriptions of S75 in the embodiment shown in FIG. 7.

Alternatively, in the third duration, the network device may neither send, to the terminal device, the PDCCH for scheduling the retransmission of the first uplink data or for scheduling the application-layer feedback information for the first uplink data, nor send the indication information to the terminal device. In this case, the terminal device cannot receive, from the network device in the third duration, the indication information or the PDCCH for scheduling the retransmission of the first uplink data or for scheduling the application-layer feedback information for the first uplink data, and S115 is not performed. For example, the network device may implicitly indicate, in this manner of not sending the indication information, that the application-layer feedback information is to be subsequently sent. Therefore, the method may further include S117: If the terminal device does not receive the indication information in the third duration, the terminal device may monitor the PDCCH in the second search space after the third duration ends. Only one, instead of both, of S117 and S115 is performed. For example, if the network device configures the third duration by configuring the timer, the terminal device does not receive the indication information before the timer expires, and may monitor the PDCCH in the second search space after the timer expires, to receive the application-layer feedback information. Alternatively, if the network device configures the third duration by configuring the time window, the terminal device does not receive the indication information in the time window, and may monitor the PDCCH in the second search space when or after the time window ends, to receive the application-layer feedback information.

The network device may send the PDCCH before sending the indication information (where it may also be considered that the indication information is not sent), may send the PDCCH after sending the indication information, or may send the PDCCH but not send the indication information. If the network device is to send the PDCCH before sending the indication information, the network device may determine, according to the formula 1, a start slot for sending the PDCCH in the first periodicity, to start sending the PDCCH in the start slot. Alternatively, if the network device is to send the PDCCH after sending the indication information (where the indication information indicates to monitor the PDCCH in the second search space), the network device may determine, according to the formula 2, a start slot for sending the PDCCH in the second periodicity, to start sending the PDCCH in the start slot. The network device keeps consistent with the terminal device, to improve a success rate of monitoring the PDCCH by the terminal device.

In embodiments of this application, after sending the first uplink data to the network device, the terminal device may monitor the downlink control channel in the first search space. After receiving the indication information, the terminal device monitors the downlink control channel in the second search space. The length of the periodicity of the first search space is less than the length of the periodicity of the first search space. Therefore, the terminal device monitors the downlink control channel based on the second search space at a low frequency. Therefore, the second search space with a long periodicity is set, so that power consumption of monitoring the downlink control channel by the terminal device can be reduced. Alternatively, when no application-layer feedback information exists, a base station may notify the terminal device by using the indication information, and the terminal device may stop monitoring the downlink control channel, to reduce unnecessary power consumption and prolong a service life of the terminal device. When the application-layer feedback information exists, the indication information is not sent before the timer expires, to implicitly notify the terminal device that the application-layer feedback information is to be subsequently sent, to reduce resource overheads for sending the indication information by the network device.

Figure 13:
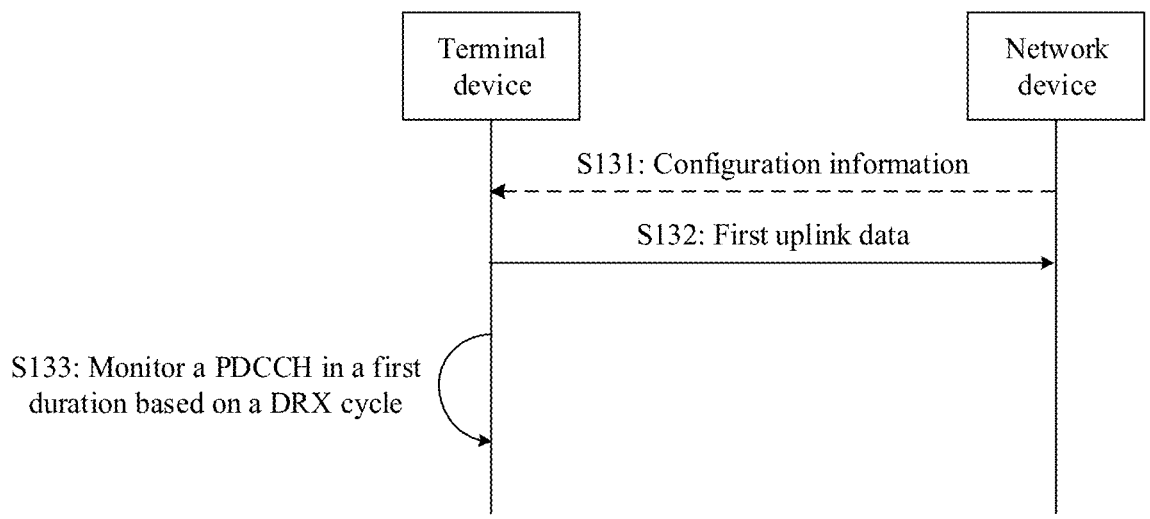
FIG. 13 is a flowchart of a fourth communication method according to an embodiment of this application.

To resolve the same technical problem, an embodiment of this application provides a fourth communication method. FIG. 13 is a flowchart of the method. In the following description process, an example in which the method is applied to the network architecture shown in FIG. 6 is used.

For ease of description, the following uses an example in which the method is performed by a network device and a terminal device. Because the example in which the method is applied to the network architecture shown in FIG. 6 is used in this embodiment, the following network device may be the network device in the network architecture shown in FIG. 6, and the following terminal device may be the terminal device in the network architecture shown in FIG. 6. In addition, in the following descriptions, an example in which a downlink control channel is a PDCCH is used. In other words, the two concepts "PDCCH" and "downlink control channel" may be interchanged below.

S131: The network device sends configuration information to the terminal device, and the terminal device receives the configuration information from the network device.

The configuration information may be used to configure discontinuous reception (DRX) for the terminal device, in other words, the configuration information includes a configuration parameter for the DRX. The configuration parameter for the DRX includes, for example, a DRX cycle or a duration of each related timer in the DRX cycle.

S131 is merely an optional step, and is not necessarily performed. Therefore, S131 is represented by a dashed line in FIG. 13.

S132: The terminal device sends first uplink data to the network device, and the network device receives the first uplink data from the terminal device.

For example, the terminal device may be in an RRC inactive state, that is, the terminal device in the RRC inactive state may send some small packets to the network device.

The terminal device may send the first uplink data to the network device in any one of the three sending manners described above. For example, the terminal device may initiate a four-step random access procedure to the network device, to include the first uplink data in a Msg3 in the four-step random access procedure. Alternatively, the terminal device may initiate a two-step random access procedure to the network device, to include the first uplink data in a MsgA in the two-step random access procedure. Alternatively, the terminal device may send the first uplink data in an uplink grant-free transmission mode without initiating a random access procedure to the network device, that is, send the first uplink data on a preconfigured uplink resource.

S132 may be performed before or after S131 or may be simultaneously performed with S131. FIG. 13 uses an example in which S132 is performed after S131.

S133: The terminal device monitors a PDCCH in a first duration based on the DRX cycle. The network device may not send the PDCCH, or may send the PDCCH. If the network device sends the PDCCH, the network device sends the PDCCH based on the DRX cycle, so that the network device keeps consistent with the terminal device, to improve a success rate of monitoring the PDCCH by the terminal device.

The terminal device monitors the PDCCH in the first duration based on the DRX cycle. The first duration herein means that a time interval between S132 and S133 is not excessively long. The DRX cycle includes an on duration (on duration), and the terminal device needs to monitor the PDCCH in the on duration. If the terminal device receives the PDCCH from the network device in an on duration of a DRX cycle, the terminal device may perform a corresponding operation based on scheduling by the PDCCH. For example, if the PDCCH is used to schedule retransmission of the first uplink data, the terminal device retransmits the first uplink data based on the scheduling by the PDCCH. If the terminal device sends the first uplink data by using the Msg3 in the four-step random access procedure, the PDCCH may be used to schedule retransmission of the Msg3, and the terminal device retransmits the Msg3 based on the scheduling by the PDCCH, to still include the first uplink data in the retransmitted Msg3. Alternatively, if the terminal device sends the first uplink data by using the MsgA in the two-step random access procedure, the PDCCH may be used to schedule retransmission of the MsgA, and the terminal device retransmits the MsgA based on the scheduling by the PDCCH, to still include the first uplink data in the retransmitted MsgA. Alternatively, if the terminal device sends the first uplink data in the uplink grant-free transmission mode, the PDCCH may be used to schedule the retransmission of the first uplink data, and the terminal device retransmits the first uplink data based on the scheduling by the PDCCH.

Alternatively, if the PDCCH is used to schedule application-layer feedback information for the first uplink data, the terminal device may receive the application-layer feedback information based on the scheduling by the PDCCH. If the terminal device sends the first uplink data by using the Msg3 in the four-step random access procedure, the PDCCH may be used to schedule a Msg4, and the terminal device receives the Msg4 based on the scheduling by the PDCCH, where the Msg4 may include the application-layer feedback information. Alternatively, if the terminal device sends the first uplink data by using the MsgA in the two-step random access procedure, the PDCCH may be used to schedule a MsgB, and the terminal device receives the MsgB based on the scheduling by the PDCCH, where the Msg4 may include the application-layer feedback information. Alternatively, if the terminal device sends the first uplink data in the uplink grant-free transmission mode, the PDCCH may be used to schedule a downlink response message, and the terminal device receives the downlink response message from the network device based on the scheduling by the PDCCH, where the downlink response message may include the application-layer feedback information.

An off (off) duration follows when the on duration in the DRX cycle ends. If the terminal device does not detect the PDCCH from the network device in the on duration, in other words, does not detect the PDCCH for scheduling the retransmission of the first uplink data or for scheduling the application-layer feedback information for the first uplink data, the terminal device enters an off (off) state in the off duration when the on duration in the DRX cycle ends, and the terminal device does not monitor the PDCCH in the off state.

Figure 14:
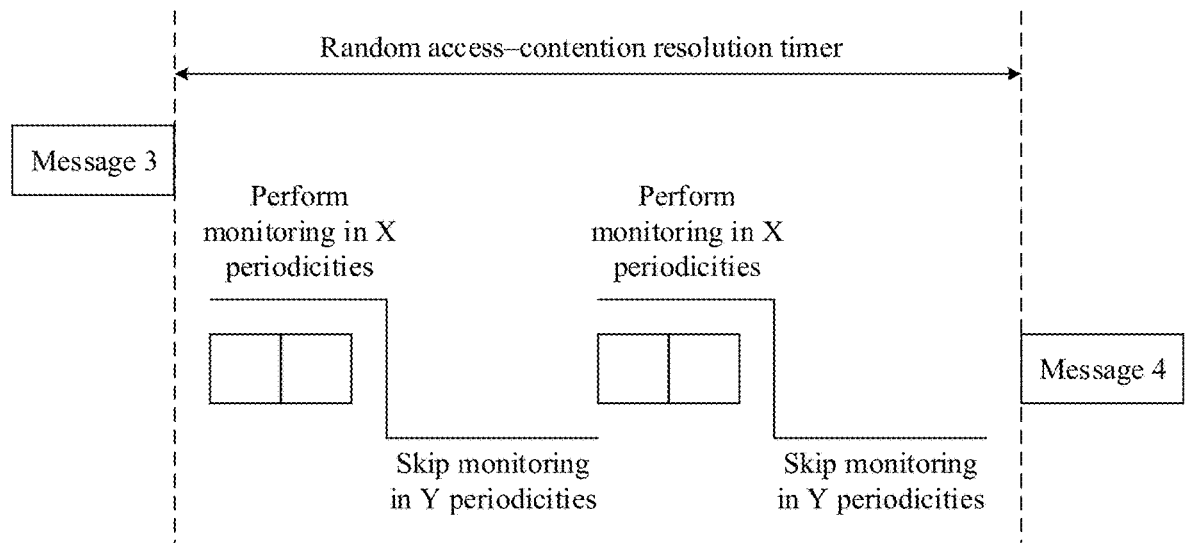
FIG. 14 is a schematic diagram of the embodiment shown in FIG. 13 according to embodiments of this application.

For example, FIG. 14 is a schematic diagram of this embodiment of this application. FIG. 14 uses an example in which a terminal device sends first uplink data by using a Msg3 in a four-step random access procedure, and receives application-layer feedback information by using a Msg4 in the four-step random access procedure. For example, after entering a DRX cycle, the terminal device first enters an on duration. For example, the terminal device performs monitoring in X periodicities of a search space in the on duration. If the terminal device receives a PDCCH from the network device (in other words, receives DCI carried on the PDCCH) in the on duration, the terminal device may perform a corresponding operation based on scheduling by the DCI. If the terminal device does not detect a PDCCH from the network device in the on duration, the terminal device enters an off state in an off duration in the DRX cycle, and does not monitor the PDCCH. For example, the terminal device does not monitor the PDCCH in Y periodicities of the search space.

In embodiments of this application, after sending the first uplink data to the network device, the terminal device may monitor the downlink control channel based on the DRX cycle. The DRX cycle includes the off duration, and the terminal device does not need to monitor the downlink control channel in the off duration. Therefore, power consumption of monitoring the downlink control channel by the terminal device can be reduced.

With reference to the accompanying drawings, the following describes apparatuses configured to implement the foregoing methods in embodiments of this application. Therefore, all the foregoing content may be used in the following embodiments. Repeated content is not described again.

Figure 15:
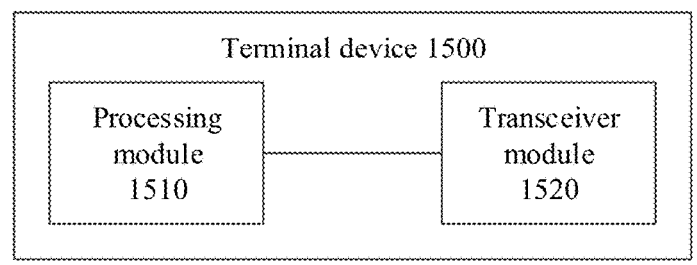
FIG. 15 is a schematic block diagram of a first type of terminal device according to an embodiment of this application.

FIG. 15 is a schematic block diagram of a communication apparatus 1500 according to an embodiment of this application. For example, the communication apparatus 1500 is a terminal device 1500.

The terminal device 1500 includes a processing module 1510 and a transceiver module 1520. For example, the terminal device 1500 may be a network device, or may be a chip used in the terminal device, or another combined device, another component, or the like that has functions of the terminal device. When the terminal device 1500 is the terminal device, the transceiver module 1520 may be a transceiver, where the transceiver may include an antenna, a radio frequency circuit, and the like; the processing module 1510 may be a processor, for example, a baseband processor, where the baseband processor may include one or more central processing units (central processing units, CPUs). When the terminal device 1500 is the component having the functions of the terminal device, the transceiver module 1520 may be a radio frequency unit, and the processing module 1510 may be a processor, for example, a baseband processor. When the terminal device 1500 is a chip system, the transceiver module 1520 may be an input/output interface of a chip (for example, a baseband chip), and the processing module 1510 may be a processor of the chip system, and may include one or more central processing units. It should be understood that the processing module 1510 in this embodiment of this application may be implemented by a processor or a processor-related circuit component, and the transceiver module 1520 may be implemented by a transceiver or a transceiver-related circuit component.

For example, the processing module 1510 may be configured to perform all operations, such as S74 and S75, that are performed by the terminal device in the embodiment shown in FIG. 7 except sending and receiving operations, and/or configured to support another process of the technology described in this specification. The transceiver module 1520 may be configured to perform all the sending and receiving operations, such as S71, S73, S74, and S75, that are performed by the terminal device in the embodiment shown in FIG. 7, and/or configured to support another process of the technology described in this specification.

In addition, the transceiver module 1520 may be one functional module, and the functional module can complete both the sending operation and the receiving operation. For example, the transceiver module 1520 may be configured to perform all the sending and receiving operations performed by the terminal device in the embodiment shown in FIG. 7. For example, when performing the sending operation, the transceiver module 1520 may be considered as a sending module; when performing the receiving operation, the transceiver module 1520 may be considered as a receiving module. Alternatively, the transceiver module 1520 may be two functional modules, the transceiver module 1520 may be considered as a general term of the two functional modules, and the two functional modules are a sending module and a receiving module. The sending module is configured to complete the sending operation, for example, may be configured to perform all the sending operations performed by the terminal device in the embodiment shown in FIG. 7. The receiving module is configured to complete the receiving operation, for example, may be configured to perform all the receiving operations performed by the terminal device in the embodiment shown in FIG. 7.

The transceiver module 1520 is configured to send first uplink data to a network device.

The processing module 1510 is configured to monitor a first downlink control channel through the transceiver module 1520 in a first search space in a first duration, where a periodicity of the first search space is a first periodicity.

The processing module 1510 is further configured to: after the first duration ends, monitor a second downlink control channel through the transceiver module 1520 in a second search space in a second duration, where a periodicity of the second search space is a second periodicity, and a length of the second periodicity is greater than a length of the first periodicity.

In an optional implementation, the first downlink control channel is used to carry first DCI, the first DCI is used to schedule retransmission of the first uplink data, the second downlink control channel is used to carry second DCI, and the second DCI is used to schedule application-layer feedback information for the first uplink data.

In an optional implementation, the first uplink data is included in a third message or a random access request message in a random access procedure, or the first uplink data is sent on a preconfigured uplink resource.

For other functions that can be implemented by the terminal device 1500, refer to the related descriptions in the embodiment shown in FIG. 7. Details are not described again.

Figure 16:
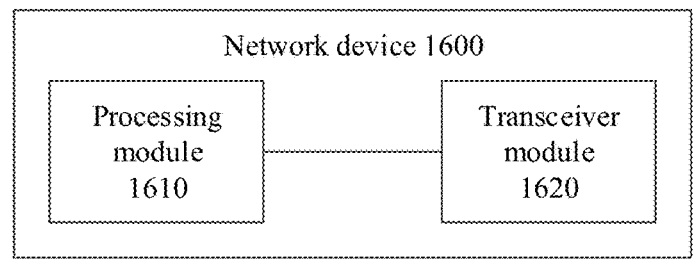
FIG. 16 is a schematic block diagram of a first type of network device according to an embodiment of this application.

FIG. 16 is a schematic block diagram of a communication apparatus 1600 according to an embodiment of this application. For example, the communication apparatus 1600 is a network device 1600.

The network device 1600 includes a processing module 1610 and a transceiver module 1620. For example, the network device 1600 may be a network device, or may be a chip used in the network device, or another combined device, another component, or the like that has functions of the network device. When the network device 1600 is the network device, the transceiver module 1620 may be a transceiver, where the transceiver may include an antenna, a radio frequency circuit, and the like; the processing module 1610 may be a processor, for example, a baseband processor, where the baseband processor may include one or more CPUs. When the network device 1600 is the component having the functions of the network device, the transceiver module 1620 may be a radio frequency unit, and the processing module 1610 may be a processor, for example, a baseband processor. When the network device 1600 is a chip system, the transceiver module 1620 may be an input/output interface of a chip (for example, a baseband chip), and the processing module 1610 may be a processor of the chip system, and may include one or more central processing units. It should be understood that the processing module 1610 in this embodiment of this application may be implemented by a processor or a processor-related circuit component, and the transceiver module 1620 may be implemented by a transceiver or a transceiver-related circuit component.

For example, the processing module 1610 may be configured to perform all operations, such as S72, that are performed by the network device in the embodiment shown in FIG. 7 except sending and receiving operations, and/or configured to support another process of the technology described in this specification. The transceiver module 1620 may be configured to perform all the sending and receiving operations, such as S71, S73, S74, and S75, that are performed by the network device in the embodiment shown in FIG. 7, and/or configured to support another process of the technology described in this specification.

In addition, for an implementation of the transceiver module 1620, refer to the descriptions of the implementation of the transceiver module 1520.

The transceiver module 1620 is configured to receive first uplink data from a terminal device.

The processing module 1610 is configured to determine a first duration and a second duration, where first DCI is sent based on a first search space in the first duration, and a periodicity of the first search space is a first periodicity; and after the first duration ends, second DCI is sent based on a second search space in the second duration, a periodicity of the second search space is a second periodicity, and a length of the second periodicity is greater than a length of the first periodicity.

In an optional implementation, the first DCI is used to schedule retransmission of the first uplink data, and the second DCI is used to schedule application-layer feedback information for the first uplink data.

In an optional implementation, the first uplink data is included in a third message or a random access request message in a random access procedure, or the first uplink data is sent by the terminal device on a preconfigured uplink resource.

For other functions that can be implemented by the network device 1600, refer to the related descriptions in the embodiment shown in FIG. 7. Details are not described again.

Figure 17:
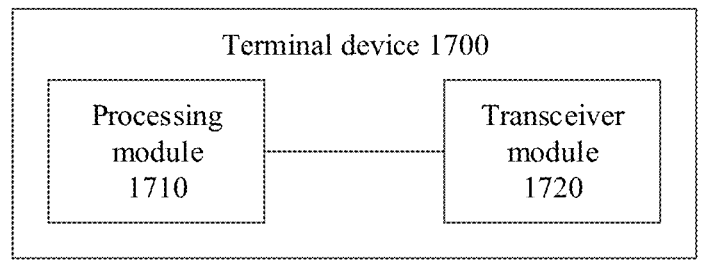
FIG. 17 is a schematic block diagram of a second type of terminal device according to an embodiment of this application.

FIG. 17 is a schematic block diagram of a communication apparatus 1700 according to an embodiment of this application. For example, the communication apparatus 1700 is a terminal device 1700.

The terminal device 1700 includes a processing module 1710 and a transceiver module 1720. For example, the terminal device 1700 may be a network device, or may be a chip used in the terminal device, or another combined device, another component, or the like that has functions of the terminal device. When the terminal device 1700 is the terminal device, the transceiver module 1720 may be a transceiver, where the transceiver may include an antenna, a radio frequency circuit, and the like; the processing module 1710 may be a processor, for example, a baseband processor, where the baseband processor may include one or more CPUs. When the terminal device 1700 is the component having the functions of the terminal device, the transceiver module 1720 may be a radio frequency unit, and the processing module 1710 may be a processor, for example, a baseband processor. When the terminal device 1700 is a chip system, the transceiver module 1720 may be an input/output interface of a chip (for example, a baseband chip), and the processing module 1710 may be a processor of the chip system, and may include one or more central processing units. It should be understood that the processing module 1710 in this embodiment of this application may be implemented by a processor or a processor-related circuit component, and the transceiver module 1720 may be implemented by a transceiver or a transceiver-related circuit component.

For example, the processing module 1710 may be configured to perform all operations, such as S94 and S96, that are performed by the terminal device in the embodiment shown in FIG. 9 except sending and receiving operations, and/or configured to support another process of the technology described in this specification. The transceiver module 1720 may be configured to perform all the sending and receiving operations, such as S91, S93, and S94 to S96, that are performed by the terminal device in the embodiment shown in FIG. 9, and/or configured to support another process of the technology described in this specification.

For another example, the processing module 1710 may be configured to perform all operations, such as S114, S116, and S117, that are performed by the terminal device in the embodiment shown in FIG. 11 except sending and receiving operations, and/or configured to support another process of the technology described in this specification. The transceiver module 1720 may be configured to perform all the sending and receiving operations, such as S111, S113, and S114 to S117, that are performed by the terminal device in the embodiment shown in FIG. 11, and/or configured to support another process of the technology described in this specification.

In addition, for an implementation of the transceiver module 1720, refer to the descriptions of the implementation of the transceiver module 1520.

The transceiver module 1720 is configured to send first uplink data to a network device.

The processing module 1710 is configured to monitor a downlink control channel through the transceiver module 1720 in a first search space in a third duration, where a periodicity of the first search space is a first periodicity.

The transceiver module 1720 is further configured to receive indication information from the network device in the third duration.

The processing module 1710 is further configured to: stop, based on the indication information, monitoring the downlink control channel; or monitor the downlink control channel through the transceiver module 1720 in a second search space based on the indication information, where a periodicity of the second search space is a second periodicity, and a length of the second periodicity is greater than a length of the first periodicity.

In an optional implementation, the indication information includes at least one of the following:
- a MAC CE, where the MAC CE is used to transmit a second contention resolution identity, and the second contention resolution identity matches a first contention resolution identity;
- an RRC message, where the RRC message indicates to fall back to an RRC inactive state or an RRC idle state; or
- first information or third information, where the first information indicates to stop monitoring the downlink control channel or indicates that no application-layer feedback information exists, and the third information indicates to monitor the downlink control channel in the second search space or indicates that the application-layer feedback information exists.

The first uplink data and the first contention resolution identity are included in a third message or a random access request message in a random access procedure.

In an optional implementation, the indication information includes at least one of the following:
- ACK information;
- NACK information;
- fallback information, where the fallback information indicates to fall back to a random access procedure; or
- second information or fourth information, where the second information indicates to stop monitoring the downlink control channel or indicates that no application-layer feedback information exists, and the fourth information indicates to monitor the downlink control channel in the second search space or indicates that the application-layer feedback information exists.

The first uplink data is sent on a preconfigured uplink resource.

In an optional implementation, the indication information further includes a first parameter for configuring the second periodicity, or the indication information further includes configuration information of the second search space.

For other functions that can be implemented by the terminal device 1700, refer to the related descriptions in the embodiment shown in FIG. 9 or the embodiment shown in FIG. 11. Details are not described again.

Figure 18:
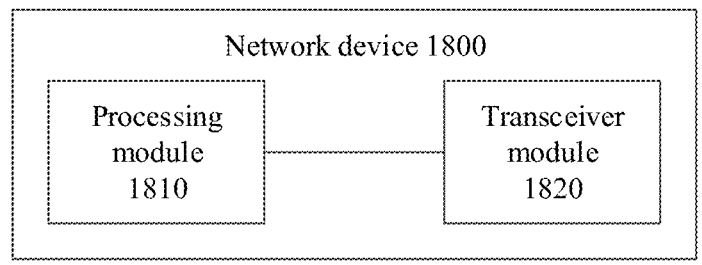
FIG. 18 is a schematic block diagram of a second type of network device according to an embodiment of this application.

FIG. 18 is a schematic block diagram of a communication apparatus 1800 according to an embodiment of this application. For example, the communication apparatus 1800 is a network device 1800.

The network device 1800 includes a processing module 1810 and a transceiver module 1820. For example, the network device 1800 may be a network device, or may be a chip used in the network device, or another combined device, another component, or the like that has functions of the network device. When the network device 1800 is the network device, the transceiver module 1820 may be a transceiver, where the transceiver may include an antenna, a radio frequency circuit, and the like; the processing module 1810 may be a processor, for example, a baseband processor, where the baseband processor may include one or more CPUs. When the network device 1800 is the component having the functions of the network device, the transceiver module 1820 may be a radio frequency unit, and the processing module 1810 may be a processor, for example, a baseband processor. When the network device 1800 is a chip system, the transceiver module 1820 may be an input/output interface of a chip (for example, a baseband chip), and the processing module 1810 may be a processor of the chip system, and may include one or more central processing units. It should be understood that the processing module 1810 in this embodiment of this application may be implemented by a processor or a processor-related circuit component, and the transceiver module 1820 may be implemented by a transceiver or a transceiver-related circuit component.

For example, the processing module 1810 may be configured to perform all operations, such as S92, that are performed by the network device in the embodiment shown in FIG. 9 except sending and receiving operations, and/or configured to support another process of the technology described in this specification. The transceiver module 1820 may be configured to perform all the sending and receiving operations, such as S91, S93, and S94 to S96, that are performed by the network device in the embodiment shown in FIG. 9, and/or configured to support another process of the technology described in this specification.

For another example, the processing module 1810 may be configured to perform all operations, such as S112, that are performed by the network device in the embodiment shown in FIG. 11 except sending and receiving operations, and/or configured to support another process of the technology described in this specification. The transceiver module 1820 may be configured to perform all the sending and receiving operations, such as S111, S113, and S114 to S117, that are performed by the network device in the embodiment shown in FIG. 11, and/or configured to support another process of the technology described in this specification.

In addition, for an implementation of the transceiver module 1820, refer to the descriptions of the implementation of the transceiver module 1520.

The transceiver module 1820 is configured to receive first uplink data from a terminal device, where downlink control information is sent based on a first search space in a third duration after the first uplink data is received, and a periodicity of the first search space is a first periodicity.

The transceiver module 1820 is further configured to send indication information to the terminal device in the third duration, where the indication information indicates to stop monitoring a downlink control channel in a second search space, or indicates to monitor a downlink control channel in a second search space, where a periodicity of the second search space is a second periodicity, and a length of the second periodicity is greater than a length of the first periodicity.

Alternatively, the processing module 1810 is configured to receive first uplink data from a terminal device through the transceiver module 1820, where downlink control information is sent based on a first search space in a third duration after the first uplink data is received, and a periodicity of the first search space is a first periodicity.

The processing module 1810 is further configured to send indication information to the terminal device through the transceiver module 1820 in the third duration, where the indication information indicates to stop monitoring a downlink control channel in a second search space, or indicates to monitor a downlink control channel in a second search space, where a periodicity of the second search space is a second periodicity, and a length of the second periodicity is greater than a length of the first periodicity.

In an optional implementation, the indication information includes at least one of the following:
- a MAC CE, where the MAC CE is used to transmit a second contention resolution identity, and the second contention resolution identity matches a first contention resolution identity;
- an RRC message, where the RRC message indicates to fall back to an RRC inactive state or an RRC idle state; or
- first information or third information, where the first information indicates to stop monitoring the downlink control channel or indicates that no application-layer feedback information exists, and the third information indicates to monitor the downlink control channel in the second search space or indicates that the application-layer feedback information exists.

The first uplink data and the first contention resolution identity are included in a third message or a random access request message in a random access procedure.

In an optional implementation, the indication information includes at least one of the following:
- ACK information;
- NACK information;
- fallback information, where the fallback information indicates to fall back to a random access procedure; or
- second information or fourth information, where the second information indicates to stop monitoring the downlink control channel or indicates that no application-layer feedback information exists, and the fourth information indicates to monitor the downlink control channel in the second search space or indicates that the application-layer feedback information exists.

The first uplink data is sent on a preconfigured uplink resource.

In an optional implementation, the indication information further includes a first parameter for configuring the second periodicity, or the indication information further includes configuration information of the second search space.

For other functions that can be implemented by the network device 1800, refer to the related descriptions in the embodiment shown in FIG. 9 or the embodiment shown in FIG. 11.

Details are not described again.

Figure 19:
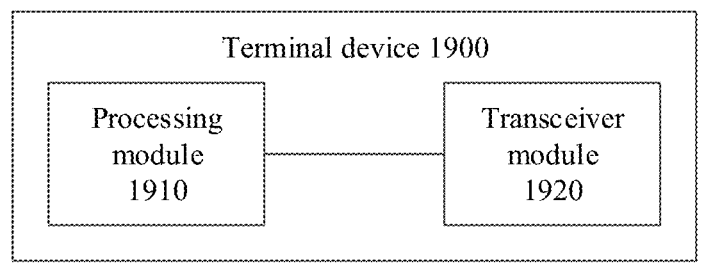
FIG. 19 is a schematic block diagram of a third type of terminal device according to an embodiment of this application.

FIG. 19 is a schematic block diagram of a communication apparatus 1900 according to an embodiment of this application. For example, the communication apparatus 1900 is a terminal device 1900.

The terminal device 1900 includes a processing module 1910 and a transceiver module 1920. For example, the terminal device 1900 may be a network device, or may be a chip used in the terminal device, or another combined device, another component, or the like that has functions of the terminal device. When the terminal device 1900 is the terminal device, the transceiver module 1920 may be a transceiver, where the transceiver may include an antenna, a radio frequency circuit, and the like; the processing module 1910 may be a processor, for example, a baseband processor, where the baseband processor may include one or more CPUs. When the terminal device 1900 is the component having the functions of the terminal device, the transceiver module 1920 may be a radio frequency unit, and the processing module 1910 may be a processor, for example, a baseband processor. When the terminal device 1900 is a chip system, the transceiver module 1920 may be an input/output interface of a chip (for example, a baseband chip), and the processing module 1910 may be a processor of the chip system, and may include one or more central processing units. It should be understood that the processing module 1910 in this embodiment of this application may be implemented by a processor or a processor-related circuit component, and the transceiver module 1920 may be implemented by a transceiver or a transceiver-related circuit component.

For example, the processing module 1910 may be configured to perform all operations, such as S133, that are performed by the terminal device in the embodiment shown in FIG. 13 except sending and receiving operations, and/or configured to support another process of the technology described in this specification. The transceiver module 1920 may be configured to perform all the sending and receiving operations, such as S131 to S133, that are performed by the terminal device in the embodiment shown in FIG. 13, and/or configured to support another process of the technology described in this specification.

In addition, for an implementation of the transceiver module 1920, refer to the descriptions of the implementation of the transceiver module 1520.

The transceiver module 1920 is configured to receive configuration information from a network device, where the configuration information is used to configure DRX.

The transceiver module 1920 is further configured to send first uplink data to the network device.

The processing module 1910 is configured to monitor a downlink control channel through the transceiver module 1920 in a first duration based on a DRX cycle, where monitoring of the downlink control channel is stopped in an off duration in the DRX cycle, and the terminal device is in an RRC inactive state.

For other functions that can be implemented by the terminal device 1900, refer to the related descriptions in the embodiment shown in FIG. 13. Details are not described again.

Figure 20:
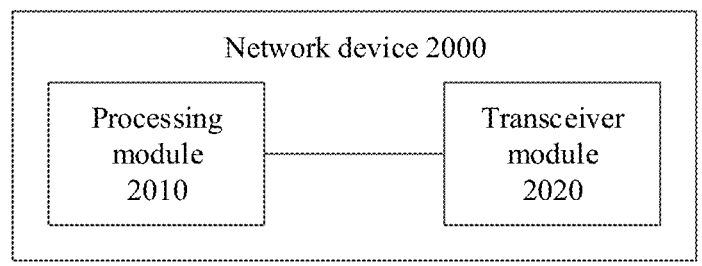
FIG. 20 is a schematic block diagram of a third type of network device according to an embodiment of this application.

FIG. 20 is a schematic block diagram of a communication apparatus 2000 according to an embodiment of this application. For example, the communication apparatus 2000 is a network device 2000.

The network device 2000 includes a processing module 2010 and a transceiver module 2020. For example, the network device 2000 may be a network device, or may be a chip used in the network device, or another combined device, another component, or the like that has functions of the network device. When the network device 2000 is the network device, the transceiver module 2020 may be a transceiver, where the transceiver may include an antenna, a radio frequency circuit, and the like; the processing module 2010 may be a processor, for example, a baseband processor, where the baseband processor may include one or more CPUs. When the network device 2000 is the component having the functions of the network device, the transceiver module 2020 may be a radio frequency unit, and the processing module 2010 may be a processor, for example, a baseband processor. When the network device 2000 is a chip system, the transceiver module 2020 may be an input/output interface of a chip (for example, a baseband chip), and the processing module 2010 may be a processor of the chip system, and may include one or more central processing units. It should be understood that the processing module 2010 in this embodiment of this application may be implemented by a processor or a processor-related circuit component, and the transceiver module 2020 may be implemented by a transceiver or a transceiver-related circuit component.

For example, the processing module 2010 may be configured to perform all operations, such as S131 to S133, that are performed by the network device in the embodiment shown in FIG. 13 except sending and receiving operations, and/or configured to support another process of the technology described in this specification. The transceiver module 2020 may be configured to perform all the sending and receiving operations, such as S131 to S133, that are performed by the network device in the embodiment shown in FIG. 13, and/or configured to support another process of the technology described in this specification.

In addition, for an implementation of the transceiver module 2020, refer to the descriptions of the implementation of the transceiver module 1520.

The transceiver module 2020 is configured to send configuration information to a terminal device, where the configuration information is used to configure DRX.

The transceiver module 2020 is further configured to receive first uplink data from the terminal device.

The processing module 2010 is configured to send downlink control information through the transceiver module 2020 in a first duration based on a DRX cycle, where the downlink control information is not sent in an off duration in the DRX cycle, and the terminal device is in an RRC inactive state.

For other functions that can be implemented by the network device 2000, refer to the related descriptions in the embodiment shown in FIG. 13. Details are not described again.

An embodiment of this application further provides a communication apparatus, and the communication apparatus may be a terminal device or a circuit. The communication apparatus may be configured to perform an action performed by the terminal device in the foregoing method embodiments.

Figure 21:
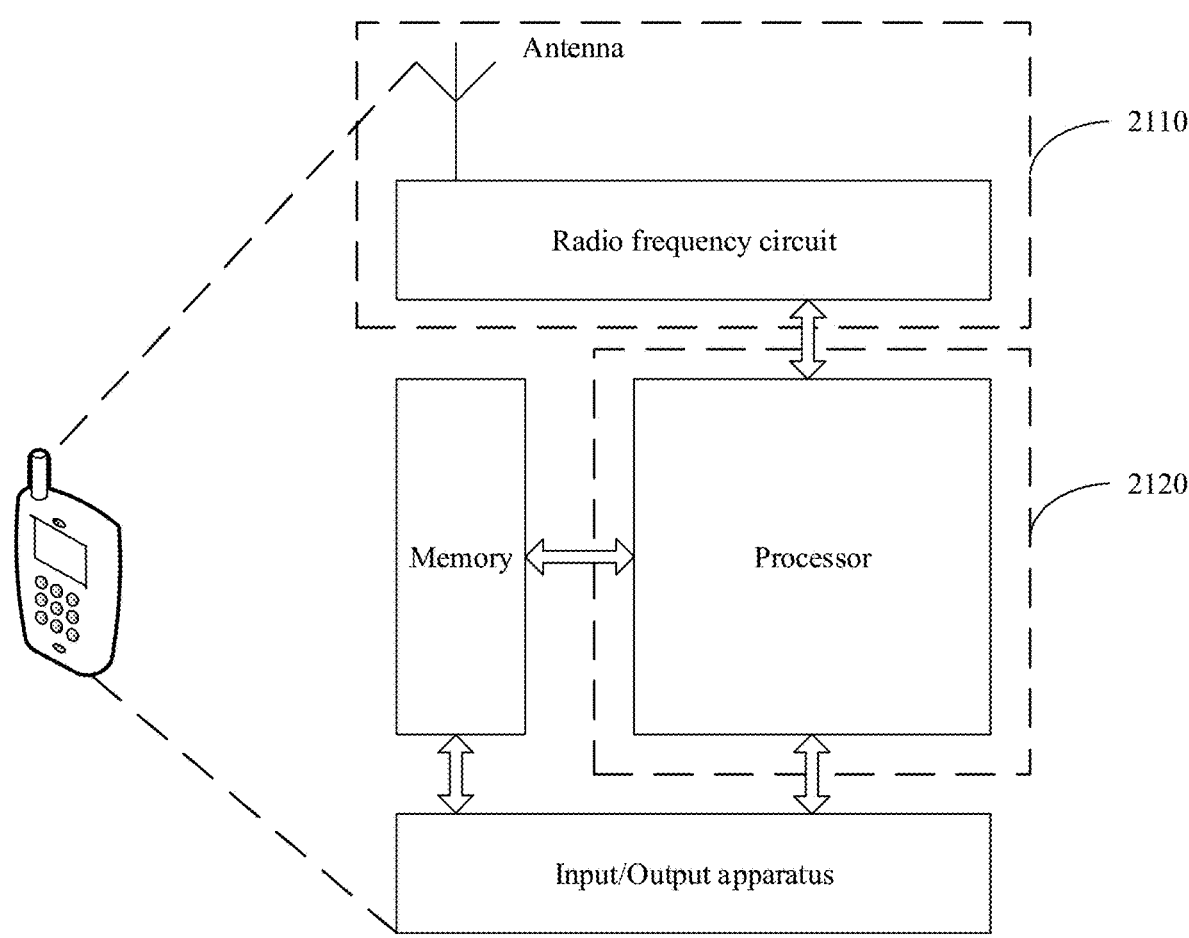
FIG. 21 is a schematic block diagram of a communication apparatus according to an embodiment of this application.

When the communication apparatus is the terminal device, FIG. 21 is a simplified schematic diagram of a structure of a terminal device. For ease of understanding and illustration, an example in which the terminal device is a mobile phone is used in FIG. 21. As shown in FIG. 21, the terminal device includes a processor, a memory, a radio frequency circuit, an antenna, and an input/output apparatus. The processor is mainly configured to process a communication protocol and communication data, control the terminal device, execute a software program, process data of the software program, and so on. The memory is configured to store the software program and the data. The radio frequency circuit is mainly configured to perform conversion between a baseband signal and a radio frequency signal, and process the radio frequency signal. The antenna is mainly configured to send and receive the radio frequency signal in an electromagnetic wave form. The input/output apparatus such as a touchscreen, a display screen, or a keyboard is mainly configured to receive data entered by a user, and output data to the user. It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal, and sends a radio frequency signal in the electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 21 shows only one memory and one processor. In an actual terminal device product, there may be one or more processors and one or more memories. The memory may also be referred to as a storage medium, a storage device, or the like. The memory may be independent of the processor, or may be integrated with the processor. This is not limited in this embodiment of this application.

In some embodiments of this application, the antenna and the radio frequency circuit that have sending and receiving functions may be considered as a transceiver unit of the terminal device (where the transceiver unit may be one functional unit, and the functional unit can implement the sending and receiving functions; or the transceiver unit may include two functional units, namely, a receiving unit that can implement the receiving function and a sending unit that can implement the sending function), and the processor that has a processing function is considered as a processing unit of the terminal device. As shown in FIG. 21, the terminal device includes a transceiver unit 2110 and a processing unit 2120. The transceiver unit may also be referred to as a transceiver, a transceiver apparatus, or the like. The processing unit may also be referred to as a processor, a processing board, a processing module, a processing apparatus, or the like. Optionally, a component for implementing the receiving function in the transceiver unit 2110 may be considered as a receiving unit, and a component for implementing the sending function in the transceiver unit 2110 may be considered as a sending unit. In other words, the transceiver unit 2110 includes the receiving unit and the sending unit. Sometimes, the transceiver unit may also be referred to as a transceiver, a transceiver circuit, or the like. Sometimes, the receiving unit may also be referred to as a receiver, a receiver circuit, or the like. Sometimes, the sending unit may also be referred to as a transmitter, a transmitter circuit, or the like.

It should be understood that the transceiver unit 2110 is configured to perform the sending and receiving operations on a terminal device side in the foregoing method embodiments, and the processing unit 2120 is configured to perform an operation other than the receiving and sending operations of the terminal device in the foregoing method embodiments.

For example, in an implementation, the processing unit 2120 may be configured to perform all operations, such as S74 and S75, that are performed by the terminal device in the embodiment shown in FIG. 7 except sending and receiving operations, and/or configured to support another process of the technology described in this specification. The transceiver unit 2110 may be configured to perform all the sending and receiving operations, such as S71, S73, S74, and S75, that are performed by the terminal device in the embodiment shown in FIG. 7, and/or configured to support another process of the technology described in this specification.

For another example, in an implementation, the processing unit 2120 may be configured to perform all operations, such as S94 and S96, that are performed by the terminal device in the embodiment shown in FIG. 9 except sending and receiving operations, and/or configured to support another process of the technology described in this specification. The transceiver unit 2110 may be configured to perform all the sending and receiving operations, such as S91, S93, and S94 to S96, that are performed by the terminal device in the embodiment shown in FIG. 9, and/or configured to support another process of the technology described in this specification.

For another example, in an implementation, the processing unit 2120 may be configured to perform all operations, such as S114, S116, and S117, that are performed by the terminal device in the embodiment shown in FIG. 11 except sending and receiving operations, and/or configured to support another process of the technology described in this specification. The transceiver unit 2110 may be configured to perform all the sending and receiving operations, such as S111, S113, and S114 to S117, that are performed by the terminal device in the embodiment shown in FIG. 11, and/or configured to support another process of the technology described in this specification.

For still another example, in an implementation, the processing unit 2120 may be configured to perform all operations, such as S133, that are performed by the terminal device in the embodiment shown in FIG. 13 except sending and receiving operations, and/or configured to support another process of the technology described in this specification. The transceiver unit 2110 may be configured to perform all the sending and receiving operations, such as S131 to S133, that are performed by the terminal device in the embodiment shown in FIG. 13, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 22:
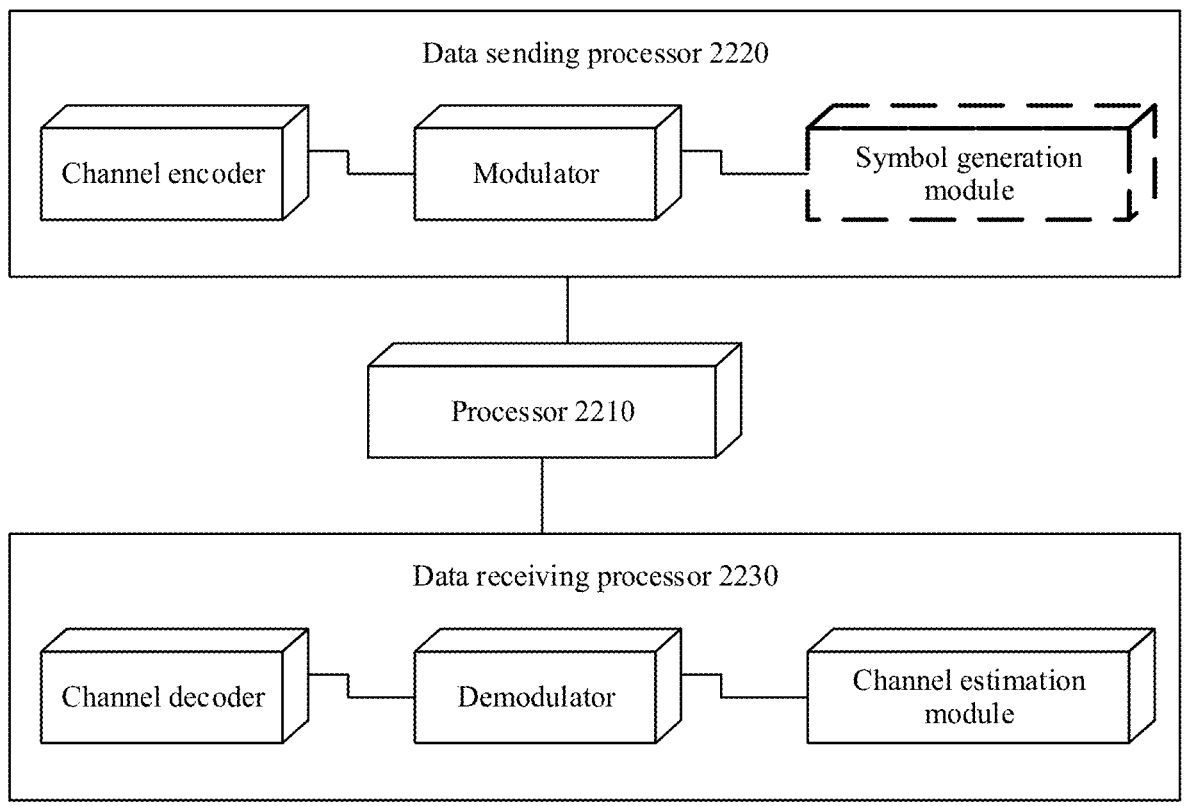
FIG. 22 is another schematic block diagram of a communication apparatus according to an embodiment of this application.

When the communication apparatus in this embodiment is the terminal device, refer to a device shown in FIG. 22. In an example, the device can implement a function similar to the function of the processing module 1510 in FIG. 15. In another example, the device can implement a function similar to the function of the processing module 1710 in FIG. 17. In still another example, the device can implement a function similar to the function of the processing module 1910 in FIG. 19. In FIG. 22, the device includes a processor 2210, a data sending processor 2220, and a data receiving processor 2230. The processing module 1510 in the foregoing embodiment may be the processor 2210 in FIG. 22, and completes a corresponding function. The transceiver module 1520 in the foregoing embodiment may be the data sending processor 2220 and/or the data receiving processor 2230 in FIG. 22, and completes a corresponding function. Alternatively, the processing module 1710 in the foregoing embodiment may be the processor 2210 in FIG. 22, and completes a corresponding function. The transceiver module 1720 in the foregoing embodiment may be the data sending processor 2220 and/or the data receiving processor 2230 in FIG. 22, and completes a corresponding function. Alternatively, the processing module 1910 in the foregoing embodiment may be the processor 2210 in FIG. 22, and completes a corresponding function. The transceiver module 1920 in the foregoing embodiment may be the data sending processor 2220 and/or the data receiving processor 2230 in FIG. 22, and completes a corresponding function. Although FIG. 22 shows a channel encoder and a channel decoder, it may be understood that these modules do not constitute a limitation on this embodiment and are merely examples.

Figure 23:
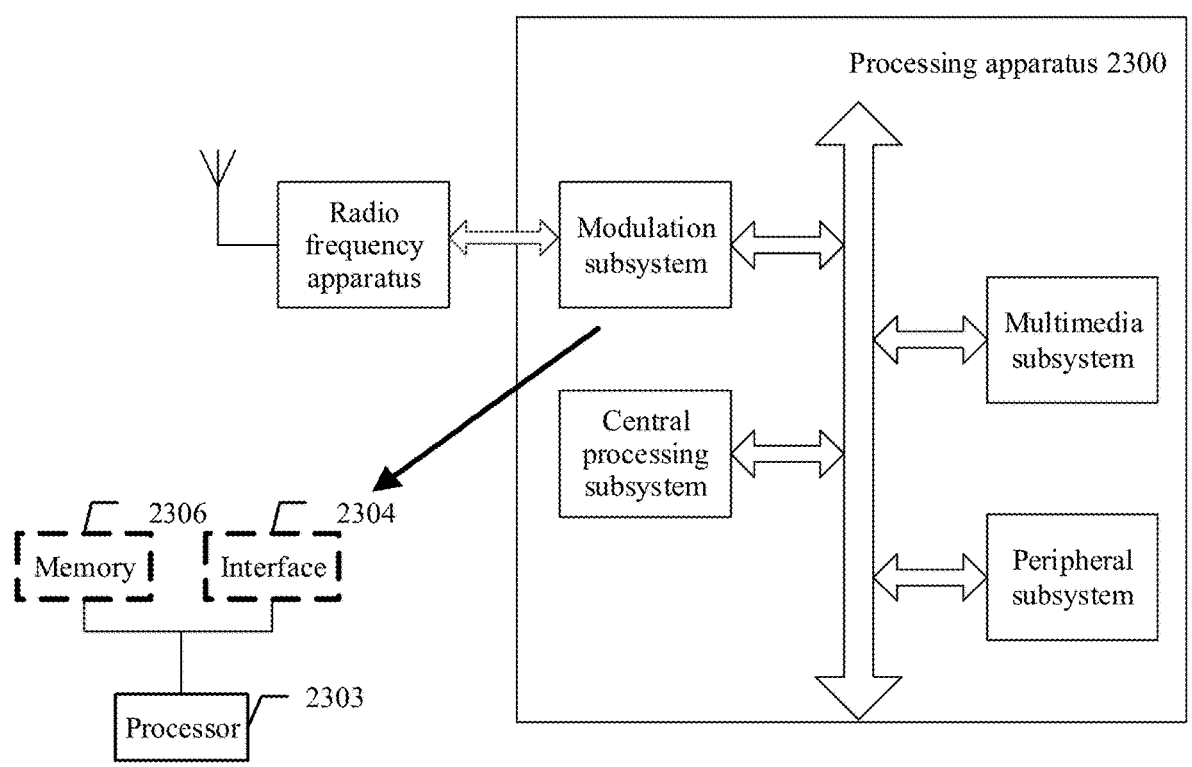
FIG. 23 is still another schematic block diagram of a communication apparatus according to an embodiment of this application.

FIG. 23 shows another form of this embodiment. A processing apparatus 2300 includes modules such as a modulation subsystem, a central processing subsystem, and a peripheral subsystem. The communication apparatus in this embodiment may be used as the modulation subsystem. Specifically, the modulation subsystem may include a processor 2303 and an interface 2304. The processor 2303 implements the function of the processing module 1510, and the interface 2304 implements the function of the transceiver module 1520. Alternatively, the processor 2303 implements the function of the processing module 1710, and the interface 2304 implements the function of the transceiver module 1720. Alternatively, the processor 2303 implements the function of the processing module 1910, and the interface 2304 implements the function of the transceiver module 1920. In another variation, the modulation subsystem includes a memory 2306, a processor 2303, and a program that is stored in the memory 2306 and that can be run on the processor. When executing the program, the processor 2303 implements the method on a terminal device side in the foregoing method embodiments. It should be noted that the memory 2306 may be nonvolatile or volatile, and may be located in the modulation subsystem or in the processing apparatus 2300, provided that the memory 2306 can be connected to the processor 2303.

Figure 24:
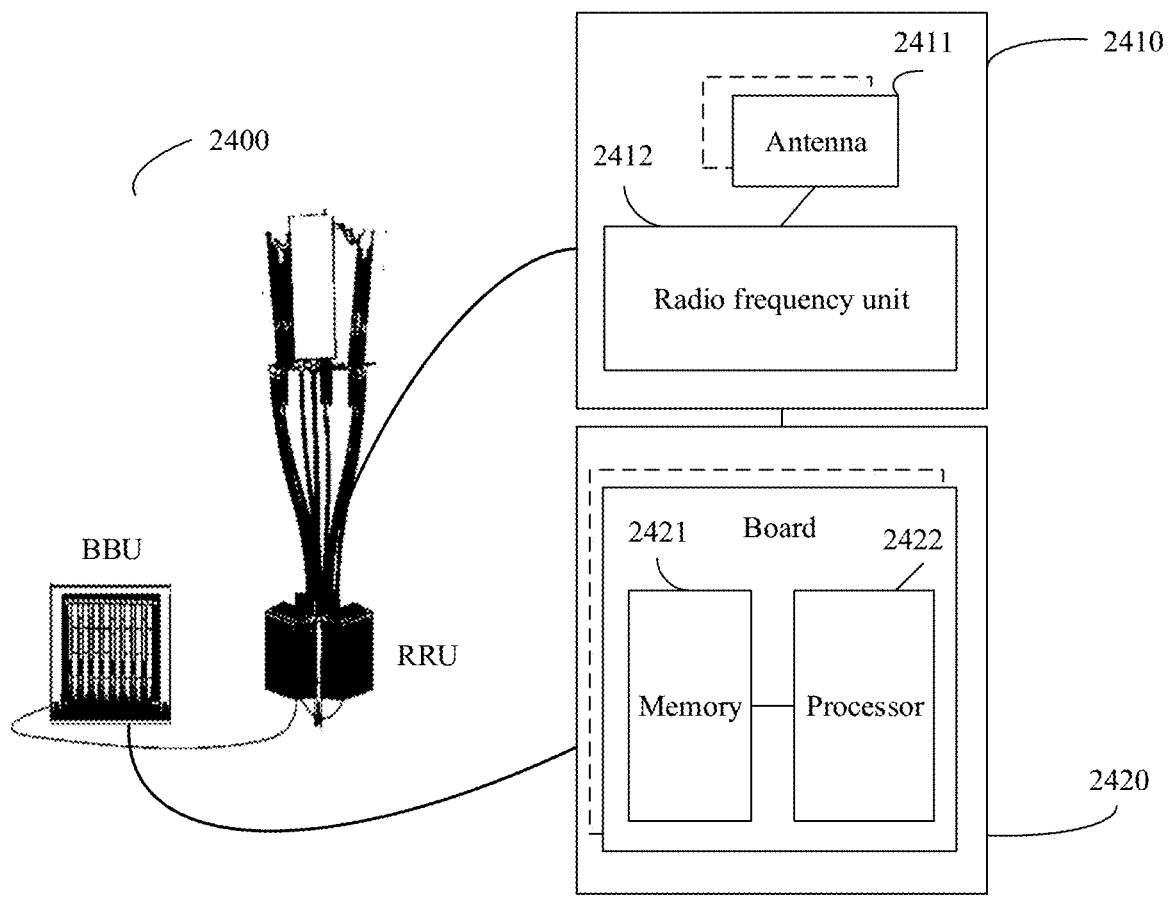
FIG. 24 is yet another schematic block diagram of a communication apparatus according to an embodiment of this application.

When the apparatus in this embodiment of this application is a network device, the apparatus may be as shown in FIG. 24. The apparatus 2400 includes one or more radio frequency units, such as a remote radio unit (remote radio unit, RRU) 2410 and one or more baseband units (baseband units, BBUs) (which may also be referred to as digital units (digital units, DUs)) 2420. The RRU 2410 may be referred to as a transceiver module. The transceiver module may include a sending module and a receiving module, or the transceiver module may be a module that can implement sending and receiving functions. The transceiver module may correspond to the transceiver module 1620 in FIG. 16. Alternatively, the transceiver module may correspond to the transceiver module 1820 in FIG. 18. Alternatively, the transceiver module may correspond to the transceiver module 2020 in FIG. 20. Optionally, the transceiver module may also be referred to as a transceiver, a transceiver circuit, or the like, and may include at least one antenna 2411 and a radio frequency unit 2412. The RRU 2410 is mainly configured to: send and receive a radio frequency signal, and perform conversion between the radio frequency signal and a baseband signal. For example, the RRU 2410 is configured to send indication information to a terminal device. The BBU 2410 is mainly configured to: perform baseband processing, control a base station, and so on. The RRU 2410 and the BBU 2420 may be physically disposed together; or may be physically disposed separately, in other words, in a distributed base station.

The BBU 2420 is a control center of the base station, and may also be referred to as a processing module. The BBU 2420 may correspond to the processing module 1610 in FIG. 16, the processing module 1810 in FIG. 18, or the processing module 2010 in FIG. 20, and is mainly configured to implement baseband processing functions such as channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 2420 may include one or more boards, and a plurality of boards may jointly support a radio access network (for example, an LTE network) having a single access standard, or may separately support radio access networks (for example, an LTE network, a 5G network, or another network) having different access standards. The BBU 2420 further includes a memory 2421 and a processor 2422. The memory 2421 is configured to store necessary instructions and data. The processor 2422 is configured to control the base station to perform a necessary action, for example, configured to control the base station to perform the operation procedure related to the network device in the foregoing method embodiments. The memory 2421 and the processor 2422 may serve the one or more boards. In other words, a memory and a processor may be disposed on each board. Alternatively, a plurality of boards may share a same memory and a same processor. In addition, a necessary circuit may be further disposed on each board.

An embodiment of this application provides a first communication system. The first communication system may include the terminal device in the embodiment shown in FIG. 7, and include the network device in the embodiment shown in FIG. 7. For example, the terminal device is the terminal device 1500 in FIG. 15. For example, the network device is the network device 1600 in FIG. 16.

An embodiment of this application provides a second communication system. The second communication system may include the terminal device in the embodiment shown in FIG. 9, and include the network device in the embodiment shown in FIG. 9. Alternatively, the second communication system includes the terminal device in the embodiment shown in FIG. 11, and includes the network device in the embodiment shown in FIG. 11. For example, the terminal device is the terminal device 1700 in FIG. 17. For example, the network device is the network device 1800 in FIG. 18.

An embodiment of this application provides a third communication system. The third communication system may include the terminal device in the embodiment shown in FIG. 13, and include the network device in the embodiment shown in FIG. 13. For example, the terminal device is the terminal device 1900 in FIG. 19. For example, the network device is the network device 2000 in FIG. 20.

An embodiment of this application further provides a computer-readable storage medium. The computer-readable storage medium stores a computer program. When the computer program is executed by a computer, the computer may implement a procedure related to the network device in the embodiment shown in FIG. 7 in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 7 in the foregoing method embodiments.

An embodiment of this application further provides a computer-readable storage medium. The computer-readable storage medium stores a computer program. When the computer program is executed by a computer, the computer may implement a procedure related to the network device in the embodiment shown in FIG. 9 in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 9 in the foregoing method embodiments.

An embodiment of this application further provides a computer-readable storage medium. The computer-readable storage medium stores a computer program. When the computer program is executed by a computer, the computer may implement a procedure related to the network device in the embodiment shown in FIG. 11 in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 11 in the foregoing method embodiments.

An embodiment of this application further provides a computer-readable storage medium. The computer-readable storage medium stores a computer program. When the computer program is executed by a computer, the computer may implement a procedure related to the network device in the embodiment shown in FIG. 13 in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 13 in the foregoing method embodiments.

An embodiment of this application further provides a computer program product. The computer program product is configured to store a computer program. When the computer program is executed by a computer, the computer may implement a procedure related to the network device in the embodiment shown in FIG. 7 in the foregoing method embodiments.

An embodiment of this application further provides a computer program product. The computer program product is configured to store a computer program. When the computer program is executed by a computer, the computer may implement a procedure related to the terminal device in the embodiment shown in FIG. 7 in the foregoing method embodiments.

An embodiment of this application further provides a computer program product. The computer program product is configured to store a computer program. When the computer program is executed by a computer, the computer may implement a procedure related to the network device in the embodiment shown in FIG. 9 in the foregoing method embodiments.

An embodiment of this application further provides a computer program product. The computer program product is configured to store a computer program. When the computer program is executed by a computer, the computer may implement a procedure related to the terminal device in the embodiment shown in FIG. 9 in the foregoing method embodiments.

An embodiment of this application further provides a computer program product. The computer program product is configured to store a computer program. When the computer program is executed by a computer, the computer may implement a procedure related to the network device in the embodiment shown in FIG. 11 in the foregoing method embodiments.

An embodiment of this application further provides a computer program product. The computer program product is configured to store a computer program. When the computer program is executed by a computer, the computer may implement a procedure related to the terminal device in the embodiment shown in FIG. 11 in the foregoing method embodiments.

An embodiment of this application further provides a computer program product. The computer program product is configured to store a computer program. When the computer program is executed by a computer, the computer may implement a procedure related to the network device in the embodiment shown in FIG. 13 in the foregoing method embodiments.

An embodiment of this application further provides a computer program product. The computer program product is configured to store a computer program. When the computer program is executed by a computer, the computer may implement a procedure related to the terminal device in the embodiment shown in FIG. 13 in the foregoing method embodiments.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should also be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external high-speed cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general-purpose processor, a DSP, an ASIC, an FPGA or another programmable logic device, a discrete gate, a transistor logic device, or a discrete hardware component, the memory (the storage module) is integrated into the processor.

It should be noted that the memory described in this specification is intended to include but not limited to these memories and any memory of another appropriate type.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate parts may or may not be physically separate. Parts displayed as units may or may not be physical units, and may be located in one position or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing computer-readable storage medium may be any usable medium accessible by the computer. The computer-readable medium may include, for example but not limited to, a random access memory (RAM), a read-only memory (ROM), an electrically erasable programmable read-only memory (EEPROM), a compact disc read-only memory (CD-ROM), a universal serial bus flash disk, a removable hard disk or another compact disc storage, a magnetic disk storage medium or another magnetic storage device, or any other medium that can be used to carry or store expected program code in a form of an instruction or a data structure and that can be accessed by a computer.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, comprising:
    sending first uplink data to a network device;
    monitoring a first downlink control channel in a first search space in a first duration, wherein a periodicity of the first search space is a first periodicity; and
    after the first duration ends, monitoring a second downlink control channel in a second search space in a second duration, wherein a periodicity of the second search space is a second periodicity, and a length of the second periodicity is set so that it is greater than a length of the first periodicity based on the second downlink control channel carrying information scheduling application-layer feedback information for the first uplink data.

2. The method according to claim 1, wherein the first downlink control channel is used to carry first downlink control information (DCI), the first DCI is used to schedule retransmission of the first uplink data, the second downlink control channel is used to carry second DCI, and the second DCI is used to schedule the application-layer feedback information for the first uplink data.

3. The method according to claim 1, wherein the first uplink data is comprised in a third message or a random access request message in a random access procedure, or the first uplink data is sent on a preconfigured uplink resource.

4. The method according to claim 1, wherein the method further comprises:
    receiving first configuration information and second configuration information from the network device, wherein the first configuration information is used to configure the first search space, the second configuration information is used to configure the second search space, and the first search space and the second search space are of two different types or a search space identifier corresponding to the first search space is different from a search space identifier corresponding to the second search space.

5. The method according to claim 1, wherein the method further comprises:
    receiving third configuration information from the network device, wherein the third configuration information is used to configure the first search space and the second search space, and wherein the first search space and the second search space are of a same type or a search space identifier corresponding to the first search space is the same as a search space identifier corresponding to the second search space.

6. The method according to claim 1, wherein the method further comprises:
    receiving fourth configuration information or fifth configuration information from the network device; wherein the fourth configuration information is used to configure the first duration, the first duration is an integer multiple of a first time unit or an integer multiple of the length of the first periodicity, and the first time unit is one of a symbol, a slot, a subframe, a frame, or a superframe; and wherein the fifth configuration information is used to configure the second duration, the second duration is an integer multiple of a second time unit or an integer multiple of the length of the second periodicity, and the second time unit is one of the symbol, the slot, the subframe, the frame, or the superframe.

7. The method according to claim 1, wherein, in the second periodicity, not all slots are used for the monitoring the second downlink control channel.

8. The method according to claim 7, wherein the method further comprises determining a start time domain position for the monitoring the second downlink control channel.

9. An apparatus, comprising:
    one or more processors; and
    one or more memories coupled to the one or more processors and storing programming instructions for execution by the one or more processors to cause the apparatus to perform a method comprising:
    sending first uplink data to a network device;
    monitoring a first downlink control channel in a first search space in a first duration, wherein a periodicity of the first search space is a first periodicity;
    after the first duration ends, monitoring a second downlink control channel in a second search space in a second duration, wherein a periodicity of the second search space is a second periodicity, and a length of the second periodicity is set so that it is greater than a length of the first periodicity based on the second downlink control channel carrying information scheduling application-layer feedback information for the first uplink data.

10. The apparatus according to claim 9, wherein the first downlink control channel is used to carry first downlink control information (DCI), the first DCI is used to schedule retransmission of the first uplink data, the second downlink control channel is used to carry second DCI, and the second DCI is used to schedule the application-layer feedback information for the first uplink data.

11. The apparatus according to claim 9, wherein the first uplink data is comprised in a message in a random access procedure or a random access request message in a random access procedure, or the first uplink data is sent on a preconfigured uplink resource.

12. The apparatus according to claim 9, wherein the method further comprises:
    receiving first configuration information and second configuration information from the network device, wherein the first configuration information is used to configure the first search space, and the second configuration information is used to configure the second search space, and wherein the first search space and the second search space are search spaces of two different types or a search space identifier corresponding to the first search space is different from a search space identifier corresponding to the second search space.

13. The apparatus according to claim 9, wherein the method further comprises:
receiving third configuration information from the network device, wherein the third configuration information is used to configure the first search space and the second search space, and wherein the first search space and the second search space are of a same type or a search space identifier corresponding to the first search space is the same as a search space identifier corresponding to the second search space.

14. The apparatus according to claim 9, wherein the method further comprises:
receiving fourth configuration information or fifth configuration information from the network device; wherein the fourth configuration information is used to configure the first duration, the first duration is an integer multiple of a first time unit or an integer multiple of the length of the first periodicity, and the first time unit is one of a symbol, a slot, a subframe, a frame, or a superframe; and wherein the fifth configuration information is used to configure the second duration, the second duration is an integer multiple of a second time unit or an integer multiple of the length of the second periodicity, and the second time unit is one of the symbol, the slot, the subframe, the frame, or the superframe.

15. A non-transitory computer-readable storage medium storing instructions which when executed cause an apparatus to perform a method comprising:
sending first uplink data to a network device;
monitoring a first downlink control channel in a first search space in a first duration, wherein a periodicity of the first search space is a first periodicity;
after the first duration ends, monitoring a second downlink control channel in a second search space in a second duration, wherein a periodicity of the second search space is a second periodicity, and a length of the second periodicity is set so that it is greater than a length of the first periodicity based on the second downlink control channel carrying information scheduling application-layer feedback information for the first uplink data.

16. The non-transitory computer-readable storage medium according to claim 15, wherein the first downlink control channel is used to carry first downlink control information (DCI), the first DCI is used to schedule retransmission of the first uplink data, the second downlink control channel is used to carry second DCI, and the second DCI is used to schedule the application-layer feedback information for the first uplink data.

17. The non-transitory computer-readable storage medium according to claim 15, wherein the first uplink data is comprised in a third message or a random access request message in a random access procedure, or the first uplink data is sent on a preconfigured uplink resource.

18. The non-transitory computer-readable storage medium according to claim 15, wherein the method further comprises:
receiving first configuration information and second configuration information from the network device, wherein the first configuration information is used to configure the first search space, the second configuration information is used to configure the second search space, and the first search space and the second search space are of two different types or a search space identifier corresponding to the first search space is different from a search space identifier corresponding to the second search space.

19. The non-transitory computer-readable storage medium according to claim 15, wherein the method further comprises:
receiving third configuration information from the network device, wherein the third configuration information is used to configure the first search space and the second search space, and wherein the first search space and the second search space are of a same type or a search space identifier corresponding to the first search space is the same as a search space identifier corresponding to the second search space.

20. The non-transitory computer-readable storage medium according to claim 15, wherein the method further comprises:
receiving fourth configuration information or fifth configuration information from the network device; wherein the fourth configuration information is used to configure the first duration, the first duration is an integer multiple of a first time unit or an integer multiple of the length of the first periodicity, and the first time unit is one of a symbol, a slot, a subframe, a frame, or a superframe; and wherein the fifth configuration information is used to configure the second duration, the second duration is an integer multiple of a second time unit or an integer multiple of the length of the second periodicity, and the second time unit is one of the symbol, the slot, the subframe, the frame, or the superframe.

* * * * *